United States Patent
Yabuki et al.

(10) Patent No.: US 10,384,423 B2
(45) Date of Patent: Aug. 20, 2019

(54) HEAT SHIELDING LAMINATION STRUCTURE

(71) Applicant: SUMITOMO METAL MINING CO., LTD., Tokyo (JP)

(72) Inventors: Kayo Yabuki, Ichikawa (JP); Atsushi Tofuku, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 175 days.

(21) Appl. No.: 14/407,328

(22) PCT Filed: Jun. 10, 2013

(86) PCT No.: PCT/JP2013/065932
§ 371 (c)(1),
(2) Date: Dec. 11, 2014

(87) PCT Pub. No.: WO2013/187350
PCT Pub. Date: Dec. 19, 2013

(65) Prior Publication Data
US 2015/0158274 A1 Jun. 11, 2015

(30) Foreign Application Priority Data

Jun. 11, 2012 (JP) .................................. 2012-131559
Nov. 16, 2012 (JP) .................................. 2012-252591
(Continued)

(51) Int. Cl.
*B32B 17/10* (2006.01)
*B32B 27/08* (2006.01)
(Continued)

(52) U.S. Cl.
CPC .......... *B32B 17/10633* (2013.01); *B32B 7/12* (2013.01); *B32B 17/10761* (2013.01);
(Continued)

(58) Field of Classification Search
CPC ............... B29B 11/08; B29K 2509/02; B29K 2067/003; C08K 3/22; C08K 2003/2258
See application file for complete search history.

(56) References Cited

U.S. PATENT DOCUMENTS 2,456,366 A * 12/1948 Bren ...................... C08K 5/103
524/306
3,434,915 A * 3/1969 Garrison ........... B32B 17/10688
156/106
(Continued)

FOREIGN PATENT DOCUMENTS

JP    H04-160041 A    6/1992
JP    H08-217500 A    8/1996
(Continued)

OTHER PUBLICATIONS

Zernial et al., JP 20003544553, "Fire-retarding glass", Dec. 12, 2000 (Abstract only).*
(Continued)

*Primary Examiner* — Cheng Yuan Huang
(74) *Attorney, Agent, or Firm* — Oliff PLC

(57) ABSTRACT

A heat-ray shielding lamination structure composed of two laminated plates of plate glass, plastic, or plastic containing particles having a heat-ray shielding function and metal compounds, interposing an interlayer containing particles having a heat-ray shielding function and metal compounds, wherein the particles are composite tungsten oxide particles of formula $M_Y WO_Z$ ($0.001 \leq Y \leq 1.0$, $2.2 \leq Z \leq 3.0$), wherein M is at least one of Cs, Rb, K, and Tl, having a hexagonal crystal structure, with a particle size between 1 and 800 nm, the metal compounds are metal salts of carboxylic acids, metal carbonates, metal carbonate hydroxides, or metal hydroxides, and are contained in an amount between 1 pts.wt. and 100 pts.wt. based on 100 pts.wt. of the composite tungsten oxide particles.

13 Claims, 4 Drawing Sheets

(30) Foreign Application Priority Data

Mar. 28, 2013 (JP) ................................. 2013-070667
Mar. 28, 2013 (JP) ................................. 2013-070668
Apr. 26, 2013 (JP) ................................. 2013-094673

(51) Int. Cl.
*B32B 27/30* (2006.01)
*B32B 27/32* (2006.01)
*B32B 27/36* (2006.01)
*B32B 7/12* (2006.01)
*B32B 27/20* (2006.01)

(52) U.S. Cl.
CPC .. *B32B 17/10779* (2013.01); *B32B 17/10788* (2013.01); *B32B 27/08* (2013.01); *B32B 27/20* (2013.01); *B32B 27/306* (2013.01); *B32B 27/308* (2013.01); *B32B 27/32* (2013.01); *B32B 27/36* (2013.01); *B32B 27/365* (2013.01); *B32B 2250/05* (2013.01); *B32B 2250/40* (2013.01); *B32B 2255/10* (2013.01); *B32B 2255/26* (2013.01); *B32B 2264/102* (2013.01); *B32B 2264/104* (2013.01); *B32B 2264/105* (2013.01); *B32B 2307/30* (2013.01); *B32B 2307/306* (2013.01); *B32B 2307/40* (2013.01); *B32B 2307/416* (2013.01); *B32B 2307/712* (2013.01); *B32B 2419/00* (2013.01); *B32B 2605/00* (2013.01); *B32B 2605/006* (2013.01); *B32B 2605/08* (2013.01); *B32B 2605/10* (2013.01); *Y10T 428/256* (2015.01)

(56) References Cited

U.S. PATENT DOCUMENTS

| | | | | |
|---|---|---|---|---|
| 2005/0142366 | A1* | 6/2005 | Fugiel | B29C 47/0004 428/437 |
| 2010/0124647 | A1* | 5/2010 | Keller | B32B 17/10688 428/220 |
| 2010/0220388 | A1* | 9/2010 | Suzuki | B32B 17/10 359/359 |

FOREIGN PATENT DOCUMENTS

| | | | | |
|---|---|---|---|---|
| JP | H08-259279 | A | | 10/1996 |
| JP | H10-297945 | A | | 11/1998 |
| JP | 2000344553 | A | * | 12/2000 ....... B32B 17/10045 |
| JP | 2001-089202 | A | | 4/2001 |
| JP | 2009-035459 | A | | 2/2009 |
| JP | 2009-062411 | A | | 3/2009 |
| JP | 2010-202495 | A | | 9/2010 |
| JP | 2011-063493 | A | | 3/2011 |
| JP | 2012-224478 | A | | 11/2012 |
| WO | WO-2012140898 | A1 | * | 10/2012 ....... B32B 17/10633 |

OTHER PUBLICATIONS

"Magnesium Hydroxide Carbonate", FNP 28 <http://www.fao.org/fileadmin/user_upload/jecfa_additives/docs/Monograph1/Additive-263.pdf> (Year: 1983).*

Sep. 10, 2013 International Search Report issued in Application No. JP2013/065932.

Dec. 16, 2014 International Preliminary Report on Patentability issued in Application No. JP2013/065932.

* cited by examiner

HEAT SHIELDING LAMINATION STRUCTURE

TECHNICAL FIELD

The present invention relates to a heat-ray shielding lamination structure used as window materials for vehicles such as an automobile, and buildings.

DESCRIPTION OF RELATED ART

A solar light is roughly divided into a near-infrared light (heat ray), a visible light, and a UV-light. The near-infrared light (heat ray) has a wavelength region felt by a human body as a thermal energy, and causes a summer temperature rise in a room. Further, the UV-light is indicated to have an adverse influence on the human body, such as a sunburn and skin cancer, etc. A transparent substrate such as a window glass, etc., can have a privacy protecting function by controlling a transmittance of the visible light.

In recent years, in order to shield the near-infrared light as a heat ray, keep heat, and have an insulation performance, transparent substrates such as glass, polycarbonate resin, and acrylic resin, etc., are required to have a near-infrared absorption power.

Meanwhile, the transparent substrate is used as a safety glass used for a window material of an automobile or a building, etc., in the form of a laminated glass which is constituted by sandwiching an interlayer containing polyvinyl acetal resin, etc., between several (for example two) facing plate glasses. Further, the transparent substrate is proposed for the purpose of reducing a cooling load or hot feeling by shutting-off an incident solar energy, by having a heat-ray shielding function in the interlayer.

For example, patent document 1 discloses a laminated glass which is constituted by sandwiching a soft resin layer between two facing plate glasses, the soft resin layer containing a heat-ray shielding metal oxide composed of tin oxide or indium oxide having a particle size of 0.1 μm or less.

Further, patent document 2 discloses a laminated glass which is constituted by sandwiching an interlayer between at least two facing plate glasses, so that metals such as Sn, Ti, Si, Zn, Zr, Fe, Al, Cr, Co, Ce, In, Ni, Ag, Cu, Pt, Mn, Ta, W, V, and Mo, oxide of such metals, nitride of such metals, sulfide of such metals, these metals doped with Sb or F, and a composite of them are dispersed in the interlayer.

Also, patent document 3 discloses an automobile window glass which is constituted by sandwiching a mixture layer of particles composed of $TiO_2$, $ZrO_2$, $SnO_2$, $In_2O_3$, and a glass component composed of organic silicon or an organic silicon compound, between facing transparent plate-like members.

Moreover, patent document 4 discloses a laminated glass which is constituted by sandwiching an interlayer composed of three layers between at least two facing transparent glass plate-like bodies. In the second layer of this interlayer, metal such as Sn, Ti, Si, Zn, Zr, Fe, Al, Cr, Co, Ce, In, Ni, Ag, Cu, Pt, Mn, Ta, W, V, and Mo, oxide of such metals, nitride of such metals, sulfide of such metals, these metals doped with Sb or F, or a composite of such materials has been dispersed, and the first and the third layers of the interlayer are resin layers.

However, the conventional laminated glass disclosed in patent documents 1 to 4 all involve a problem of an insufficient heat-ray shielding function when high visible light transmittance is requested.

In patent document 5, an applicant discloses a heat-ray shielding laminated glass constituted by sandwiching an interlayer having a heat-ray shielding function between two plate glasses, wherein the intermediate layer is constituted of a heat-ray shielding film containing hexaboride particles alone, or, hexaboride particles, ITO particles and/or ATO particles, and a vinyl resin, or a heat-ray shielding laminated glass constituted of a heat-ray shielding film containing the abovementioned particles and having the interlayer formed on a surface facing the inside of at least one of the plate glasses, and a heat-ray shielding film containing vinyl resin sandwiched between the abovementioned two plate glasses.

As described in patent document 5, optical properties of the heat-ray shielding laminated glass are as follows: hexaboride particles alone, or, hexaboride particles, ITO particles and/or ATO particles are used, and there is a maximum point of transmittance in a visible light region, and there is a minimum point of transmittance in a near-infrared region where strong absorbing property is exhibited. As a result, the heat-ray shielding laminated glass of patent document 5 is improved enough to realize 50% range of the solar transmittance when the transmittance of visible light is 70% or more, in comparison with the conventional laminated glasses described in patent documents 1 to 4.

Meanwhile, composite tungsten oxide particles are known as particles having the heat-ray shielding function of the near infrared region, other than the abovementioned ITO particles, ATO particles, and hexaboride particles. An applicant discloses in patent document 6 a heat-ray shielding laminated glass in which polyvinyl acetal resin is replaced with a UV-ray curable resin, and a heat-ray shielding film containing a composite tungsten compound hexaboride in this UV-ray curable resin is used as an interlayer.

PRIOR ART DOCUMENT

Patent Document 1: Japanese Patent Laid-Open No. 1996-217500
Patent Document 2: Japanese Patent Laid-Open No. 1996-259279
Patent Document 3: Japanese Patent Laid-Open No. 1992-160041
Patent Document 4: Japanese Patent Laid-Open No. 1998-297945
Patent Document 5: Japanese Patent Laid-Open No. 2001-89202
Patent Document 6: Japanese Patent Laid-Open No. 2010-202495

SUMMARY OF INVENTION

Subject to be Solved by the Invention

However, as a result of further investigations by the present inventors, the following subjects are found.

Namely, as described above, in the laminated glass according to conventional techniques described in patent documents 1 to 4, the heat-ray shielding function is not sufficient when high visible light transmittance is requested. A haze value indicating a degree of cloudiness of a transparent substrate is required to be 1% or less for window materials of vehicles, and is required to be 3% or less for window materials of buildings. Meanwhile, for example in the heat-ray shielding laminated glass descried in patent document 5 as well, there is still a room for improvement in the heat-ray shielding laminated glass. Further, in anyone of the heat-ray shielding laminated glasses, etc., according to the conventional techniques, weather resistance is insufficient in the case of a long use, and aging reduction (deterioration) of the visible light transmittance is found.

In view of the above-described subject, the present invention is provided, and in order to solve the subject, an object of the present invention is to provide a heat-ray shielding lamination structure capable of exhibiting excellent optical property and excellent weather resistance, using composite tungsten oxide particles having excellent heat-ray shielding property.

Means for Solving the Problem

In order to achieve the above-described object, the present inventors obtain a knowledge that there is provided the heat-ray shielding lamination structure having a maximum transmittance in a visible light region, having a strong absorption in a near-infrared region, having a low haze value, and capable of exhibiting excellent weather resistance, by mixing composite tungsten oxide particles as a near-infrared ray absorption material, and a resin binder, and further mixing therein one or more kinds of metal salts of carboxylic acids, metal carbonate, metal hydroxides carbonates, and metal hydroxides. The present invention is completed based on such a technical knowledge.

Namely, according to a first aspect of the present invention, there is provided a heat-ray shielding lamination structure composed of two laminated plates selected from a plate glass, a plastic, or a plastic containing particles having a heat-ray shielding function, metal salts of carboxylic acids, metal carbonate, metal hydroxides carbonates, and metal hydroxides, interposing an interlayer containing particles having a heat-ray shielding function and one or more kinds of metal salts of carboxylic acids, metal carbonate, metal hydroxides carbonates, and metal hydroxides, wherein the particles having the heat-ray shielding function are composite tungsten oxide particles expressed by a general formula $M_YWO_Z$ ($0.001 \leq Y \leq 1.0$, $2.2 \leq Z \leq 3.0$), element M is one or more kinds of Cs, Rb, K, Tl, having a hexagonal crystal structure, with a particle size of 1 nm or more and 800 or less, and one or more kinds of the metal salts of carboxylic acids, metal carbonate, metal hydroxides carbonates, and metal hydroxides, are contained in an amount of 1 pts.wt. or more and 100 pts.wt. or less based on 100 pts.wt. of the composite tungsten oxide particles.

Further according to a second aspect of the present invention, there is provided a heat-ray shielding lamination structure wherein an interlayer is interposed between:

a laminated plate selected from a plate glass, a plastic, and a plastic containing particles having a heat-ray shielding function and one or more kinds of metal salts of carboxylic acids, metal carbonate, metal hydroxides carbonates, and metal hydroxides; and a plastic laminated plate containing particles having a heat-ray shielding function, and one or more kinds of metal salts of carboxylic acids, metal carbonate, metal hydroxides carbonates, and metal hydroxides, wherein the particles having the heat-ray shielding function are composite tungsten oxide particles expressed by a general formula $M_YWO_Z$ ($0.001 \leq Y \leq 1.0$, $2.2 \leq Z \leq 3.0$), element M is one or more kinds of Cs, Rb, K, Tl, having a hexagonal crystal structure, with a particle size of 1 nm or more and 800 or less, and one or more kinds of the metal salts of carboxylic acids, metal carbonate, metal hydroxides carbonates, and metal hydroxides, are contained in an amount of 1 pts.wt. or more and 100 pts.wt. or less based on 100 pts.wt. of the composite tungsten oxide particles.

Further, according to a third aspect of the present invention, there is provided wherein metal constituting the metal salts of carboxylic acids is at least one kind selected from sodium, potassium, magnesium, calcium, manganese, cesium, lithium, and rubidium.

Further, according to a fourth aspect of the present invention, there is provided wherein carboxylic acid constituting the metal salts of carboxylic acids is one kind selected from acetic acid, butyric acid, propionic acid, hexanoic acid, stearic acid, and 2-ethylhexanoic acid.

Further, according to a fourth aspect of the present invention, there is provided the heat-ray shielding lamination structure, wherein carboxylic acid constituting the metal salts of carboxylic acids is one kind selected from acetic acid, butyric acid, propionic acid, hexanoic acid, stearic acid, and 2-ethylhexanoic acid.

Further, according to a fifth aspect of the present invention, there is provided the heat-ray shielding lamination structure, wherein metal constituting the metal salts of carboxylic acids or metal carbonate hydroxide is at least one kind selected from sodium, potassium, magnesium, manganese, cesium, lithium, and rubidium.

Further, according to a sixth aspect of the present invention, there is provided the heat-ray shielding lamination structure, wherein metal constituting the metal hydroxides is at least one kind selected from sodium, magnesium, manganese, cesium, lithium, and rubidium.

Further, according to a seventh aspect of the present invention, there is provided the heat-ray shielding lamination structure, wherein the plastic is a sheet or a film made of polycarbonate resin or acrylic resin or polyethyleneterephthalate resin.

Further, according to an eighth aspect of the present invention, there is provided the heat-ray shielding lamination structure, wherein the interlayer includes an intermediate film, and the particles having the heat-ray shielding function and one or more kinds of metal salts of carboxylic acids, metal carbonate, metal hydroxides carbonates, and metal hydroxides are contained in the intermediate film.

Further, according to a ninth aspect of the present invention, there is provided the heat-ray shielding lamination structure, wherein the interlayer includes a two or more layered intermediate film, and the particles having the heat-ray shielding function and one or more kinds of metal salts of carboxylic acids, metal carbonate, metal hydroxides carbonates, and metal hydroxides are contained in at least one layer of the intermediate film.

Further, according to a tenth aspect of the present invention, there is provided the heat-ray shielding lamination structure, wherein the interlayer includes:

a heat-ray shielding film formed on at least one of the inner surfaces of the two laminated plates selected from the plate glass or plastic, containing one or more kinds of metal salts of carboxylic acids, metal carbonate, metal hydroxides carbonates, and metal hydroxides; or the intermediate film overlapped on the heat-ray shielding film.

Further, according to an eleventh aspect of the present invention, there is provided the heat-ray shielding lamination structure, wherein the interlayer is configured so that:

a heat-ray substrate having a heat-ray shielding film formed on one surface or both surfaces of a resin film substrate, the heat-ray shielding film containing the particles having the heat-ray shielding function and one or more kinds of metal salts of carboxylic acids, metal carbonate, metal hydroxides carbonates, and metal hydroxides; or a heat-ray shielding film substrate containing the particles having the heat-ray shielding function and one or more kinds of metal salts of carboxylic acids, metal carbonate, metal hydroxides carbonates, and metal hydroxides, are laminated between two or more layered intermediate films.

Further, according to a twelfth aspect of the present invention, there is provided the heat-ray shielding lamination structure, wherein the interlayer includes a heat-ray shielding film formed on at least one of the surfaces of the intermediate films, the heat-ray shielding film containing particles having a heat-ray shielding function and one or more kinds of metal salts of carboxylic acids, metal carbonate, metal hydroxides carbonates, and metal hydroxides.

Further, according to a thirteenth aspect of the present invention, there is provided the heat-ray shielding lamination structure, wherein the interlayer includes:

the intermediate film or two or more layered intermediate film;

an adhesive layer;

a heat-ray shielding film containing the particles having the heat-ray shielding function, and one or more kinds of metal salts of carboxylic acids, metal carbonate, metal hydroxides carbonates, and metal hydroxides; and a peeling layer, in such a manner as being laminated in this order, wherein the adhesive layer of the lamination body is adhered to an inner surface of one of the laminated plates selected from the plate glass or plastic, and the peeling layer of the lamination body is adhered to the intermediate film or the two or more layered intermediate film.

Further, according to a fourteenth aspect of the present invention, there is provided the heat-ray shielding lamination structure, wherein the interlayer includes an intermediate film or two or more layered intermediate film.

Further, according to a fifteenth aspect of the present invention, there is provided the heat-ray shielding lamination structure, wherein resin constituting the intermediate film is vinyl resin.

Further, according to a sixteenth aspect of the present invention, there is provided the heat-ray shielding lamination structure, wherein the vinyl resin constituting the intermediate film is polyvinyl butyral or ethylene-vinyl acetate copolymer.

Advantage of the Invention

The heat-ray shielding lamination structure of the present invention is capable of exhibiting excellent optical property and excellent weather resistance, by containing composite tungsten oxide expressed by a general formula $M_YWO_Z$, and one or more kinds of metal salts of carboxylic acids, metal carbonate, metal hydroxides carbonates, and metal hydroxides having a deterioration preventive function.

MODES FOR CARRYING OUT THE INVENTION

Figure 1:
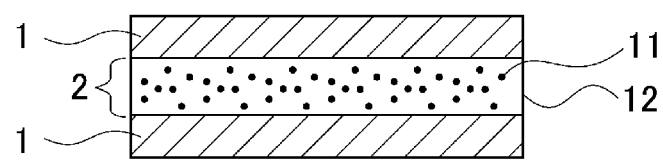
FIG. 1 is a sectional view of an example of a heat-ray shielding lamination structure according to (embodiment A-1).

In view of the following subject of a conventional technique, the present invention is provided.

Namely, a heat-ray shielding lamination structure such as a laminated glass, etc., according to the conventional technique, does not have a sufficient heat-ray shielding function when a high visible light transmittance is requested. Further, a haze value indicating a degree of cloudiness of a transparent substrate is required to be 1% or less for window materials of vehicles, and is required to be 3% or less for window materials of buildings. Meanwhile, for example in the heat-ray shielding laminated glass descried in patent document 5 as well, there is still a room for improvement in the heat-ray shielding laminated glass. Further, in any one of the heat-ray shielding laminated glasses, etc., according to the conventional techniques, weather resistance is insufficient in the case of a long use, and aging reduction (deterioration) of the visible light transmittance, reduction of a near-infrared ray absorbing function, change of color tone, and increase of the haze value, are found.

Further, the following subject is focused by inventors of the present invention.

Namely, in addition to the optical property, mechanical property is also requested for a heat-ray shielding laminated glass, etc., used for each kind of window materials. Specifically, resistance to penetration is requested for the laminated glass, etc., such as a safety glass, etc. Conventionally, in order to apply penetration resistance to the laminated glass, etc., vinyl resin such as polyvinyl acetal resin, etc., is used for an interlayer. However, if composite tungsten oxide particles are contained in the vinyl resin such as polyvinyl acetal resin, etc., it is found that the optical property is deteriorated. Therefore, as a second best method, patent document 6 discloses a heat-ray shielding film in which a composite tungsten compound and a hexaboride compound are contained in UV-curing resin, by replacing the polyvinyl acetal resin with UV-curing resin. However, vinyl resin such as polyvinyl acetal resin, etc., is preferably used as the resin for the interlayer, from a viewpoint of satisfying a mechanical strength of the safety glass, etc.

In view of the above-described subject, the present invention is provided, and in order to solve the subject, an object of the present invention is to provide a heat-ray shielding lamination structure capable of exhibiting excellent optical property and excellent weather resistance, by using composite tungsten oxide particles having excellent heat-ray shielding property.

In order to solve the subject, another object of the present invention is to provide a heat-ray shielding lamination structure capable of exhibiting excellent optical property and excellent weather resistance, even in a case of using the vinyl resin such as polyvinyl acetal resin, etc., as a main component of the intermediate film in the heat-ray shielding lamination structure of the present invention.

In order to solve the above-described subject, the heat-ray shielding lamination structure of the present invention has composite tungsten oxide particles and one or more kinds of metal salts of carboxylic acids, metal carbonate, metal hydroxides carbonates, and metal hydroxides.

Detailed explanation is given hereafter regarding the heat-ray shielding lamination structure of the present invention in the following order.
1. Particles having a heat-ray shielding function
2. Metal salt
3. Method of producing particles added with metal salt and having the heat-ray shielding function
4. Heat-ray shielding lamination structure
5. Embodiments of the heat-ray shielding lamination structure
6. Method of producing the heat-ray shielding lamination structure, and
7. Conclusion

1. (PARTICLES HAVING THE HEAT-RAY SHIELDING FUNCTION)

Generally, it is known that a material containing free electrons shows a response of reflection and absorption by plasma oscillation, to an electromagnetic wave around a wavelength range of 200 nm to 2600 nm of a solar light. If powder of such a substance is made of particles smaller than a wavelength of light, geometric scattering in a visible light region (wavelength range of 380 nm to 780 nm) is reduced, and transparency of the visible light region can be obtained.

Generally, since effective free electrons don't exist in tungsten trioxide ($WO_3$), $WO_3$ has less absorption and reflection property in a near-infrared region, and is not effective as an infrared ray shielding material. Meanwhile, tungsten trioxide with oxygen deficiency, and so-called tungsten bronze obtained by adding a positive element such as Na in the tungsten trioxide, are conductive materials and materials having free electrons. Further, the result of analyzing a single crystal of these materials also suggests the response of the free electrons to light in the infrared region.

When a composition range of the tungsten and oxygen is a specific range, it is found by the inventors of the present invention, that $WO_3$ is particularly effective as the near-infrared ray shielding material. Specifically, particles having the heat-ray shielding function are composite tungsten oxide particles expressed by a general formula $M_Y WO_Z$ ($0.001 \leq Y \leq 1.0$, $2.2 \leq Z \leq 3.0$), and having a hexagonal crystal structure. When used for the heat-ray shielding lamination structure, the composite tungsten oxide particles effectively function as a heat-ray absorption component.

The composite tungsten oxide particles containing one or more kinds of Cs, Rb, K, and Tl as element M for example, can be given as the composite tungsten oxide particles expressed by a general formula $M_Y WO_Z$ (0.001 $Y \leq 1.0$, $2.2 \leq Z \leq 3.0$), and having a hexagonal crystal structure. An addition amount of the added element M is preferably 0.1 or more and 0.5 or less, and further preferably in the vicinity of 0.33. This is because the addition amount theoretically calculated from the hexagonal crystal structure is 0.33, and a preferable optical property can be obtained by the addition amount around 0.33. $Cs_{0.33}WO_3$, $Rb_{0.33}WO_3$, $K_{0.33}WO_3$, and $Tl_{0.33}WO_3$, etc., can be given as a typical example. However, effective heat-ray absorption property can be obtained if Y and Z fall within the abovementioned range.

Further, if design properties are taken into consideration, efficient infrared-ray shielding is requested while maintaining transparency. According to the present invention, the heat-ray absorption component containing the composite tungsten oxide particles largely absorb the light particularly in the vicinity of the wavelength range of 900 to 2200 nm. Therefore, the transmission color range is blue to green in many cases.

When a particle size of each particle is smaller than 800 nm, the infrared-ray can be efficiently shielded while maintaining transparency of the visible light region, without shielding lights. Particularly, when the transparency of the visible light region is emphasized, the particle size is set to 200 nm or less, and preferably 100 nm or less. This is because if the particle size of each particle is large, the light of the visible light region in the wavelength range of 400 to 780 nm is scattered by geometric scattering or diffraction scattering, to thereby turn the substrate into a frosted glass, and a clear transparency cannot be obtained. If the particle size is 200 nm or less, the scattering is reduced to Mie scattering or Rayleigh scattering. Particularly, if the particle size is decreased to a Rayleigh scattering region, scattered light is reduced in inverse proportion to 6 square of a dispersed particle size, and therefore scattering is reduced with a decrease of the particle size and transparency is improved. Further, if the particle size is 100 nm or less, the scattered light is preferably extremely reduced. From a viewpoint of preventing the scattering of the light, a small particle size is preferable, and the particle size of 1 nm or more is enough to easily produce the heat-ray shielding lamination structure industrially.

Further, a heat-ray absorption power per unit weight of the composite tungsten oxide particles is extremely high, and its effect is exhibited by a use amount of about quarter to one-tenth of ITO or ATO. An amount of the composite tungsten oxide particles contained in the heat-ray shielding lamination structure is preferably 0.2 $g/m^2$ to 2.5 $g/m^2$ per unit area. If the content is 0.2 $g/m^2$ or more, expected heat-ray shielding property can be obtained. Also, if the content is 2.5 $g/m^2$ or less, transparency of the heat-ray shielding lamination structure and physical property of resin are preferably not damaged.

2. (METAL SALT)

In the present invention, one or more kinds of metal salts of carboxylic acids, metal carbonate, metal hydroxides carbonates, and metal hydroxides are added in the composite tungsten oxide particles, for the purpose of improving the weather resistance of the heat-ray shielding lamination structure and suppressing the aging variation of the optical property.

According to the knowledge of the inventors of the present invention, any one of the metal salts of carboxylic acids, metal carbonate, metal hydroxides carbonates, and metal hydroxides, or a mixture of them, has an effect of suppressing the aging deterioration of the composite tungsten oxide particles. A specific mechanism of suppressing the aging deterioration has not been clarified yet, but a specific effect obtained by adding one or more kinds of metal salts of carboxylic acids, metal carbonate, metal hydroxides carbonates, and metal hydroxides, is to suppress the reduction (deterioration) of the visible light transmittance in initial use and after certain long time use of the heat-ray shielding lamination structure, when the heat-ray shielding lamination structure is used for a specific long time. Meanwhile, when no one of the metal salts of carboxylic acids, metal carbonate, metal hydroxides carbonates, and metal hydroxides, is added in the composite tungsten oxide particles, it is confirmed that the visible light transmittance is reduced (deteriorated) after certain long time use of the heat-ray shielding lamination structure, compared with the initial use.

As a result of the examination by the inventors of the present invention, the effect of suppressing the deterioration of the visible light transmittance is confirmed, by using alkaline metals such as lithium, sodium, potassium, rubidium, and cesium, alkaline earth metals such as magnesium, calcium, strontium, and barium, and transition metals such as manganese, iron, cobalt, nickel, copper, zinc, and cerium. Above all, in the case of the carboxylic acid, a remarkable effect of suppressing the deterioration of the visible light transmittance is found by using sodium, potassium, magnesium, calcium, manganese, cesium, lithium, and rubidium. Specifically, a remarkable effect is found such as suppressing the variation rate of the initial visible light transmittance to half or less. Further, an effect of suppressing the deterioration such as suppressing an increase of the haze value in the heat-ray shielding lamination structure using the composite tungsten oxide particles is also confirmed, by adding the metal salts of carboxylic acids using the abovementioned metals, particularly sodium, potassium, magnesium, calcium, manganese, cesium, lithium, and rubidium, in the composite tungsten oxide particles.

Further, the carboxylic acid used for the metal salt carboxylic acids is not particularly limited, and for example, acetic acid, butyric acid, valeric acid, propionic acid, hexanoic acid, enanthic acid, caprylic acid, pelargonic acid, capric acid, lauric acid, myristic acid, palmitic acid, margaric acid, stearic acid, 2-ehylexanoic acid, etc., and a generally known higher fatty acid, can be given.

Also, the effect of suppressing the deterioration of the visible light transmittance is confirmed, by using the alkaline metal such as lithium, sodium, potassium, rubidium, and cesium, alkaline earth metals such as magnesium, calcium, and strontium, and transition metals such as manganese, cobalt, nickel, copper, and zinc, as the metal constituting the metal carbonate or the metal hydroxides carbonates.

Above all, when sodium, potassium, magnesium, manganese, cesium, lithium, and rubidium, are used, a remarkable effect of suppressing the deterioration of the visible light transmittance is observed. Specifically, a remarkable effect is found in suppressing the variation rate of the initial visible light transmittance to half or less.

Further, an effect of suppressing the deterioration such as suppressing the increase of the haze value in the heat-ray shielding lamination structure is also confirmed, by adding carbonate or hydroxide carbonate using the abovementioned metals, particularly sodium, potassium, magnesium, manganese, cesium, lithium, and rubidium, in the composite tungsten oxide particles.

Also, an effect of suppressing the deterioration of the visible light transmittance is confirmed by using the alkaline metal such as lithium, sodium, potassium, rubidium, and cesium, alkaline earth metals such as magnesium, calcium, strontium, and barium, and transition metals such as manganese, iron, cobalt, nickel, copper, zinc, and cerium, as the metal constituting the metal hydroxide.

Above all, when sodium, magnesium, manganese, cesium, lithium, and rubidium, are used, a remarkable effect of suppressing the deterioration of the visible light transmittance is observed. Specifically, a remarkable effect is found in suppressing the variation rate of the initial visible light transmittance to half or less.

Further, an effect of suppressing the deterioration such as suppressing the increase of the haze value in the heat-ray shielding lamination structure is also confirmed, by adding hydroxide using the abovementioned metals, particularly sodium, magnesium, manganese, cesium, lithium, and rubidium, in the composite tungsten oxide particles.

Addition amounts of one or more kinds of metal salts of carboxylic acids, metal carbonate, metal hydroxides carbonates, and metal hydroxides, are preferably in a range of 1 pts.wt. or more and 100 pts.wt. or less, and more preferably 3 pts.wt. or more and 50 pts.wt. or less, based on 100 pts.wt. of the composite tungsten oxide particles. This is because if the addition amounts of the one or more kinds of metal salts of carboxylic acids, metal carbonate, metal hydroxides carbonates, and metal hydroxides are within the abovementioned range, there is an effect of improving the weather resistance of the composite tungsten oxide particles and there is no adverse influence on the physical property of the obtained heat-ray shielding lamination structure.

3. (METHOD OF PRODUCING PARTICLES ADDED WITH METAL SALT AND HAVING THE HEAT-RAY SHIELDING FUNCTION)

A specific amount of particles having the heat-ray shielding function, a specific amount of one or more kinds of metal salts of carboxylic acids, metal carbonate, metal hydroxides carbonates, and metal hydroxides, a suitable organic solvent, and a specific amount of particle dispersing dispersant, are mixed, and dispersion treatment is applied thereto using a medium stirring mill or an ultrasonic homogenizer, etc., to thereby produce a dispersion liquid of the particles having the heat-ray shielding function added with one or more kinds of metal salts of carboxylic acids, metal carbonate, metal hydroxides carbonates, and metal hydroxides.

The organic solvent is removed from the particle dispersion liquid having the heat-ray shielding function added with one or more kinds of metal salts of carboxylic acids, metal carbonate, metal hydroxides carbonates, and metal hydroxides, to thereby produce a dispersion powder of the particles having the heat-ray shielding function added with one or more kinds of metal salts of carboxylic acids, metal carbonate, metal hydroxides carbonates, and metal hydroxides.

In the explanation for the "heat-ray shielding lamination structure" described hereafter, the "particles having the heat-ray shielding function added with metal salt" is simply described as "particles having the heat-ray shielding function" in some cases.

4. (HEAT-RAY SHIELDING LAMINATION STRUCTURE)

The heat-ray shielding lamination structure of the present invention is the lamination structure configured to interpose an interlayer between two laminated plates selected from a plate glass and plastic, at least one of the interlayer and the plastic containing particles having a heat-ray shielding function. Explanation is given for i. Laminated plate, ii. Method of containing particles having a heat-ray shielding function in the plastic that constitutes the laminated plate, and iii. Interlayer, in this order.

i. <Laminated Plate>

The laminated plate is the plate for interposing the interlayer from its both sides, and a plate glass or a plate-shaped plastic, are used, which are transparent in the visible light region. In this case, two laminated plates selected from the plate glass and the plate-shaped plastic, include the following combinations: plate glass and the plate glass, plate glass and plastic, and plastic and plastic.

When plastic is used for the laminated plate, the material of the plastic is suitably selected depending on the purpose of use of the heat-ray shielding lamination structure, not particularly limited, and can be selected as needed. For example, when plastic is used for transportation equipment such as automobiles, transparent resin such as polycarbonate resin, acrylic resin, and polyethylene-terephthalate resin is preferable from a viewpoint of ensuring the perspective of a passenger and a driver of the transport equipment. However, other resin such as PET resin, polyamide resin, vinyl chloride resin, olefin resin, epoxy resin, polyimide resin, fluorine resin, etc., can be used.

As the embodiments of the laminated plate, there are the embodiment in which the plate glass or plastic are used as they are (described as "embodiment A" in this specification for the convenience of the explanation), and the embodiment in which the plastic is used by containing therein the particles having the heat-ray shielding function (described as "embodiment B" in this specification for the convenience of the explanation).

ii. <Method of Containing Particles Having a Heat-Ray Shielding Function in the Plastic that Constitutes the Laminated Plate>

In embodiment B, explanation will be given hereafter, for a method of containing particles having a heat-ray shielding function in the plastic that constitutes the laminated plate.

When the particles having the heat-ray shielding function are kneaded into the plastic, the particles having the heat-ray shielding function are mixed therein by heating the plastic up to a temperature in the vicinity of a melting point (around 200 to 300° C.). Then, a mixture of the plastic and the particles having the heat-ay shielding function is formed into a pellet, and can be formed into a film or a sheet, etc., by a desired system, such as extrusion molding, inflation molding, a solution casting method, and a casting method, etc. Thickness of a film or a board, etc., at this time, may be suitably selected according to a purpose of use. There is a variation in the addition amount of the particles having the heat-ray shielding function into the plastic, depending on the thickness of the film and the sheet material, and according to the required optical property and mechanical property. However, 50 pts.wt. % or less to resin is generally preferable.

iii. <Interlayer>

As the embodiment of the interlayer having the heat-ray shielding function, there is an embodiment such that the interlayer is constituted by an intermediate film in which the particles having the heat-ray shielding function are contained (described as "embodiment 1" in this specification for the convenience of the explanation). There is also an embodiment such that the interlayer is constituted of two or more layered intermediate film, at least one layer of them containing the particles having the heat-ray shielding function (described as "embodiment 2" in this specification for the convenience of the explanation). Further, there is also an embodiment such that a heat-ray shielding film is formed, at least one of the plate glass or plastic containing the particles having the heat-ray shielding function in its inner surface, and an intermediate film is overlapped thereon, the intermediate film not containing the particles having the heat-ray shielding function (described as "embodiment 3" in this specification for the convenience of the explanation). Further, there is also an embodiment such that the heat-ray shielding film containing the particles having the heat-ray shielding function is constituted of a heat-ray shielding film substrate formed on one surface or both surfaces of a resin film substrate, or a heat-ray shielding film substrate containing the particles having the heat-ray shielding function, and two or more layered intermediate film not containing the particles having the heat-ray shielding function (described as "embodiment 4" in this specification for the convenience of the explanation). Further, there is also an embodiment such that the heat-ray shield film containing the particles having the heat-ray shielding function is formed on one of the surfaces of the intermediate film not containing the particles having the heat-ray shielding function (described as "embodiment 5" in this specification for the convenience of the explanation). Further, there is also an embodiment such that two laminated plates selected from the plate glass or plastic, are formed so as to interpose the interlayer not containing the particles having the heat-ray shielding function between them, including a lamination body formed by sequentially laminating an adhesive layer, the heat-ray shielding film containing the particles having the heat-ray shielding function, and the peeling layer, so that the adhesive layer is adhered to one of the inner surfaces of the two laminated plates; and the intermediate film not containing the particles having the heat-ray shielding function overlapped on the lamination body at the side of the peeling layer of the lamination body; or two or more layered intermediate film not containing the particles having the heat-ray shielding function (described as "embodiment 6" in this specification for the convenience of the explanation). Further, there is also an embodiment such that the interlayer does not contain the particles having the heat-ray shielding function (described as "embodiment 7" in this specification for the convenience of the explanation).

Note that in the abovementioned "embodiments 3 to 7", the intermediate film not containing the particles having the heat-ray shielding function may be replaced with the intermediate film containing the particles having the heat-ray shielding function.

As the material constituting the intermediate film, synthetic resin is preferable from a viewpoint of the optical property, the mechanical property, and a material cost, and vinyl resin such as polyvinyl acetal resin, etc., is further preferable. Further, from a similar viewpoint, polyvinyl butyral or ethylene-vinyl acetate copolymer is preferable among the vinyl resin.

5. (EMBODIMENT EXAMPLE OF THE HEAT-RAY SHIELDING LAMINATION STRUCTURE)

With reference to FIG. 1 to FIG. 7, explanation will be given for the embodiment of the heat-ray shielding lamination structure of a combination of the abovementioned embodiments A and B of the laminated plate, and each embodiment of embodiments 1 to 7 of the interlayer having the heat-ray shielding function, in a case of using the vinyl resin as the intermediate film. FIG. 1 to FIG. 7 are schematic sectional views of the heat-ray shielding lamination structure of the present invention.

Embodiment A-1

Using the plate glass or plastic not containing the particles having the heat-ray shielding function as the laminated plate, the heat-ray shielding lamination structure in which the interlayer is constituted of the intermediate film containing the particles having the heat-ray shielding function in a dispersed manner, is produced for example as follows.

There is a method of producing the heat-ray shielding lamination structure by adding an addition liquid with particles having the heat-ray shielding function dispersed in a plasticizer, into a vinyl resin, then preparing a vinyl resin composition, and molding the vinyl resin composition into a sheet shape, to thereby obtain a sheet of an intermediate film, and interposing and laminating the sheet of the intermediate film between two laminated plates selected from the plate glass or plastic.

In the above description, explanation is given for an example of dispersing the particles having the heat-ray shielding function in the plasticizer. However, the vinyl resin composition may be prepared by a method of adding into the vinyl resin the dispersion liquid with particles having the heat-ray shielding function dispersed in a suitable solvent which is not the plasticizer, and adding the plasticizer separately.

Thus, the heat-ray shielding lamination structure having high heat-ray shielding property and low haze value, can be produced. Further, this method is capable of producing the heat-ray shielding lamination structure easily at a low production cost.

FIG. 1 shows a sectional view of an example of the heat-ray shielding lamination structure according to the (embodiment A-1). As shown in FIG. 1, the heat-ray shielding lamination structure is configured to interpose the interlayer 2 between two laminated plates 1. The interlayer 2 is constituted of the intermediate film 12 containing particles 11 having the heat-ray shielding function.

Embodiment B-1

The heat-ray shielding lamination structure is configured to form the interlayer by the intermediate film containing the particles having the heat-ray shielding function in a dispersion manner, replacing at least one of the lamination plates with plastic containing the particles having the heat-ray shielding function. Such a heat-ray shielding lamination structure can be produced similarly to (embodiment A-1) excluding a point that at least one of the two plate glasses and the plastic not containing the particles having the heat-ray shielding function, is replaced with the plastic containing the particles having the heat-ray shielding function.

According to the (embodiment B-1), the heat-ray shielding lamination structure with high heat-ray shielding property and low haze value can be produced similarly to (embodiment A-1). According to (embodiment B-1) as well, the heat-ray shielding lamination structure can be produced, with easy production at a low production cost.

Embodiment A-2

A heat-ray shielding lamination structure can be produced as described below, in which a plate glass or a plastic not containing particles having a heat-ray shielding function, is used as a laminated plate, and an interlayer includes two or more layered intermediate film, and the particles having the heat-ray shielding function are contained in at least one layer of the intermediate films in a dispersion manner.

The method of producing the heat-ray shielding lamination structure includes:

adding an addition liquid in which particles having the heat-ray shielding function are dispersed in the plasticizer, into vinyl resin and preparing a vinyl resin composition;

molding the vinyl resin composition into a sheet shape to thereby obtain an intermediate film;

laminating the sheet of the intermediate film on other sheet of the intermediate film not containing the particles having the heat-ray shielding function, or interposing it between two layered sheets of the intermediate films not containing the particles having the heat-ray shielding function; and interposing and laminating the above intermediate films between two laminated plates selected from the plate glass or plastic.

Similarly to (embodiment 1), the vinyl resin composition may also be prepared by a method of adding a dispersion liquid dispersed in a suitable solvent into vinyl resin, and adding a plasticizer separately. Thus, the heat-ray shielding lamination structure having a higher heat-ray shielding property and a low haze value, can be produced at a low production cost.

According to this method, adhesion between the sheet of the intermediate film not containing the particles having the heat-ray shielding function, and two laminated plates selected from the plate glass or plastic, can be increased, and therefore preferably suitable high strength of the heat-ray shielding lamination structure can be obtained.

Further, for example, the following method is also acceptable: a PET film (polyethylene-terephthalate) film is prepared, in which Al film or Ag film, etc., is formed, on at least one surface by sputtering, etc., and the PET film is interposed between the intermediate films to thereby form the interlayer, or a suitable additive agent is added into the sheet of the intermediate film not containing the particles having the heat-ray shielding function. Thus, functions such as UV-cut or adjustment of color tone, etc., may be added by interposing the film or adding the additive agent.

Figure 2:
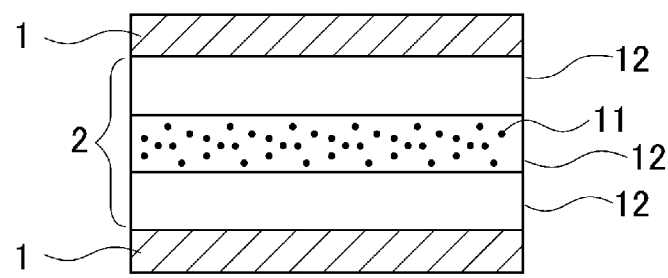
FIG. 2 is a sectional view of an example of a heat-ray shielding lamination structure according to (embodiment (A-2).

FIG. 2 shows a sectional view of an example of the heat-ray shielding lamination structure according to (embodiment A-2). As shown in FIG. 2, the heat-ray shielding lamination structure includes an interlayer 2 interposed by two laminated plates 1. The interlayer is configured to interpose the intermediate film containing particles 11 having the heat-ray shielding function between intermediate films 12 not containing the particles having the heat-ray shielding function.

Embodiment B-2

A heat-ray shielding lamination structure can be produced as described below, in which a plastic containing particles having a heat-ray shielding function, is used as at least one of the laminated plates, and an interlayer includes two or more layered intermediate film, and the particles having the heat-ray shielding function are contained in at least one layer of the intermediate films in a dispersion manner. The heat-ray shielding lamination structure of (embodiment B-2) can be produced similarly to (embodiment A-2) excluding a point that at least one of the two plate glasses and plastic not containing the particles having the heat-ray shielding function, is replaced with plastic containing the particles having the heat-ray shielding function.

Thus, the heat-ray shielding lamination structure having a higher heat-ray shielding property and a low haze value, can be produced at a low production cost.

Similarly to (embodiment A-2), this method is also capable of increasing the adhesion between the sheet of the intermediate film not containing the particles having the heat-ray shielding function, and two laminated plates selected from the plate glass and plastic, and therefore the strength of the heat-ray shielding lamination structure is preferably increased.

Embodiment A-3

A heat-ray shielding lamination structure can be produced as described below. Namely, a plate glass or a plastic containing particles having a heat-ray shielding function is used as a laminated plate, interposing an interlayer having a heat-ray shielding film containing particles having a heat-ray shielding function and formed on an inner surface of at least one of the plate glass and plastic, and an intermediate film not containing the particles having the heat-ray shielding function and overlapped on the heat-ray shielding film.

A suitable binder component (an inorganic binder such as silicate or acrylic, vinyl, and urethane organic binder, etc.,) is mixed into an addition liquid in which particles having the heat-ray shielding function are dispersed in plasticizer or a suitable solvent, to thereby prepare a coating liquid. A heat-ray shielding film is formed on a surface positioned inside of at least one of the plate glass or plastic, using the prepared coating liquid. Next, a resin composition not containing the particles having the heat-ray shielding function is molded into a sheet-shape, to thereby obtain a sheet of an intermediate film, and the sheet of the intermediate film is interposed and laminated between an inner surface side of at least one of the plate glass or plastic on which the heat-ray shielding film is formed, and the other plate glass or plastic on which the heat-ray shielding film is not formed.

Thus, functions such as UV-cut or adjustment of color tone, etc., may be added by adding a suitable additive agent in the sheet of the intermediate film not containing the particles having the heat-ray shielding function.

Figure 3:
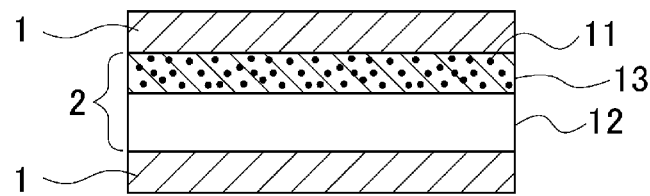
FIG. 3 is a sectional view of an example of a heat-ray shielding lamination structure according to (embodiment (A-3).

FIG. 3 shows a sectional view of an example of the heat-ray shielding lamination structure of (embodiment A-3). As shown in FIG. 3, the heat-ray shielding lamination structure of embodiment A-3 is configured to interpose the intermediate film 12 not containing the particles having the heat-ray shielding function, between a laminated plate 1 on which a heat-ray shielding film 13 containing particles 11 having the heat-ray shielding function is formed, and a laminated plate 1 on which the heat-ray shielding film 13 is not formed. The interlayer 2 is constituted of the intermediate film not containing the particles having the heat-ray shielding function, and the heat-ray shielding film 13 containing the particles 11 having the heat-ray shielding function formed on the laminated plate.

Embodiment B-3

A heat-ray shielding lamination structure can be produced as described below. Namely, a plastic containing particles having a heat-ray shielding function is used as at least one of the laminated plates which interpose an interlayer including a heat-ray shielding film containing particles having a heat-ray shielding function and formed on an inner surface of at least one of the plate glass or plastic, and including an intermediate film not containing the particles having the heat-ray shielding function and overlapped on the heat-ray shielding film, similarly to (embodiment A-3) excluding a point that at least one of the two plate glasses and plastic not containing the particles having the heat-ray shielding function, is replaced with plastic containing the particles having the heat-ray shielding function.

Further, functions such as UV-cut or adjustment of color tone, etc., may be added by adding a suitable additive agent in the sheet of the intermediate film not containing the particles having the heat-ray shielding function.

Embodiment A-4

A heat-ray shielding lamination structure can be produced as described below. Namely, a plate glass or a plastic not containing particles having a heat-ray shielding function is used as a laminated plate interposing an interlayer including a heat-ray shielding film substrate on which a heat-ray shielding film containing particles having the heat-ray shielding function is formed, or a heat-ray shielding film substrate containing inside the particles having the heat-ray shielding function formed on one surface or both surfaces of the resin film substrate, or two or more layered intermediate film not containing the particles having the heat-ray shielding function.

(a) Explanation is given for a case that the interlayer includes the heat-ray shielding film substrate on which the heat-ray shielding film is formed on one surface of the resin film, containing the particles having the heat-ray shielding function, or two or more layered intermediate film not containing the particles having the heat-ray spieling function.

For example, the heat-ray shielding film is formed on one surface of the resin film, by using a coating liquid in which the particles having the heat-ray shielding function are dispersed in the plasticizer or a suitable solvent, or a coating liquid prepared by mixing a suitable binder component (an inorganic binder such as silicate, or an organic binder such as acryl, urethane, vinyl, etc.,) into the addition liquid. The resin film used here is not particularly limited, if it is transparent. For example, polyethylene-terephthalate (PET), polycarbonate (PC), polyethylene naphthalate, polyimide, aramid, polyphenylene sulfide, polyamide imide, polyether ether ketone, and polyether sulfone, etc., can be given. When the heat-ray shielding film is formed on one surface of the resin film substrate, surface treatment may be previously applied to the surface of the resin film for the purpose of improving a binding property to binder resin, such as a corona treatment, a plasma treatment, a flame treatment, and a primer layer coating treatment, etc. Next, the vinyl resin composition not containing the particles having the heat-ray shielding function is molded into a sheet-shape, to thereby obtain the sheet of the intermediate film. Preferably, two sheets of the intermediate film are used, so that the heat-ray shielding resin film substrate having the heat-ray shielding film formed on its one surface, is arranged between these sheets of the intermediate film as the interlayer. This is because by employing this structure, it is possible to avoid a problem regarding the adhesion between the resin film substrate having the heat-ray shielding film formed on its one surface, and the laminated plate. It is a matter of course here that the particles having the heat-ray shielding function and a suitable additive agent having effects such as UV-cut and adjustment of color tone, etc., may be contained in one layer of the two or more layered intermediate film not containing the particles having the heat-ray shielding function.

(b) Explanation is given for a case that the interlayer includes the heat-ray shielding film substrate containing the particles having the heat-ray shielding function inside of the film substrate, and two or more layered intermediate film not containing the particles having the heat-ray shielding function.

The heat-ray shielding film substrate containing the particles having the heat-ray shielding function inside of the film substrate, can be prepared by the following method. Resin is heated at a temperature in the vicinity of its melting point (around 200 to 300° C.) and is mixed to the particles having the heat-ray shielding function. Further, the mixture of the resin and the particles having the heat-ray shielding function is formed into a pellet, to thereby form a film or a board, etc., by a desired system, such as extrusion molding, inflation molding, a solution casting method, and a casting method, etc. Thickness of a film or a board, etc., at this time, may be suitably selected according to a purpose of use. There is a variation in the amount of the particles having the heat-ray shielding function added into the resin, depending on the thickness of the film and required optical property and mechanical property. However, 50 pts.wt. % or less to resin is generally preferable. Next, the vinyl resin composition not containing the particles having the heat-ray shielding function is molded into a sheet-shape, to thereby obtain the sheet of the intermediate film. The resin film containing the particles having the heat-ray shielding function is arranged between these two sheets of the intermediate film as the interlayer. There is a method of producing the heat-ray shielding lamination structure by interposing and laminating the interlayer between two laminated plates selected from the plate glass or plastic. It is a matter of course here that the particles having the heat-ray shielding function may be contained in one layer of the two or more layered intermediate film not containing the particles having the heat-ray shielding function.

Further, a suitable additive agent having effects such as UV-cut and adjustment of color tone, etc., can be freely and easily added into the intermediate film not containing the particles having the heat-ray shielding function, and the heat-ray shielding lamination structure having various functions can be obtained.

Further, functions such as UV-cut or adjustment of color tone, etc., may be added by adding a suitable additive agent in the sheet of the intermediate film not containing the particles having the heat-ray shielding function.

Figure 4:
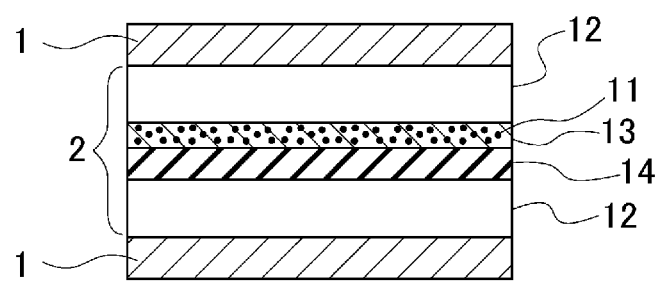
FIG. 4 is a sectional view of an example of a heat-ray shielding lamination structure according to (embodiment (A-4(a)).

FIG. 4 is a sectional view of an example of the heat-ray shielding lamination structure of (embodiment A-4(a)). As shown in FIG. 4, in the heat-ray shielding lamination structure of (embodiment A-4(a)), the interlayer 2 is interposed between two laminated plates 1. The interlayer 2 includes the heat-ray shielding film containing the particles 11 having the heat-ray shielding function formed on the resin film 14, and the lamination body of the resin film and the heat-ray shielding film is interposed between the intermediate films 12 not containing the particles having the heat-ray shielding function.

Figure 5:
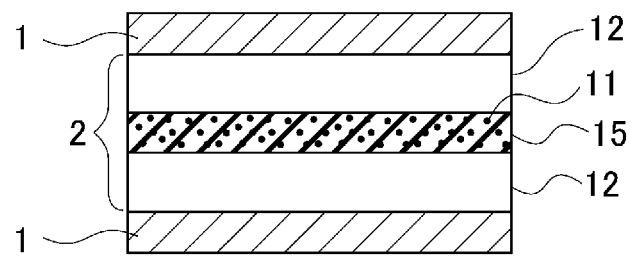
FIG. 5 is a sectional view of an example of a heat-ray shielding lamination structure according to (embodiment (A-4(b)).

FIG. 5 is a sectional view of an example of the heat-ray shielding lamination structure of (embodiment A-4(b)). As shown in FIG. 5, in the heat-ray shielding lamination structure of (embodiment A-4(b)), the interlayer 2 is interposed between two laminated plates 1. The interlayer 2 is configured so that a resin film containing the particles 11 having the heat-ray shielding function is interposed between the intermediate films 12 not containing the particles having the heat-ray shielding function.

Embodiment B-4

A heat-ray shielding lamination structure can be produced as described below. Namely, a plastic containing particles having a heat-ray shielding function, is used as at least one of the laminated plates interposing an interlayer having a heat-ray shielding film substrate on which a heat-ray shielding film containing the particles having the heat-ray shielding function is formed on one surface of a resin film substrate, or two or more layered intermediate film not containing the particles having the heat-ray shielding function, or interposing an interlayer including the heat-ray shielding film substrate containing the particles having the heat-ray shielding function inside of the film substrate, or two or more layered intermediate film not containing the particles having the heat-ray shielding function, similarly to (embodiment A-4), excluding a point that at least one of the two plate glasses and the plastic not containing the particles having the heat-ray shielding function is replaced with the plastic containing the particles having the heat-ray shielding function.

Further, functions such as UV-cut or adjustment of color tone, etc., may be added by adding a suitable additive agent in the sheet of the intermediate film not containing the particles having the heat-ray shielding function.

Embodiment A-5

A heat-ray shielding lamination structure can be produced as described below. Namely, a plate glass or a plastic not containing particles having a heat-ray shielding function, is used as a laminated plate, interposing an interlayer including a heat-ray shielding film containing the particles having the heat-ray shielding function on one surface of the intermediate film not containing the particles having the heat-ray shielding function.

A suitable binder component (an inorganic binder such as silicate, and an organic binder such as acryl, vinyl, urethane, etc.) is mixed into an addition liquid in which particles having the heat-ray shielding function are dispersed in plasticizer or a suitable solvent, to thereby prepare a coating liquid. The coating liquid is applied on one surface of the sheet of the intermediate film which is obtained by molding the resin composition not containing the particles having the heat-ray shielding function into a sheet shape, to thereby form a heat-ray shielding film. Next, the intermediate film having the heat-ray shielding film formed thereon, is interposed and laminated between two laminated plates selected from the plate glass or plastic, to thereby form the heat-ray shielding lamination structure.

According to this method, the film containing the particles having the heat-ray shielding function is formed on the surface of the sheet of the intermediate film not containing the particles having the heat-ray shielding function, and therefore an additive agent such as a filler, etc., can be added as needed, to the particles having the heat-ray shielding function, and the heat-ray shielding property can be improved. Thus, the heat-ray shielding lamination structure having high heat-ray shielding property and low haze value, can be produced, at a low production cost.

Embodiment B-5

A heat-ray shielding lamination structure in which a plastic containing particles having a heat-ray shielding function, is used as at least one of the laminated plates, and an interlayer includes a heat-ray shielding film formed thereon, containing the particles having the heat-ray shielding function on at least one surface of the intermediate films not containing the particles having the heat-ray shielding function, can be produced similarly to (embodiment A-5) excluding a point that at least one of the two plate glasses and the plastic not containing the particles having the heat-ray shielding function is replaced with the plastic containing the particles having the heat-ray shielding function.

According to this method as well, the film containing the particles having the heat-ray shielding function is formed on the surface of the sheet of the intermediate film not containing the particles having the heat-ray shielding function, and therefore an additive agent such as a filler, etc., can be added as needed, to the particles having the heat-ray shielding function, and the heat-ray shielding property can be improved. Thus, the heat-ray shielding lamination structure having high heat-ray shielding property and low haze value, can be produced, at a low production cost.

Embodiment A-6

A heat-ray shielding lamination structure can be produced as described below. Namely, a plate glass or a plastic not containing particles having a heat-ray shielding function is used as a laminated plate, interposing an interlayer having a lamination body of the adhesive layer, a heat-ray shielding film containing the particles having the heat-ray shielding function, and a peeling layer in this order, on an inner surface of one of the two laminated plates selected from the plate glass or plastic so that the adhesive layer is adhered thereto, and an intermediate film not containing the particles having the heat-ray shielding function and overlapped on the lamination body at the peeling layer side of the lamination body, or two or more layered intermediate film not containing the particles having the heat-ray shielding function. (Namely, the heat-ray shielding lamination structure is configured as follows: "one of the laminated plates/adhesive layer/heat-ray shielding film containing particles having a heat-ray shielding function/peeling layer/intermediate film or two or more layered intermediate film/the other laminated plate"). For example, the heat-ray shielding lamination structure of (embodiment A-6) is produced as follows. The steps are described using FIG. 6(A) to FIG. 6(C). FIG. 6(A) to FIG. 6(C) show a sectional view of the production steps according to an example of the heat-ray shielding lamination structure of (embodiment A-6).

First, as shown in FIG. 6(A), the peeling layer 16 (for example, wax, acrylic resin, and polyvinyl acetal represented by polyvinyl butyral) is formed on one surface of a film sheet 17 (for example, a synthetic resin film such as polyester, polypropylene, polyethylene, polyethylene-terephthalate, polycarbonate, polyimide, and fluorine resins, paper, or cellophane, etc.), and a heat-ray shielding film 13 containing the particles 11 having the heat-ray shielding function is formed on the peeling layer 16, and an adhesive layer 18 (for example, polyvinyl acetal represented by polyvinyl butyral, polyvinyl chloride, vinyl chloride-ethylene copolymer, vinyl chloride-ethylene-glycidyl methacrylate copolymer, vinyl chloride-ethylene-glycidyl acrylate copolymer, polyvinylidene chloride, vinylidene chloride-acrylonitrile copolymer, polyamide, poly methacrylic acid ester, and acrylic acid ester copolymer, etc.) is formed on the heat-ray shielding film, to thereby obtain a lamination body and a transfer film 19.

The adhesive layer 18 of this transfer film 19 is adhered to the inner surface of one of the plate glass or plastic under pressure, and thereafter the film sheet 17 is peeled-off from the transfer film. Then, only the film sheet 17 is peeled-off from the lamination body due to the effect of the peeling layer 16. FIG. 6(B) shows this state.

Figure 6:
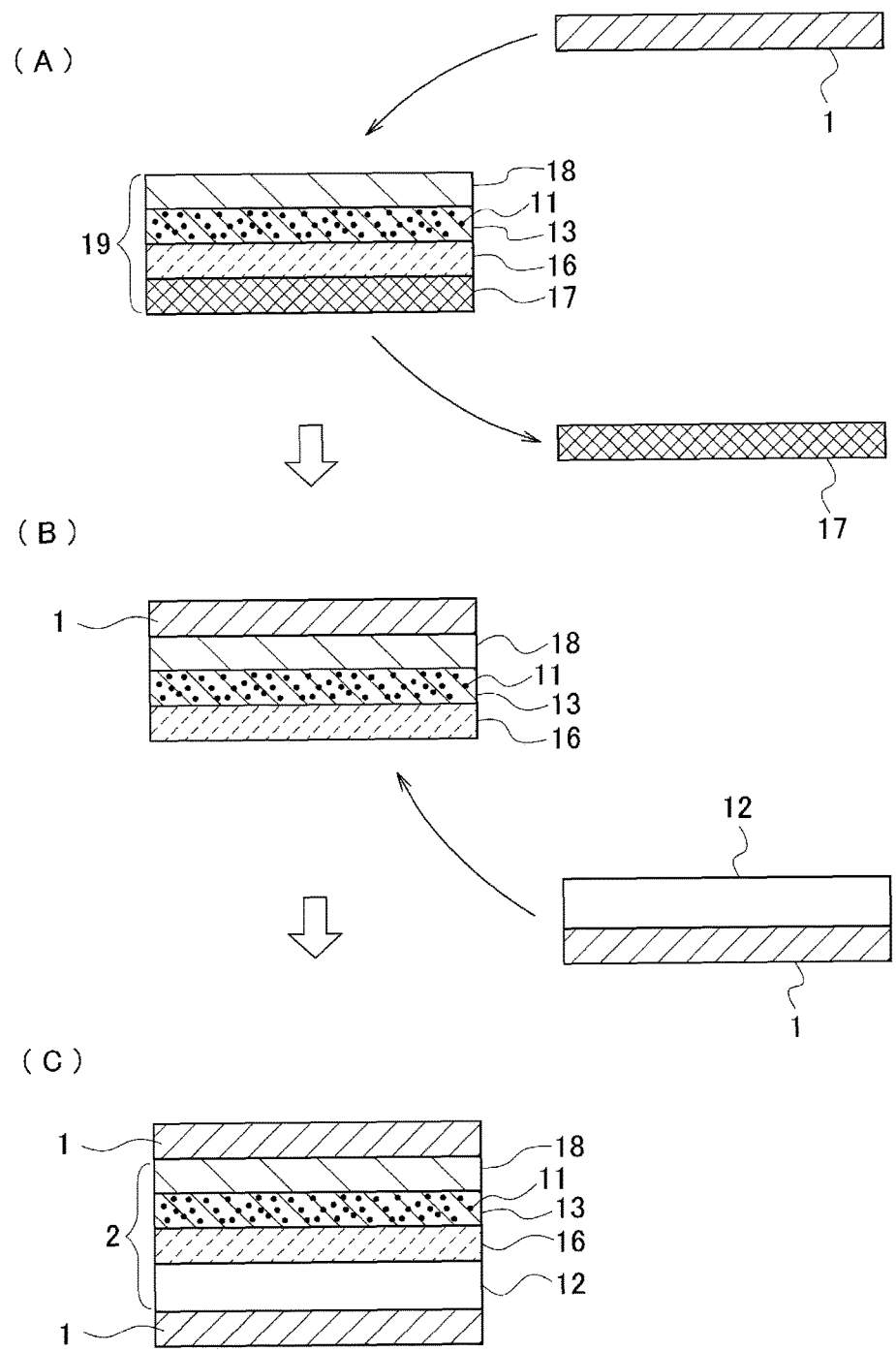
FIG. 6 is a sectional view of an example of producing steps of a heat-ray shielding lamination structure according to (embodiment (A-6).

After peeling-off the film sheet 17, the transfer film is adhered to the inner surface of the laminated plates 1 of another plate glass or the plastic, through the intermediate film 12 not containing the particles having the heat-ray shielding function or two or more layered intermediate film not containing the particles having the heat-ray shielding function, to thereby obtain the heat-ray shielding lamination structure. The method thereof is shown in FIG. 6 (C).

As a result, FIG. 6(C) shows an example of the heat-ray shielding lamination structure according to (embodiment A-6), and as shown in FIG. 6(C), the interlayer 2 is interposed between two laminated plates 1. Then, the interlayer 2 is constituted of the intermediate film and the peeling layer 16 not containing the particles having the heat-ray shielding function, or the heat-ray shielding film 13 and the adhesive layer containing the particles 11 having the heat-ray shielding function.

According to this method, the heat-ray shielding film having a small film thickness can be easily produced, and by adding a suitable additive agent to the intermediate film not containing the particles having the heat-ray shielding function, the peeling layer, and the adhesive layer, functions such as UV-cut or adjustment of color tone, etc., can be exhibited.

Embodiment B-6

A heat-ray shielding lamination structure can be produced as described below, in which a plastic containing particles having a heat-ray shielding function is used as at least one of the laminated plates, and an interlayer includes a lamination body of the adhesive layer, a heat-ray shielding film containing the particles having the heat-ray shielding function, and a peeling layer in this order, on an inner surface of the two laminated plates selected from the plate glass or plastic so that the adhesive layer is adhered thereto, and an intermediate film not containing the particles having the heat-ray shielding function and overlapped on the lamination body at the peeling layer of the lamination body, and two or more layered intermediate film not containing the particles having the heat-ray shielding function. Namely, the heat-ray shielding lamination structure is configured as follows: "one of the laminated plates/adhesive layer/heat-ray shielding film containing particles having a heat-ray shielding function/peeling layer/intermediate film or two or more layered intermediate film/the other laminated plate". Therefore, the heat-ray shielding lamination structure of (embodiment B-6) can be produced similarly to (embodiment A-6) excluding a point that at least one of the two plate glasses and the plastic not containing the particles having the heat-ray shielding function is replaced with the plastic containing the particles having the heat-ray shielding function.

By this method as well, the heat-ray shielding film having a small film thickness can be easily produced. Further, by adding a suitable additive agent to the intermediate film, the peeling layer, and the adhesive layer, not containing the particles having the heat-ray shielding function, functions such as UV-cut or adjustment of color tone, etc., can be exhibited.

Embodiment B-7

A heat-ray shielding lamination structure can be produced as described below. Namely, a plastic containing particles having a heat-ray shielding function, is used as at least one of the laminated plates, and an interlayer includes a heat-ray shielding film formed thereon not containing the particles having the heat-ray shielding function, for example includes the intermediate film formed thereon containing vinyl resin. Namely, plasticizer is added into the vinyl resin, and vinyl resin composition is prepared, and the vinyl resin composition is molded into a sheet shape, to thereby obtain a sheet of an intermediate film. The plastic containing the particles having the heat-ray shielding function may be used as at least one of the laminated plates of the sheet of the intermediate film, and the glass plate and the plastic may be used as the other laminated plate.

By this method, the heat-ray shielding lamination structure having a high heat-ray shielding property and a low haze value can be produced. Further, this method is capable of producing the heat-ray shielding lamination structure easily at a low production cost.

Thus, functions such as UV-cut or adjustment of color tone, etc., may be added by adding a suitable additive agent in the intermediate film and/or the other plastic of the laminate plate not containing the particles having the heat-ray shielding function.

Figure 7:
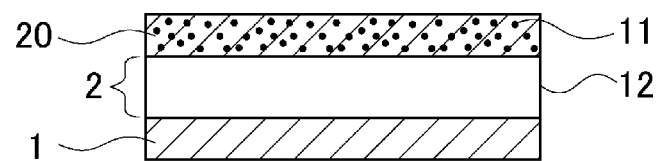
FIG. 7 is a sectional view of an example of a heat-ray shielding lamination structure according to (embodiment B-7).

FIG. 7 shows a sectional view of an example of the heat-ray shielding lamination structure according to (embodiment B-7). As shown in FIG. 7, in the heat-ray shielding lamination structure, the interlayer 2 is interposed between the laminated plate 20 containing the particles 11 having the heat-ray shielding function, and the laminated plate 1 not containing the particles 11. The interlayer 2 includes the intermediate film 12 not containing the particles having the heat-ray shielding function.

6. (METHOD OF PRODUCING THE HEAT-RAY SHIELDING LAMINATION STRUCTURE)

Explanation is given for the method of producing the heat-ray shielding lamination structure in an order of: i. Addition liquid or coating liquid used for producing the heat-ray shielding lamination structure, ii. Plasticizer used for the heat-ray shielding lamination structure, iii. A sheet of an intermediate film used for the heat-ray shielding lamination structure, iv. Method of forming the sheet of the intermediate film, v. Other additive agent, and vi. Method of producing the addition liquid or the coating liquid used for producing the heat-ray shielding lamination structure.

i. <Addition Liquid or Coating Liquid Used for Producing the Heat-Ray Shielding Lamination Structure>

An arbitrary method can be used as the method of dispersing the particles having the heat-ray shielding function in plasticizer or a suitable solvent, if it is the method capable of uniformly dispersing the particles in the plasticizer or the suitable solvent. For example, there are methods such as beads mill, ball mill, sand mill, and ultrasonic dispersion, etc., and by uniformly dispersing the particles in the plasticizer or the suitable solvent, the addition liquid or the coating liquid used for producing the heat-ray shielding lamination structure of the present invention can be prepared.

The solvent used for dispersing the particles having the heat-ray shielding function is not particularly limited, and can be suitably selected according to conditions for forming the heat-ray shielding film and the vinyl resin, etc., which is mixed for preparing the vinyl resin composition. For example, water, and each kind of organic solvents including alcohols such as ethanol, propanol, butanol, isopropyl alcohol, isobutyl alcohol, and diacetone alcohol, etc., ethers such as methyl ether, ethyl ether, propyl ether, esters, and ketones such as actone, methyl ethyl ketone, diethyl ketone, cyclohexanone, and isobutyl ketone, etc., can be used. Further, pH may be adjusted as needed by adding alkali. Also, in order to further improve a dispersion stability of the particles in the coating liquid, each kind of surfactant and coupling agent, etc., may be added.

ii. <Plasticizer Used for the Heat-Ray Shielding Lamination Structure>

The plasticizer used for the heat-ray shielding lamination structure mainly composed of the vinyl resin of the present invention includes the plasticizer as a compound of a monohydric alcohol and an organic acid ester, ester-based plasticizer such as polyhydric alcohol organic acid ester compound, etc., and a phosphoric acid-based plasticizer such as an organic phosphoric acid-based plasticizer, etc. Each plasticizer is preferably in a liquid state at a room temperature. Particularly, the plasticizer as an ester compound synthesized from the polyhydric alcohol and fatty acid is preferable.

The ester compound synthesized from the polyhydric alcohol and the fatty acid is not particularly limited. For example, a glycol-based ester compound can be given, which is obtained by a reaction between glycols such as triethylene glycol, tetraethylene glycol, tripropylene glycol, and monobasic organic acid such as butyric acid, isobutyric acid, caproic acid, 2-ethyl butyrate, heptyl acid, n-octyl acid, 2-ethylhexyl acid, pelargonic acid (n-nonyl acid), and decyl acid, etc. Further, an ester compound, etc., of tetraethylene glycol, tripropylene glycol, and the abovementioned monobasic organic acid, can also be given.

Above all, fatty acid ester of triethylene glycol such as triethylene glycol dihexanate, triethylene glycol di-2-ethylbutyrate, triethylene glycol di-okutanate, and triethyleneglycol di-2-ethylhexanate, etc., can be suitably used. The fatty acid ester of triethylene glycol has compatibility with polyvinyl acetal and cold resistance in a balanced manner, and has excellent processability and economic efficiency.

In selecting the plasticizer, attention should be paid to hydrolyzability. From this viewpoint, triethylene glycol di-2-ethylhexanate, triethylene glycol di-2-ethylbutylate, tetraethylene glycol di-2-ethylhexanate are preferable.

iii. <Sheet of an Intermediate Film Used for the Heat-Ray Shielding Lamination Structure>

As the vinyl resin used for the sheet of the intermediate film in the heat-ray shielding lamination structure of the present invention, for example, polyvinylacetal represented by polyvinyl butyral, polyvinyl chloride, vinyl chloride-ethylene copolymer, vinyl chloride-ethylene-glycidyl methacrylate copolymer, vinyl chloride-ethylene-glycidyl acrylate copolymer, vinyl chloride-glycidyl methacrylate copolymer, vinyl chloride-glycidyl acrylate copolymer, polyvinylidene chloride, vinylidene chloride-acrylonitrile copolymer, polyvinyl acetate ethylene-vinyl acetate copolymer, ethylene-vinyl acetate copolymer, and polyvinyl acetal-polyvinyl butyral mixture, etc., can be given. Polyvinyl acetal represented by polyvinyl butyral and ethylene-vinyl acetate copolymer is particularly preferable.

iv. <Method of Producing the Addition Liquid or the Coating Liquid Used for Producing the Heat-Ray Shielding Lamination Structure>

A publicly-known method is used for the method of forming the sheet of the intermediate film containing the particles having the heat-ray shielding function, or the sheet of the intermediate film not containing the particles having the heat-ray shielding function. For example, a calender roll method, an extrusion method, a casting method, and an inflation method, etc., can be used. Particularly, the abovementioned vinyl resin composition is formed by adding into the vinyl resin the addition liquid in which the particles having the heat-ray shielding function are dispersed in the plasticizer, and the mixture is kneaded so that the particles are uniformly dispersed, and the vinyl resin composition thus obtained can be molded into the sheet-shape. When the vinyl resin composition is molded into the sheet-shape, a thermal stabilizer, an antioxidant, and an ultraviolet shielding material, etc., may be mixed therein as needed.

Further, an adhesive force adjusting agent may be mixed for penetration control of the sheet. The adhesive force adjusting agent is not particularly limited, and alkali metal salts and/or alkaline earth metal salts are suitably used. Acid constituting the metal salt is not particularly limited, and for example, carboxylic acid such as octyl acid, hexyl acid, butyric acid, acetic acid, and formic acid, or inorganic acid such as hydrochloric acid and nitric acid, etc., can be given. Among the alkali metal salts and/or alkaline earth metal salts, carboxylic acid magnesium salt of 2 to 16 carbon atoms, and carboxylic acid potassium salt of 2 to 16 carbon atoms are preferable.

The carboxylic acid magnesium salt and potassium salt as organic acid of 2 to 16 carbon atoms are not particularly limited, and for example magnesium acetate, potassium acetate, magnesium propionate, potassium propionate, 2-ethylbutanoic acid magnesium, 2-ethylbutanoic acid potassium, 2-ethylhexanoate magnesium, and 2-ethylhexanoate potassium, etc., are suitably used.

These adhesive force adjusting agents may be used alone, or two or more kinds of them may be used together.

When the carboxylic acid salts such as sodium, potassium, magnesium, calcium, and cerium are used as the adhesive force adjusting agent, both of the action as an original adhesive force adjusting agent, and the action of improving the weather resistance of the composite tungsten oxide particles, can be exhibited.

Further, the method of producing the lamination structure of the present invention is not limited, if it is the method employing the abovementioned lamination structure.

v. <Other Additive Agent>

A general additive agent can also be blended into the heat-ray shielding film of the present invention as needed. For example, die or pigment generally utilized for coloring a thermoplastic resin such as azo dye, cyanine dye, quinolones dye, perylene die, and carbon black, may also be added, to thereby impart an arbitrary color tone as needed.

Further, hindered phenol-based or phosphor-based stabilizers as ultraviolet absorbers, a release agent, hydroxybenzophenon, salicylic acid, HALS, triazole, triazine based organic UV, inorganic ultraviolet absorbers such as zinc oxide, titanium oxide, and cerium oxide, may also be added.

Further, coupling agents, surfactants, antistatic agents, stabilizers, antioxidants, etc., can also be used as additives.

vi. <Method of Producing the Addition Liquid or the Coating Liquid Used for Producing the Heat-Ray Shielding Lamination Structure>

Explanation is given for a method of producing a dispersion liquid for forming a heat-ray shielding body, which is used for the addition liquid or the coting liquid used for producing the heat-ray shielding lamination structure.

The dispersion liquid for forming the heat-ray shielding body of the present invention contains a solvent and particles having a heat-ray shielding function, with the particles having the heat-ray shielding function dispersed in the solvent. A method of dispersing the particles in the solvent is not particularly limited, if it is the method capable of uniformly dispersing the particles, and for example pulverization/dispersion processing methods such as bead mill, ball mill, sand mill, paint shaker, and ultrasonic homogenizer, can be used. By such a dispersion processing using these devices, particles can be further finer by being dispersed into the solvent of the particles and simultaneously collision, etc., that occurs among the particles, so that the particles can be dispersed in further finer state (namely, the particles are pulverized and dispersed).

Further, the dispersion liquid for forming the heat-ray shielding body can be configured to contain an inorganic binder and/or a resin binder. The kinds of the inorganic binder and the resin binder are not particularly limited. For example, metal alkoxides such as silicon, zirconium, titanium, or aluminum and a partially hydrolyzed condensation polymerization of them or organosilazane can be used as the inorganic binder, and thermoplastic resin such as acrylic resin, and thermosetting resin such as epoxy resin can be used as the resin binder. Also, in the dispersion liquid for forming the heat-ray shielding body, the solvent for dispersing the particles is not particularly limited, and may be suitably selected according to a coating/kneading condition, a coating/kneading environment, and a binder when containing the inorganic binder and the resin binder.

As the solvent, for example, water, each kind of organic solvents including alcohols such as ethanol, propanol, butanol, isopropyl alcohol, isobutyl alcohol, and diacetone alcohol, etc., ethers such as methyl ether, ethyl ether, propyl ether, esters, and ketones such as actone, methyl ethyl ketone, diethyl ketone, cyclohexanone, and isobutyl ketone, etc., can be used. Further, pH may be adjusted as needed by adding alkali. Also, in order to further improve a dispersion stability of the particles in the coating liquid, each kind of surfactant and coupling agent, etc., may be added.

In addition, when the particles are directly dispersed into the resin binder, there is no necessity for vaporizing the solvent after coating the surface of a medium, which is industrially and environmentally preferable.

A method of coating the surface of a substrate is not particularly limited, if it is the method capable of uniformly coating the surface, and for example, bar coating, gravure coating, spray coating, dip coating, flow coating, spin coating, roll coating, screen printing, and blade coating, etc., can be used. A layer containing the composite tungsten oxide particles and ultraviolet absorbing oxide particles formed by these coating methods, efficiently absorbs the light particularly in an ultraviolet region and a near-infrared region, and simultaneously allows a light in a visible light region to pass therethrough even if an interference effect of light is not used, compared with a case of using a dry-system such as sputtering, vapor deposition, ion plating, a chemical vapor deposition, or a spraying-system for producing the abovementioned layer.

As the resin used for the abovementioned medium and substrate, for example, resins such as ultraviolet curing resin, thermosetting resin, electron beam curable resin, cold-curing resin, or thermoplastic resin, can be selected according to the purpose of use.

Further, when metal alkoxides such as silicon, zirconium, titanium, or aluminum alkoxides and its hydrolysis polymer are contained in the dispersion liquid for forming the heat-ray shielding body as the inorganic binder, a polymerization reaction of the alkoxide or its hydrolysis polymer contained in a coating film can be almost completed, by setting a heating temperature to 100° C. or more for heating the substrate after coating of the dispersion liquid. By almost completing the polymerization reaction, the following situation can be avoided: namely, water or the organic solvent is remained in a film, to thereby cause a reduction of a transmittance of a visible light through the film after heating. Therefore, 100° C. or more of the heating temperature is preferable, and a further preferable temperature is a boiling point or more of the solvent in the dispersion liquid.

When the dispersion liquid for forming the heat-ray shielding body does not contain the resin binder or the inorganic binder, a coating film obtained on a transparent substrate has a film structure in which only the particles of the tungsten oxide are deposited. Such a coating film shows the heat-ray shielding property as it is. However, a multi-layer film may also be acceptable by further forming a coating film thereon by coating the film with the inorganic binder such as metal alkoxides of silicon, zirconium, titanium, or aluminum, and a partially hydrolyzed condensation polymerization of them, or the coating liquid containing the resin binder. With this structure, the film is formed by filling the gaps with the coating liquid component, the gaps being formed by deposition of the tungsten oxide particles on a first layer, and therefore haze of the film is reduced, the transmittance of the visible light is improved, and particle binding property to the substrate is improved.

7. (CONCLUSION)

As described above, the heat-ray shielding lamination structure of the present invention has an absorption power of the near-infrared ray of the solar light by adding one or more kinds of metal salts of carboxylic acids, metal carbonate, metal hydroxides carbonates, and metal hydroxides, in the composite tungsten oxide particles, and can be produced at a low cost by a simple method, and is capable of suppressing aging reduction (deterioration) of the visible light transmittance, the reduction of the near-infrared ray absorbing function, change of color tone, and increase of the haze value, thus exhibiting excellent optical property and excellent weather resistance even in a case of a long time use, by containing one or more kinds of metal salts of carboxylic acids, metal carbonate, metal hydroxides carbonates, and metal hydroxides.

Further, even in a case of using the vinyl resin such as polyvinyl acetal resin, etc., as a main component of the intermediate film in the heat-ray shielding lamination structure of the present invention, excellent optical property and excellent weather resistance can be exhibited.

As a result, the heat-ray shielding lamination structure of the present invention can be used for various purposes of use, for example, the use for vehicle window materials such as automobile inserted glass, side glass and rear glass, and door glass, window glass, and interior door glass of railway vehicles, window glass and interior door glass of buildings, and window materials for buildings such as show window and other indoor exhibition show case.

EXAMPLES

The present invention will be described in detail hereafter, using examples and comparative examples. However, the present invention is not limited to the following examples.

In these examples, visible light transmittance and a solar light transmittance were measured by a transmittance of a light with a wavelength of 200 to 2500 nm using a spectrophotometer manufactured by Hitachi Ltd., and calculated according to JIS R 3106. Note that the solar light transmittance is the index indicating the heat-ray shielding property of the heat-ray shielding lamination structure.

The haze value of the film was measured based on JIS K 7105, using HM-150 manufactured by Murakami Color Research Laboratory Co., Ltd.

An acceleration test was carried out by irradiating the heat-ray shielding lamination structure of each example with UV-rays at 100 mw/cm$^2$ for 2 hours, and the variation of optical properties in a case of a long time use of the heat-ray shielding lamination structure was evaluated by measuring the variation rate of transmittance of the visible light and the variation of the haze value before/after the acceleration test.

Example 1

20 pts.wt. of $Cs_{0.33}WO_3$ particles (specific surface area: 20 m$^2$/g), 2 pts.wt. of manganese acetate, 68 pts.wt. of 4-methyl-2-pentanon, and 10 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersion particle size of 80 nm, and manganese acetate (Liquid A1).

The Liquid A1, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was cured by heating at 130° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 1 of example 1. Optical properties of the prepared structure 1 are shown in table 1.

Regarding the prepared structure 1 as a test sample, the variation of transmittance of a visible light and variation of a haze value were measured using an ultraviolet irradiation device after irradiation of UV-rays for 2 hours. Results are shown in table 1.

Further, table 1 shows the results obtained by the following examples 2 to 15, table 2 shows the results obtained by the following examples 16 to 30, table 3 shows the results obtained by the following examples 31 to 38, and the results obtained by comparative examples 1 to 4.

Example 2

20 pts.wt. of $Rb_{0.33}WO_3$ particles (specific surface area: 20 m$^2$/g), 2 pts.wt. of manganese acetate, 68 pts.wt. of 4-methyl-2-pentanon, and 10 pts.wt. pf a dispersant for dispersing particles, were mixed, and a mixture was subjected to dispersion treatment by a medium stirring mill, to thereby prepare a dispersion liquid of $Rb_{0.33}WO_3$ particles having an average dispersion particle size of 80 nm, and manganese acetate (Liquid B1).

The liquid B1, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was cured by heating at 130° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 2 of example 2. Optical properties of the prepared structure 2 are shown in table 1.

Regarding the prepared structure 2 as a test sample, the variation of transmittance of a visible light and variation of a haze value were measured using an ultraviolet irradiation device, after irradiation of UV-rays for 2 hours. Results are shown in table 1.

Example 3

20 pts.wt. pf $K_{0.33}WO_3$ particles (specific surface area: 20 m$^2$/g), 1 pts.wt. of manganese acetate, 69 pts.wt. of 4-methyl-2-pentanon, and 10 pts.wt. pf a dispersant for dispersing particles, were mixed, and a mixture was subjected to dispersion treatment by a medium stirring mill, to thereby prepare a dispersion liquid of $K_{0.33}WO_3$ particles having an average dispersion particle size of 80 nm, and manganese acetate (Liquid C1).

The liquid C1, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was sintered at 120° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 3 of example 3. Optical properties of the prepared structure 3 are shown in table 1.

Regarding the prepared structure 3 as a test sample, the variation of transmittance of a visible light and variation of a haze value were measured using an ultraviolet irradiation device, after irradiation of UV-rays for 2 hours. Results are shown in table 1.

Example 4

20 pts.wt. of $Tl_{0.33}WO_3$ particles (specific surface area: 20 m$^2$/g), 0.6 pts.wt. of manganese acetate, 69.4 pts.wt. of 4-methyl-2-pentanon, and 10 pts.wt. of a dispersant for dispersing particles, were mixed, and a mixture was subjected to dispersion treatment by a medium stirring mill, to thereby prepare a dispersion liquid of $Tl_{0.33}WO_3$ particles having an average dispersion particle size of 80 nm, and manganese acetate (Liquid D1).

The liquid D1, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was dried at 70° C. for 2 minutes to evaporate a solvent and thereafter was cured by a high-pressure mercury lamp, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 4 of example 4. Optical properties of the prepared structure 4 are shown in table 1.

Regarding the prepared structure 4 as a test sample, the variation of transmittance of a visible light and variation of a haze value were measured using an ultraviolet irradiation device, after irradiation of UV-rays for 2 hours. Results are shown in table 1.

Example 5

A heat-ray shielding lamination structure 5 of example 5 was obtained similarly to example 1, excluding a point that manganese acetate was replaced with manganese stearate as metal salt of carboxylic acids. Optical properties of the prepared structure 5 are shown in table 1.

Regarding the prepared structure 5 as a test sample, the variation of transmittance of a visible light and variation of a haze value were measured using an ultraviolet irradiation device after irradiation of UV-rays for 2 hours. Results are shown in table 1.

Example 6

A heat-ray shielding lamination structure 6 of example 6 was obtained similarly to example 1, excluding a point that manganese acetate was replaced with 2-ethylhexanoate magnesium as metal salt of carboxylic acids. Optical properties of the prepared structure 6 are shown in table 1.

Regarding the prepared structure 6 as a test sample, the variation of transmittance of a visible light and variation of a haze value were measured using an ultraviolet irradiation device after irradiation of UV-rays for 2 hours. Results are shown in table 1.

Example 7

A heat-ray shielding lamination structure 7 of example 7 was obtained similarly to example 1, excluding a point that manganese acetate was replaced with 2-ethylhexanoate cerium as metal salt of carboxylic acids. Optical properties of the prepared structure 6 are shown in table 1.

Regarding the prepared structure 6 as a test sample, the variation of transmittance of a visible light and variation of a haze value were measured using an ultraviolet irradiation device after irradiation of UV-rays for 2 hours. Results are shown in table 1.

Example 8

A heat-ray shielding lamination structure 7 of example 8 was obtained similarly to example 1, excluding a point that manganese acetate was replaced with nickel acetate as metal salt of carboxylic acids. Optical properties of the prepared structure 7 are shown in table 1.

Regarding the prepared structure 7 as a test sample, the variation of transmittance of a visible light and variation of a haze value were measured using an ultraviolet irradiation device after irradiation of UV-rays for 2 hours. Results are shown in table 1.

Example 9

A heat-ray shielding lamination structure 9 of example 9 was obtained similarly to example 1, excluding a point that manganese acetate was replaced with magnesium acetate as metal salt of carboxylic acids. Optical properties of the prepared structure 7 are shown in table 1.

Regarding the prepared structure 9 as a test sample, the variation of transmittance of a visible light and variation of a haze value were measured using an ultraviolet irradiation device after irradiation of UV-rays for 2 hours. Results are shown in table 1.

Example 10

A heat-ray shielding lamination structure 10 of example 10 was obtained similarly to example 1, excluding a point that manganese acetate was replaced with magnesium acetate as metal salt of carboxylic acids. Optical properties of the prepared structure 10 are shown in table 1.

Regarding the prepared structure 10 as a test sample, the variation of transmittance of a visible light and variation of a haze value were measured using an ultraviolet irradiation device after irradiation of UV-rays for 2 hours. Results are shown in table 1.

Example 11

A heat-ray shielding lamination structure 11 of example 11 was obtained similarly to example 1, excluding a point that 1 pts.wt. of manganese acetate was added to 20 pts.wt. of $Cs_{0.33}WO_3$ particles (specific surface area: 20 m$^2$/g). Optical properties of the prepared structure 11 are shown in table 1.

Regarding the prepared structure 11 as a test sample, the variation of transmittance of a visible light and variation of a haze value were measured using an ultraviolet irradiation device after irradiation of UV-rays for 2 hours. Results are shown in table 1.

Example 12

A heat-ray shielding lamination structure 12 of example 12 was obtained similarly to example 1, excluding a point that 0.2 pts.wt. of manganese acetate was added to 20 pts.wt. of $Cs_{0.33}WO_3$ particles (specific surface area: 20 m$^2$/g). Optical properties of the prepared structure 11 are shown in table 1.

Regarding the prepared structure 12 as a test sample, the variation of transmittance of a visible light and variation of a haze value were measured using an ultraviolet irradiation device after irradiation of UV-rays for 2 hours. Results are shown in table 1.

Example 13

A heat-ray shielding lamination structure 13 of example 13 was obtained similarly to example 1, excluding a point that 10 pts.wt. of manganese acetate was added to 20 pts.wt. of $Cs_{0.33}WO_3$ particles (specific surface area: 20 m$^2$/g). Optical properties of the prepared structure 13 are shown in table 1.

Regarding the prepared structure 13 as a test sample, the variation of transmittance of a visible light and variation of a haze value were measured using an ultraviolet irradiation device after irradiation of UV-rays for 2 hours. Results are shown in table 1.

Example 14

A heat-ray shielding lamination structure 14 of example 14 was obtained similarly to example 1, excluding a point that 20 pts.wt. of manganese acetate was added to 20 pts.wt. of $Cs_{0.33}WO_3$ particles (specific surface area: 20 m$^2$/g). Optical properties of the prepared structure 14 are shown in table 1.

Regarding the prepared structure 14 as a test sample, the variation of transmittance of a visible light and variation of a haze value were measured using an ultraviolet irradiation device after irradiation of UV-rays for 2 hours. Results are shown in table 1.

Example 15

A heat-ray shielding lamination structure 15 of example 15 was obtained similarly to example 1, excluding a point that ethylene for intermediate film-vinyl acetate copolymer sheet was replaced with a polyvinyl butyral sheet for intermediate film. Optical properties of the prepared structure 15 are shown in table 1.

Regarding the prepared structure 15 as a test sample, the variation of transmittance of a visible light and variation of a haze value were measured using an ultraviolet irradiation device after irradiation of UV-rays for 2 hours. Results are shown in table 1.

Example 16

20 pts.wt. of $Cs_{0.33}WO_3$ particles (specific surface area: 20 m$^2$/g), 2 pts.wt. of manganese acetate, 68 pts.wt. of triethylene glycol di-2-ethylhexanoate (abbreviated as plasticizer a hereafter), and 10 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersion particle size of 80 nm, and manganese acetate (Liquid P1).

A specific amount of Liquid P1 was added into a mixed composition in which 30 pts.wt. of plasticizer 1 and 70 pts.wt. of polyvinyl butyral resin were mixed, to thereby obtain 0.15 wt % of concentration of the $Cs_{0.33}WO_3$ particles in the composition. The composition was kneaded at 200° C. using a twin-screw excluder, to thereby obtain an intermediate film containing heat-ray shielding particles as a sheet having a thickness of 0.7 mm, from T-die using a calender roll method.

The obtained intermediate film containing the heat-ray shielding particles was interposed between two opposing inorganic glasses so as to be integrally laminated by a publicly-known method (embodiment A-1), to thereby obtain a heat-ray shielding lamination structure 16 of example 16. Optical properties of the prepared structure 16 are shown in table 2.

Regarding the prepared structure 16 as a test sample, the variation of transmittance of a visible light and variation of a haze value were measured using an ultraviolet irradiation device after irradiation of UV-rays for 2 hours. Results are shown in table 2.

Example 17

A heat-ray shielding lamination structure 17 of example 17 was obtained similarly to example 16, excluding a point that polyvinyl butyral resin was replaced with an ethylene-vinyl acetate copolymer as vinyl resin. Optical properties of the prepared structure 17 are shown in table 2.

Regarding the prepared structure 17 as a test sample, the variation of transmittance of a visible light and variation of a haze value were measured using an ultraviolet irradiation device after irradiation of UV-rays for 2 hours. Results are shown in table 1.

Example 18

A heat-ray shielding lamination structure 18 of example 18 was obtained similarly to example 17, excluding a point that one of the two inorganic glasses was replaced with a polycarbonate plate. Optical properties of the prepared structure 18 are shown in table 2.

Regarding the prepared structure 18 as a test sample, the variation of transmittance of a visible light and variation of a haze value were measured using an ultraviolet irradiation device after irradiation of UV-rays for 2 hours. Results are shown in table 2.

Example 19

Liquid A1 prepared in example 1 and thermosetting resin (solid portion: 100%), and 4-methyl-2-pentanon were sufficiently mixed to thereby obtain a coating liquid. The coating liquid was applied on an inorganic glass using a bar coater, and curing this film by heating at 130° C. for 30 minutes, to thereby obtain a heat-ray shielding film.

Next, an inorganic glass having no heat-ray shielding film formed thereon, and the inorganic glass having the heat-ray shielding film formed thereon, are opposed to each other so that the heat-ray shielding film is arranged inside, and a polyvinyl butyral sheet for intermediate film not containing particles having the heat-ray shielding function was arranged between these inorganic glasses, which were then integrally laminated by a publicly-known method (embodiment A-3), to thereby obtain a heat-ray shielding lamination structure 19 of example 19. Optical properties of the prepared structure 19 are shown in table 2.

Regarding the prepared structure 19 as a test sample, the variation of transmittance of a visible light and variation of a haze value were measured using an ultraviolet irradiation device after irradiation of UV-rays for 2 hours. Results are shown in table 1.

Example 20

Ethylene for intermediate film-vinyl acetate copolymer sheet not containing particles having the heat-ray shielding function, was interposed between a heat-ray shielding film side of the inorganic glass prepared in example 19 and having the heat-ray shielding film formed thereon, and a polyethylene-terephthalate film (PET), and which were then integrally laminated by a publicly-known method (embodiment A-3), to thereby obtain a heat-ray shielding lamination structure 20 of example 20. Optical properties of the prepared structure 20 are shown in table 2.

Regarding the prepared structure 20 as a test sample, the variation of transmittance of a visible light and variation of a haze value were measured using an ultraviolet irradiation device after irradiation of UV-rays for 2 hours. Results are shown in table 2.

Example 21

An intermediate film containing heat-ray shielding particles prepared in example 16 was interposed between two polyvinyl butyral sheets for the intermediate film not containing the heat-ray shielding particles, and further interposed between two opposed inorganic glasses, and which were then integrally laminated by a publicly-known method (embodiment A-2), to thereby obtain a heat-ray shielding lamination structure 21 of example 21. Optical properties of the prepared structure 21 are shown in table 2.

Regarding the prepared structure 21 as a test sample, the variation of transmittance of a visible light and variation of a haze value were measured using an ultraviolet irradiation device after irradiation of UV-rays for 2 hours. Results are shown in table 2.

Example 22

Liquid A1 prepared in example 1 was added and mixed into polycarbonate resin so that the concentration of the $Cs_{0.33}WO_3$ particles was 0.07 wt %, and the mixture was kneaded and excluded from T-die using a twin-screw excluder, to thereby obtain a heat-ray shielding film substrate on which the heat-ray shielding film was formed as a sheet having a thickness of 2 mm.

The polyvinyl butyral sheet was interposed between one of the laminated plates which was a heat-ray shielding film substrate having the heat-ray shielding film formed thereon, and the other laminated plate which was an inorganic glass, and which were then integrally laminated by a publicly-known method (embodiment B-7), to thereby obtain a heat-ray shielding lamination structure 22 of example 22. Optical properties of the prepared structure 22 are son in table 2.

Regarding the prepared structure 22 as a test sample, the variation of transmittance of a visible light and variation of a haze value were measured using an ultraviolet irradiation device after irradiation of UV-rays for 2 hours. Results are shown in table 2.

Example 23

Liquid A1 prepared in example 1 was added and mixed into polyethylene-terephthalate resin so that the concentration of the $Cs_{0.33}WO_3$ particles was 0.07 wt %, and the mixture was kneaded and excluded from T-die using a twin-screw excluder, to thereby obtain a heat-ray shielding film substrate on which the heat-ray shielding film was formed as a sheet having a thickness of 2 mm.

An ethylene-vinyl acetate copolymer sheet was interposed between one of the laminated plates which was a heat-ray shielding film substrate having the heat-ray shielding film formed thereon, and the other laminated plate which was an inorganic glass, and which were then integrally laminated by a publicly-known method (embodiment B-7), to thereby obtain a heat-ray shielding lamination structure 23 of example 23. Optical properties of the prepared structure 23 are son in table 2.

Regarding the prepared structure 23 as a test sample, the variation of transmittance of a visible light and variation of a haze value were measured using an ultraviolet irradiation device after irradiation of UV-rays for 2 hours. Results are shown in table 2.

Example 24

The intermediate film containing heat-ray shielding particles prepared in example 17 was interposed between one of the laminated plates which was a heat-ray shielding film substrate having the heat-ray shielding film formed thereon prepared in example 22, and the other laminated plate which was an inorganic glass, and which were then integrally laminated by a publicly-known method (embodiment B-1), to thereby obtain a heat-ray shielding lamination structure 24 of example 24. Optical properties of the prepared structure 24 are son in table 2.

Regarding the prepared structure 24 as a test sample, the variation of transmittance of a visible light and variation of a haze value were measured using an ultraviolet irradiation device after irradiation of UV-rays for 2 hours. Results are shown in table 2.

Example 25

The Liquid A1 prepared in example 1, thermosetting resin (solid portion 100%), and 4-methyl-2-pentanon were sufficiently mixed, to thereby obtain a coating liquid. The coating liquid was applied on an ethylene for intermediate film-vinyl acetate copolymer sheet not containing the heat-ray shielding particles using a bar coater to thereby forma film, and the film thus obtained was cured by heating at 130° C. for 30 minutes, to thereby obtain an intermediate film not containing particles having the heat-ray shielding function, with a heat-ray shielding film formed thereon.

The ethylene for intermediate film-vinyl acetate copolymer sheet not containing heat-ray shielding particles was arranged at the coating film side of the intermediate film with the heat-ray shielding film formed thereon, which were then interposed between two opposing inorganic glasses, and laminated integrally by a publicly-known method (embodiment A-5), to thereby obtain a heat-ray shielding lamination structure 25 of example 25. Optical properties of the prepared structure 25 are shown in table 2.

Regarding the prepared structure 25 as a test sample, the variation of transmittance of a visible light and variation of a haze value were measured using an ultraviolet irradiation device after irradiation of UV-rays for 2 hours. Results are shown in table 2.

Example 26

The Liquid A1 prepared in example 1, thermosetting resin (solid portion 100%), and 4-methyl-2-pentanon were sufficiently mixed, to thereby obtain a coating liquid. A polyvinyl butyral sheet was formed as a peeling layer on one of the surfaces of the polyester film sheet, and the coating liquid was applied on the peeling layer using a bar coater, to thereby form a film and the film thus obtained was cured by heating at 130° C. for 30 minutes, to thereby obtain a heat-ray shielding film.

A polybutyral sheet for intermediate film not containing the particles having the heat-ray shielding function, was formed on the heat-ray shielding film as an adhesive layer, to thereby obtain a transfer film 26 as a lamination body.

One of the adhesive layers of the transfer film 26 is adhered to an inner surface of one of the laminated plates of the inorganic glass by a publicly-known method, and the polyester film sheet was peeled off from the transfer film. A polyvinyl butyral sheet for intermediate film not containing the heat-ray shielding particles was arranged on the surface of the peeling layer from which the sheet was peeled, and was integrally laminated with the inner surface of the other laminated plate of the inorganic glass by a publicly-known method (embodiment A-6), to thereby obtain a heat-ray shielding lamination structure 26 of example 26. Optical properties of the prepared structure 26 are shown in table 2.

Regarding the prepared structure 26 as a test sample, the variation of transmittance of a visible light and variation of a haze value were measured using an ultraviolet irradiation device after irradiation of UV-rays for 2 hours. Results are shown in table 2.

Example 27

A heat-ray shielding lamination structure 27 of example 27 was obtained similarly to example 1, excluding a point that manganese acetate was replaced with sodium acetate trihydrate. Optical properties of the prepared structure 27 are shown in table 2.

Regarding the prepared structure 27 as a test sample, the variation of transmittance of a visible light and variation of a haze value were measured using an ultraviolet irradiation device after irradiation of UV-rays for 2 hours. Results are shown in table 2.

Example 28

A heat-ray shielding lamination structure 28 of example 28 was obtained similarly to example 1, excluding a point that manganese acetate was replaced with sodium 2-ethylhexanoate as metal salt of carboxylic acids. Optical properties of the prepared structure 28 are shown in table 2.

Regarding the prepared structure 28 as a test sample, the variation of transmittance of a visible light and variation of a haze value were measured using an ultraviolet irradiation device after irradiation of UV-rays for 2 hours. Results are shown in table 2.

Example 29

A heat-ray shielding lamination structure 29 of example 29 was obtained similarly to example 1, excluding a point that manganese acetate was replaced with potassium acetate as metal salt of carboxylic acids. Optical properties of the prepared structure 29 are shown in table 2.

Regarding the prepared structure 29 as a test sample, the variation of transmittance of a visible light and variation of a haze value were measured using an ultraviolet irradiation device after irradiation of UV-rays for 2 hours. Results are shown in table 2.

Example 30

A heat-ray shielding lamination structure 30 of example 30 was obtained similarly to example 1, excluding a point that manganese acetate was replaced with zinc acetate dihydrate as metal salt of carboxylic acids. Optical properties of the prepared structure 30 are shown in table 2.

Regarding the prepared structure 30 as a test sample, the variation of transmittance of a visible light and variation of a haze value were measured using an ultraviolet irradiation device after irradiation of UV-rays for 2 hours. Results are shown in table 2.

Example 31

A heat-ray shielding lamination structure 31 of example 31 was obtained similarly to example 1, excluding a point that manganese acetate was replaced with copper acetate (II)-hydrate as metal salt of carboxylic acids. Optical properties of the prepared structure 31 are shown in table 3.

Regarding the prepared structure 31 as a test sample, the variation of transmittance of a visible light and variation of a haze value were measured using an ultraviolet irradiation device after irradiation of UV-rays for 2 hours. Results are shown in table 3.

Example 32

A heat-ray shielding lamination structure 32 of example 32 was obtained similarly to example 1, excluding a point that manganese acetate was replaced with iron acetate (II) as metal salt of carboxylic acids. Optical properties of the prepared structure 32 are shown in table 3.

Regarding the prepared structure 32 as a test sample, the variation of transmittance of a visible light and variation of a haze value were measured using an ultraviolet irradiation device after irradiation of UV-rays for 2 hours. Results are shown in table 3.

Example 33

A heat-ray shielding lamination structure 33 of example 33 was obtained similarly to example 1, excluding a point that manganese acetate was replaced with strontium acetate 0.5 hydrate as metal salt of carboxylic acids. Optical properties of the prepared structure 33 are shown in table 3.

Regarding the prepared structure 33 as a test sample, the variation of transmittance of a visible light and variation of a haze value were measured using an ultraviolet irradiation device after irradiation of UV-rays for 2 hours. Results are shown in table 3.

Example 34

A heat-ray shielding lamination structure 34 of example 34 was obtained similarly to example 1, excluding a point that manganese acetate was replaced with cesium acetate as metal salt of carboxylic acids. Optical properties of the prepared structure 34 are shown in table 3.

Regarding the prepared structure 34 as a test sample, the variation of transmittance of a visible light and variation of a haze value were measured using an ultraviolet irradiation device after irradiation of UV-rays for 2 hours. Results are shown in table 3.

Example 35

A heat-ray shielding lamination structure 35 of example 35 was obtained similarly to example 1, excluding a point that manganese acetate was replaced with lithium acetate dihydrate as metal salt of carboxylic acids. Optical properties of the prepared structure 35 are shown in table 3.

Regarding the prepared structure 35 as a test sample, the variation of transmittance of a visible light and variation of a haze value were measured using an ultraviolet irradiation device after irradiation of UV-rays for 2 hours. Results are shown in table 3.

Example 36

A heat-ray shielding lamination structure 36 of example 36 was obtained similarly to example 1, excluding a point that manganese acetate was replaced with rubidium acetate as metal salt of carboxylic acids. Optical properties of the prepared structure 36 are shown in table 3.

Regarding the prepared structure 36 as a test sample, the variation of transmittance of a visible light and variation of a haze value were measured using an ultraviolet irradiation device after irradiation of UV-rays for 2 hours. Results are shown in table 3.

Example 37

A heat-ray shielding lamination structure 37 of example 37 was obtained similarly to example 1, excluding a point that manganese acetate was replaced with cobalt acetate (II) tetrahydrate as metal salt of carboxylic acids. Optical properties of the prepared structure 37 are shown in table 3.

Regarding the prepared structure 37 as a test sample, the variation of transmittance of a visible light and variation of a haze value were measured using an ultraviolet irradiation device after irradiation of UV-rays for 2 hours. Results are shown in table 3.

Example 38

A heat-ray shielding lamination structure 38 of example 38 was obtained similarly to example 1, excluding a point that manganese acetate was replaced with barium acetate as metal salt of carboxylic acids. Optical properties of the prepared structure 38 are shown in table 3.

Regarding the prepared structure 38 as a test sample, the variation of transmittance of a visible light and variation of a haze value were measured using an ultraviolet irradiation device after irradiation of UV-rays for 2 hours. Results are shown in table 3.

Comparative Example 1

A heat-ray shielding dispersion liquid of comparative example 1 (abbreviated as liquid α1 hereafter) was prepared similarly to example 1, excluding a point that manganese acetate was not added.

A heat-ray shielding lamination structure 39 of comparative example 1 was obtained similarly to example 1, excluding a point that liquid A1 was replaced with liquid α1 as metal salt of carboxylic acids. Optical properties of the prepared structure 39 are shown in table 3.

Regarding the prepared structure 39 as a test sample, the variation of transmittance of a visible light and variation of a haze value were measured using an ultraviolet irradiation device after irradiation of UV-rays for 2 hours. Results are shown in table 3.

Comparative Example 2

A heat-ray shielding lamination structure 40 of comparative example 2 was obtained similarly to example 1, excluding a point that 0.1 pts.wt. of manganese acetate was added to 20 pts.wt. of $Cs_{0.33}WO_3$ particles (specific surface area: 20 $m^2$/g). Optical properties of the prepared structure 40 are shown in table 3.

Regarding the prepared structure 40 as a test sample, the variation of transmittance of a visible light and variation of a haze value were measured using an ultraviolet irradiation device after irradiation of UV-rays for 2 hours. Results are shown in table 3.

Comparative Example 3

A heat-ray shielding dispersion liquid of comparative example 3 (abbreviated as liquid Y1 hereafter) was prepared similarly to example 1, excluding a point that 40 pts.wt. pf manganese acetate was added into 20 pts.wt. of $Cs_{0.33}WO_3$ particles.

A heat-ray shielding lamination structure 41 of comparative example 3 was obtained similarly to example 17, excluding a point that liquid P1 was replaced with liquid Y1. Optical properties of the prepared structure 41 are shown in table 3.

However, there are excessive addition amounts of metal salts of carboxylic acids, and therefore the structure 41 involves a problem that adhesion between the inorganic glass and the intermediate film containing heat-ray shielding particles is insufficient, thus easily peeling-off the intermediate film containing the heat-ray shielding particles, from the inorganic glass.

Therefore, the acceleration test was not executed.

Comparative Example 4

A heat-ray shielding dispersion liquid of comparative example 4 (abbreviated as liquid A1 hereafter) was prepared similarly to example 16, excluding a point that manganese acetate was not added.

A heat-ray shielding lamination structure 42 of comparative example 4 was obtained similarly to example 16, excluding a point that liquid P1 was replaced with liquid A1. Optical properties of the prepared structure 42 are shown in table 3.

Regarding the prepared structure 42 as a test sample, the variation of transmittance of a visible light and variation of a haze value were measured using an ultraviolet irradiation device after irradiation of UV-rays for 2 hours. Results are shown in table 3.

TABLE 1

| | Mixture of raw materials | | | | |
|---|---|---|---|---|---|
| | Particles having heat-ray shielding function | | Metal salt | | |
| | Kind | Addition amount (Pts. wt.) | Kind | Addition amount (Pts. wt.) | Interlayer resin |
| Example 1 | $Cs_{0.33}WO_3$ | 20 | Manganese acetate | 2 | Ethylene-vinyl acetate copolymer | Lamination structure 1 |
| Example 2 | $Rb_{0.33}WO_3$ | 20 | Manganese acetate | 2 | Ethylene-vinyl acetate copolymer | Lamination structure 2 |
| Example 3 | $K_{0.33}WO_3$ | 20 | Manganese acetate | 1 | Ethylene-vinyl acetate copolymer | Lamination structure 3 |
| Example 4 | $Tl_{0.33}WO_3$ | 20 | Manganese acetate | 0.6 | Ethylene-vinyl acetate copolymer | Lamination structure 4 |
| Example 5 | $Cs_{0.33}WO_3$ | 20 | Manganese stearate | 2 | Ethylene-vinyl acetate copolymer | Lamination structure 5 |
| Example 6 | $Cs_{0.33}WO_3$ | 20 | 2-ethylhexanoic acid manganese | 2 | Ethylene-vinyl acetate copolymer | Lamination structure 6 |
| Example 7 | $Cs_{0.33}WO_3$ | 20 | 2-ethylhexanoic acid cerium | 2 | Ethylene-vinyl acetate copolymer | Lamination structure 7 |
| Example 8 | $Cs_{0.33}WO_3$ | 20 | Nickel acetate | 2 | Ethylene-vinyl acetate copolymer | Lamination structure 8 |
| Example 9 | $Cs_{0.33}WO_3$ | 20 | Manganese acetate | 2 | Ethylene-vinyl acetate copolymer | Lamination structure 9 |
| Example 10 | $Cs_{0.33}WO_3$ | 20 | Calcium acetate | 2 | Ethylene-vinyl acetate copolymer | Lamination structure 10 |
| Example 11 | $Cs_{0.33}WO_3$ | 20 | Manganese acetate | 1 | Ethylene-vinyl acetate copolymer | Lamination structure 11 |
| Example 12 | $Cs_{0.33}WO_3$ | 20 | Manganese acetate | 0.2 | Ethylene-vinyl acetate copolymer | Lamination structure 12 |
| Example 13 | $Cs_{0.33}WO_3$ | 20 | Manganese acetate | 10 | Ethylene-vinyl acetate copolymer | Lamination structure 13 |
| Example 14 | $Cs_{0.33}WO_3$ | 20 | Manganese acetate | 20 | Ethylene-vinyl acetate copolymer | Lamination structure 14 |
| Example 15 | $Cs_{0.33}WO_3$ | 20 | Manganese acetate | 2 | Polyvinyl butyral | Lamination structure 15 |

| | Lamination structure | | | | | | |
|---|---|---|---|---|---|---|---|
| | | | Initial property | | | Acceleration test | |
| | Form | Substrate | Visible light transmittance (%) | Solar transmittance (%) | Haze value (%) | ⊿Visible light transmittance (%) | ⊿Haze value (%) |
| Example 1 | A-4 | Glass/glass | 72.7 | 37.3 | 0.8 | −2.3 | 0 |
| Example 2 | A-4 | Glass/glass | 73.3 | 38.1 | 0.7 | −2.6 | 0 |
| Example 3 | A-4 | Glass/glass | 72.5 | 37.5 | 0.8 | −2.8 | 0.1 |
| Example 4 | A-4 | Glass/glass | 74 | 39.2 | 0.8 | −3 | 0.1 |
| Example 5 | A-4 | Glass/glass | 74.2 | 39 | 0.8 | −2.6 | 0.2 |
| Example 6 | A-4 | Glass/glass | 73.2 | 37.7 | 0.7 | −1.9 | 0 |
| Example 7 | A-4 | Glass/glass | 72.2 | 37.5 | 0.8 | −2.6 | 2.4 |
| Example 8 | A-4 | Glass/glass | 73 | 38.2 | 0.9 | −2.4 | 2.2 |
| Example 9 | A-4 | Glass/glass | 71.9 | 37.4 | 0.8 | −2.7 | 0.2 |

TABLE 1-continued

|  |  |  |  |  |  |  |  |
|---|---|---|---|---|---|---|---|
| Example 10 | A-4 | Glass/glass | 73.5 | 38.1 | 0.8 | −3.1 | 0.3 |
| Example 11 | A-4 | Glass/glass | 72.9 | 37.7 | 0.7 | −2.5 | 0 |
| Example 12 | A-4 | Glass/glass | 74.4 | 39.5 | 0.7 | −2.9 | 0 |
| Example 13 | A-4 | Glass/glass | 72.8 | 37.7 | 0.8 | −1.8 | 0 |
| Example 14 | A-4 | Glass/glass | 71.8 | 37.4 | 0.9 | −1.7 | 0.1 |
| Example 15 | A-4 | Glass/glass | 74 | 38.6 | 0.8 | −2.9 | 0.1 |

TABLE 2

| | Mixture of raw materials | | | | | |
|---|---|---|---|---|---|---|
| | Particles having heat-ray shielding function | | Metal salt | | | |
| | Kind | Addition amount (Pts. wt.) | Kind | Addition amount (Pts. wt.) | Interlayer resin | |
| Example 16 | $Cs_{0.33}WO_3$ | 20 | Manganese acetate | 2 | Polyvinyl butyral | Lamination structure 16 |
| Example 17 | $Cs_{0.33}WO_3$ | 20 | Manganese acetate | 2 | Ethylene-vinyl acetate copolymer | Lamination structure 17 |
| Example 18 | $Cs_{0.33}WO_3$ | 20 | Manganese acetate | 2 | Ethylene-vinyl acetate copolymer | Lamination structure 18 |
| Example 19 | $Cs_{0.33}WO_3$ | 20 | Manganese acetate | 2 | Polyvinyl butyral | Lamination structure 19 |
| Example 20 | $Cs_{0.33}WO_3$ | 20 | Manganese acetate | 2 | Ethylene-vinyl acetate copolymer | Lamination structure 20 |
| Example 21 | $Cs_{0.33}WO_3$ | 20 | Manganese acetate | 2 | Polyvinyl butyral | Lamination structure 21 |
| Example 22 | $Cs_{0.33}WO_3$ | 20 | Manganese acetate | 2 | Polyvinyl butyral | Lamination structure 22 |
| Example 23 | $Cs_{0.33}WO_3$ | 20 | Manganese acetate | 2 | Ethylene-vinyl acetate copolymer | Lamination structure 23 |
| Example 24 | $Cs_{0.33}WO_3$ | 20 | Manganese acetate | 2 | Ethylene-vinyl acetate copolymer | Lamination structure 24 |
| Example 25 | $Cs_{0.33}WO_3$ | 20 | Manganese acetate | 2 | Ethylene-vinyl acetate copolymer | Lamination structure 25 |
| Example 26 | $Cs_{0.33}WO_3$ | 20 | Manganese acetate | 2 | Polyvinyl butyral | Lamination structure 26 |
| Example 27 | $Cs_{0.33}WO_3$ | 20 | Sodium acetate trihydrate | 2 | Ethylene-vinyl acetate copolymer | Lamination structure 27 |
| Example 28 | $Cs_{0.33}WO_3$ | 20 | Sodium 2-ethylhexanoate | 2 | Ethylene-vinyl acetate copolymer | Lamination structure 28 |
| Example 29 | $Cs_{0.33}WO_3$ | 20 | Potassium acetate | 2 | Ethylene-vinyl acetate copolymer | Lamination structure 29 |
| Example 30 | $Cs_{0.33}WO_3$ | 20 | Zinc acetate dihydrate | 2 | Ethylene-vinyl acetate copolymer | Lamination structure 30 |

| | Lamination structure | | | | | | |
|---|---|---|---|---|---|---|---|
| | | | Initial property | | | Acceleration test | |
| | Form | Substrate | Visible light transmittance (%) | Solar transmittance (%) | Haze value (%) | ⊿Visible light transmittance (%) | ⊿Haze (%) |
| Example 16 | A-1 | Glass/glass | 73.3 | 39.2 | 0.4 | −0.9 | 0.1 |
| Example 17 | A-1 | Glass/glass | 73.8 | 39.3 | 0.4 | ~1 | 0 |
| Example 18 | A-1 | Polycarbonate/glass | 71.6 | 37.2 | 0.5 | −0.9 | 0.1 |
| Example 19 | A-3 | Glass/glass | 72.3 | 37.3 | 0.4 | −1.6 | 0 |
| Example 20 | A-3 | PET/glass | 74 | 38.6 | 0.5 | −1.8 | 0.1 |
| Example 21 | A-2 | Glass/glass | 72.7 | 38 | 0.4 | −0.6 | 0 |
| Example 22 | B-7 | Polycarbonate/glass | 74.5 | 39.1 | 0.5 | −3.1 | 0.1 |
| Example 23 | B-7 | PET/glass | 73.2 | 37.9 | 0.4 | −2.8 | 0.1 |
| Example 24 | B-1 | Polycarbonate/glass | 72.5 | 37.3 | 0.5 | −1 | 0.1 |
| Example 25 | A-5 | Glass/glass | 73.1 | 37.6 | 0.6 | −2 | 0 |
| Example 26 | A-6 | Glass/glass | 73.9 | 38.1 | 0.6 | −0.9 | 0 |
| Example 27 | A-4 | Glass/glass | 69.1 | 32.9 | 0.6 | −2.8 | 0 |
| Example 28 | A-4 | Glass/glass | 69.4 | 33.4 | 0.9 | −2.6 | 0.1 |

TABLE 2-continued

| | | | | | | | |
|---|---|---|---|---|---|---|---|
| Example 29 | A-4 | Glass/glass | 68.9 | 33.6 | 0.8 | −3.2 | 0.3 |
| Example 30 | A-4 | Glass/glass | 68.8 | 33.2 | 1 | −3.5 | 0.2 |

TABLE 3

| | Mixture of raw materials | | | | |
|---|---|---|---|---|---|
| | Particles having heat-ray shielding function | | Metal salt | | |
| | Kind | Addition amount (Pts. wt.) | Kind | Addition amount (Pts. wt.) | Interlayer resin |
| Example 31 | $Cs_{0.33}WO_3$ | 20 | Copper acetate (II)-hydrate | 2 | Ethylene-vinyl acetate copolymer | Lamination structure 31 |
| Example 32 | $Cs_{0.33}WO_3$ | 20 | Iron acetate (II) | 2 | Ethylene-vinyl acetate copolymer | Lamination structure 32 |
| Example 33 | $Cs_{0.33}WO_3$ | 20 | Strontium acetate 0.5 hydrate | 2 | Ethylene-vinyl acetate copolymer | Lamination structure 33 |
| Example 34 | $Cs_{0.33}WO_3$ | 20 | Cesium acetate | 2 | Ethylene-vinyl acetate copolymer | Lamination structure 34 |
| Example 35 | $Cs_{0.33}WO_3$ | 20 | Lithium acetate dihydrate | 2 | Ethylene-vinyl acetate copolymer | Lamination structure 35 |
| Example 36 | $Cs_{0.33}WO_3$ | 20 | Robidium acetate | 2 | Ethylene-vinyl acetate copolymer | Lamination structure 36 |
| Example 37 | $Cs_{0.33}WO_3$ | 20 | Cobalt acetate (II) tetrahydrate | 2 | Ethylene-vinyl acetate copolymer | Lamination structure 37 |
| Example 38 | $Cs_{0.33}WO_3$ | 20 | Barium acetate | 2 | Ethylene-vinyl acetate copolymer | Lamination structure 38 |
| Comparative example 1 | $Cs_{0.33}WO_3$ | 20 | Not added | 0 | Ethylene-vinyl acetate copolymer | Lamination structure 39 |
| Comparative example 2 | $Cs_{0.33}WO_3$ | 20 | Manganese acetate | 0.1 | Ethylene-vinyl acetate copolymer | Lamination structure 40 |
| Comparative example 3 | $Cs_{0.33}WO_3$ | 20 | Manganese acetate | 40 | Ethylene-vinyl acetate copolymer | Lamination structure 41 |
| Comparative example 4 | $Cs_{0.33}WO_3$ | 20 | Not added | 0 | Polyvinyl butyral | Lamination structure 42 |

| | Lamination structure | | | | | |
|---|---|---|---|---|---|---|
| | | | Initial property | | | Acceleration test |
| | Form | Substrate | Visible light transmittance (%) | Solar transmittance (%) | Haze value (%) | ⊿Visible light transmittance (%) | ⊿Haze (%) |
| Example 31 | A-4 | Glass/glass | 69.5 | 33.2 | 1 | −3.1 | 2.1 |
| Example 32 | A-4 | Glass/glass | 70.2 | 34.3 | 0.9 | −3.1 | 2.6 |
| Example 33 | A-4 | Glass/glass | 71.3 | 35.8 | 0.7 | −2.9 | 2.5 |
| Example 34 | A-4 | Glass/glass | 68.9 | 33 | 1 | −3.2 | 0.1 |
| Example 35 | A-4 | Glass/glass | 69.9 | 34 | 0.9 | −3 | 0.1 |
| Example 36 | A-4 | Glass/glass | 72.3 | 36.9 | 0.8 | −2.7 | 0.3 |
| Example 37 | A-4 | Glass/glass | 74.2 | 38.9 | 0.9 | −3 | 2.2 |
| Example 38 | A-4 | Glass/glass | 73.9 | 39 | 1 | −3.1 | 2.5 |
| Comparative example 1 | A-4 | Glass/glass | 70.6 | 36.9 | 0.7 | −15.3 | 0 |
| Comparative example 2 | A-4 | Glass/glass | 69.2 | 35.5 | 0.8 | −14 | 0 |
| Comparative example 3 | A-1 | Glass/glass | 71.1 | 37 | 0.6 | Not tested | 0.1 |
| Comparative example 4 | A-1 | Glass/glass | 74 | 39 | 0.3 | −13.5 | 0 |

[Evaluation]

From the results of tables 1 to 3, it is found that in examples 1 to 38, heat-ray shielding lamination structures 1 to 38 having high visible light transmittance, low heat-ray shielding property, low haze value, and excellent transparency can be obtained by adding a suitable amount of metal salts of carboxylic acids.

As a result of carrying out the acceleration test of irradiation of UV-rays for 2 hours, it is found that the heat-ray shielding lamination structure added with suitable amounts of carboxylate of sodium, potassium, magnesium, calcium, manganese, zinc, cesium, lithium, and rubidium, has a remarkable effect of suppressing its variation rate to half or less with respect to an initial visible light transmittance. As a result of carrying out the acceleration test of irradiation of UV-rays for 2 hours, it is also found that increase of the haze value is 0.3% or less.

Meanwhile, in comparative examples 1, 2, and 4, as a result of carrying out acceleration test, it was found that the metal salts of carboxylic acids were not added, or due to excessively small addition amounts, variation of the visible light transmittance was increased. Also, in comparative example 3, excessively large addition amounts of the metal salts of carboxylic acids damages the adhesion to the inorganic glass, although this is an important physical property of the lamination structure.

Example 39

20 pts.wt. of $Cs_{0.33}WO_3$ particles (specific surface area: 20 m$^2$/g), 2 pts.wt. of sodium carbonate, 58 pts.wt. of 4-methyl-2-pentanon, and 20 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersion particle size of 80 nm, and sodium carbonate (Liquid A2).

The liquid A2, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was cured by heating at 130° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 43 of example 39. Optical properties of the prepared structure 43 are shown in table 4.

Regarding the prepared structure 43 as a test sample, the variation of transmittance of a visible light and variation of a haze value were measured using an ultraviolet irradiation device after irradiation of UV-rays for 2 hours. Results are shown in table 4.

Example 40

20 pts.wt. of $Rb_{0.33}WO_3$ particles (specific surface area: 20 m$^2$/g), 2 pts.wt. of sodium carbonate, 58 pts.wt. of 4-methyl-2-pentanon, and 20 pts.wt. pf a dispersant for dispersing particles, were mixed, and a mixture was subjected to dispersion treatment by a medium stirring mill, to thereby prepare a dispersion liquid of $Rb_{0.33}WO_3$ particles having an average dispersion particle size of 80 nm, and sodium carbonate (Liquid B2).

The liquid B2, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was cured by heating at 130° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 44 of example 40. Optical properties of the prepared structure 44 are shown in table 4.

Regarding the prepared structure 44 as a test sample, the variation of transmittance of a visible light and variation of a haze value were measured using an ultraviolet irradiation device, after irradiation of UV-rays for 2 hours. Results are shown in table 4.

Example 41

20 pts.wt. pf $K_{0.33}WO_3$ particles (specific surface area: 20 m$^2$/g), 4 pts.wt. of sodium carbonate, 56 pts.wt. of 4-methyl-2-pentanon, and 20 pts.wt. pf a dispersant for dispersing particles, were mixed, and a mixture was subjected to dispersion treatment by a medium stirring mill, to thereby prepare a dispersion liquid of $K_{0.33}WO_3$ particles having an average dispersion particle size of 80 nm, and sodium carbonate (Liquid C2).

The Liquid C2, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was sintered at 120° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 45 of example 41. Optical properties of the prepared structure 45 are shown in table 4.

Regarding the prepared structure 45 as a test sample, the variation of transmittance of a visible light and variation of a haze value were measured using an ultraviolet irradiation device, after irradiation of UV-rays for 2 hours. Results are shown in table 4.

Example 42

20 pts.wt. of $Tl_{0.33}WO_3$ particles (specific surface area: 20 m$^2$/g), 0.6 pts.wt. of sodium carbonate, 59.4 pts.wt. of 4-methyl-2-pentanon, and 20 pts.wt. of a dispersant for dispersing particles, were mixed, and a mixture was subjected to dispersion treatment by a medium stirring mill, to thereby prepare a dispersion liquid of $Tl_{0.33}WO_3$ particles having an average dispersion particle size of 80 nm, and sodium carbonate (Liquid D2).

The liquid D2, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was dried at 70° C. for 2 minutes to evaporate a solvent and thereafter was cured by a high-pressure mercury lamp, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 46 of example 42. Optical properties of the prepared structure 46 are shown in table 4.

Regarding the prepared structure 46 as a test sample, the variation of transmittance of a visible light and variation of a haze value were measured using an ultraviolet irradiation device, after irradiation of UV-rays for 2 hours. Results are shown in table 4.

Example 43

A heat-ray shielding lamination structure 47 of example 43 was obtained similarly to example 39, excluding a point that sodium carbonate was replaced with manganese carbonate as metal salt of carboxylic acids. Optical properties of the prepared structure 47 are shown in table 4.

Regarding the prepared structure 47 as a test sample, the variation of transmittance of a visible light and variation of a haze value were measured using an ultraviolet irradiation device after irradiation of UV-rays for 2 hours. Results are shown in table 4.

Example 44

A heat-ray shielding lamination structure 48 of example 44 was obtained similarly to example 38, excluding a point that sodium carbonate was replaced with lithium carbonate as metal salt of carboxylic acids. Optical properties of the prepared structure 48 are shown in table 4.

Regarding the prepared structure 48 as a test sample, the variation of transmittance of a visible light and variation of a haze value were measured using an ultraviolet irradiation device after irradiation of UV-rays for 2 hours. Results are shown in table 4.

Example 45

A heat-ray shielding lamination structure 49 of example 45 was obtained similarly to example 39, excluding a point that sodium carbonate was replaced with rubidium carbonate as metal salt of carboxylic acids. Optical properties of the prepared structure 49 are shown in table 4.

Regarding the prepared structure 49 as a test sample, the variation of transmittance of a visible light and variation of a haze value were measured using an ultraviolet irradiation device after irradiation of UV-rays for 2 hours. Results are shown in table 4.

Example 46

A heat-ray shielding lamination structure 50 of example 46 was obtained similarly to example 39, excluding a point that sodium carbonate was replaced with magnesium hydroxide carbonate as metal salt of carboxylic acids. Optical properties of the prepared structure 50 are shown in table 4.

Regarding the prepared structure 50 as a test sample, the variation of transmittance of a visible light and variation of a haze value were measured using an ultraviolet irradiation device after irradiation of UV-rays for 2 hours. Results are shown in table 4.

Example 47

A heat-ray shielding lamination structure 51 of example 47 was obtained similarly to example 39, excluding a point that 1 pts.wt. of sodium carbonate was added to 20 pts.wt. of $Cs_{0.33}WO_3$ particles (specific surface area: 20 m²/g). Optical properties of the prepared structure 51 are shown in table 4.

Regarding the prepared structure 51 as a test sample, the variation of transmittance of a visible light and variation of a haze value were measured using an ultraviolet irradiation device after irradiation of UV-rays for 2 hours. Results are shown in table 4.

Example 48

A heat-ray shielding lamination structure 52 of example 48 was obtained similarly to example 39, excluding a point that 0.2 pts.wt. of sodium carbonate was added to 20 pts.wt. of $Cs_{0.33}WO_3$ particles (specific surface area: 20 m²/g). Optical properties of the prepared structure 52 are shown in table 4.

Regarding the prepared structure 52 as a test sample, the variation of transmittance of a visible light and variation of a haze value were measured using an ultraviolet irradiation device after irradiation of UV-rays for 2 hours. Results are shown in table 4.

Example 49

A heat-ray shielding lamination structure 53 of example 49 was obtained similarly to example 1, excluding a point that 10 pts.wt. of sodium carbonate was added to 20 pts.wt. of $Cs_{0.33}WO_3$ particles (specific surface area: 20 m²/g). Optical properties of the prepared structure 53 are shown in table 4.

Regarding the prepared structure 53 as a test sample, the variation of transmittance of a visible light and variation of a haze value were measured using an ultraviolet irradiation device after irradiation of UV-rays for 2 hours. Results are shown in table 4.

Example 50

A heat-ray shielding lamination structure 54 of example 50 was obtained similarly to example 1, excluding a point that 20 pts.wt. of sodium carbonate was added to 20 pts.wt. of $Cs_{0.33}WO_3$ particles (specific surface area: 20 m²/g). Optical properties of the prepared structure 54 are shown in table 4.

Regarding the prepared structure 54 as a test sample, the variation of transmittance of a visible light and variation of a haze value were measured using an ultraviolet irradiation device after irradiation of UV-rays for 2 hours. Results are shown in table 4.

Example 51

A heat-ray shielding lamination structure 55 of example 51 was obtained similarly to example 39, excluding a point that ethylene for intermediate film-vinyl acetate copolymer sheet was replaced with a polyvinyl butyral sheet for intermediate film. Optical properties of the prepared structure 55 are shown in table 4.

Regarding the prepared structure 55 as a test sample, the variation of transmittance of a visible light and variation of a haze value were measured using an ultraviolet irradiation device after irradiation of UV-rays for 2 hours. Results are shown in table 4.

Example 52

20 pts.wt. of $Cs_{0.33}WO_3$ particles (specific surface area: 20 m²/g), 2 pts.wt. of sodium carbonate, 58 pts.wt. of triethylene glycol di-2-ethylhexanoate (abbreviated as plasticizer a hereafter), and 20 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersion particle size of 80 nm, and sodium carbonate (Liquid E2).

A specific amount of Liquid E2 was added into a mixed composition in which 30 pts.wt. of plasticizer a and 70 pts.wt. of polyvinyl butyral resin were mixed, to thereby obtain 0.15 wt % of concentration of the $Cs_{0.33}WO_3$ particles in the composition. The composition was kneaded at 200° C. using a twin-screw excluder, to thereby obtain an intermediate film containing heat-ray shielding particles as a sheet having a thickness of 0.7 mm, from T-die using a calender roll method.

The obtained intermediate film containing the heat-ray shielding particles was interposed between two opposing inorganic glasses so as to be integrally laminated by a publicly-known method (embodiment A-1), to thereby obtain a heat-ray shielding lamination structure 56 of example 52. Optical properties of the prepared structure 56 are shown in table 5.

Regarding the prepared structure 56 as a test sample, the variation of transmittance of a visible light and variation of a haze value were measured using an ultraviolet irradiation device after irradiation of UV-rays for 2 hours. Results are shown in table 5.

Example 53

A heat-ray shielding lamination structure 57 of example 53 was obtained similarly to example 52, excluding a point that polyvinyl butyral resin was replaced with an ethylene-vinyl acetate copolymer as vinyl resin. Optical properties of the prepared structure 57 are shown in table 5.

Regarding the prepared structure 57 as a test sample, the variation of transmittance of a visible light and variation of a haze value were measured using an ultraviolet irradiation device after irradiation of UV-rays for 2 hours. Results are shown in table 5.

Example 54

A heat-ray shielding lamination structure 58 of example 54 was obtained similarly to example 53, excluding a point that one of the two inorganic glasses was replaced with a polycarbonate plate. Optical properties of the prepared structure 58 are shown in table 5.

Regarding the prepared structure 58 as a test sample, the variation of transmittance of a visible light and variation of a haze value were measured using an ultraviolet irradiation device after irradiation of UV-rays for 2 hours. Results are shown in table 5.

Example 55

Liquid A2 prepared in example 39 and thermosetting resin (solid portion: 100%), and 4-methyl-2-pentanon were sufficiently mixed to thereby obtain a coating liquid. The coating liquid was applied on an inorganic glass using a bar coater, and curing this film by heating at 130° C. for 30 minutes, to thereby obtain a heat-ray shielding film.

Next, an inorganic glass having no heat-ray shielding film formed thereon, and the inorganic glass having the heat-ray shielding film formed thereon, are opposed to each other so that the heat-ray shielding film is arranged inside, and a polyvinyl butyral sheet for intermediate film not containing particles having the heat-ray shielding function was arranged between these inorganic glasses, which were then integrally laminated by a publicly-known method, to thereby obtain a heat-ray shielding lamination structure 59 of example 55. Optical properties of the prepared structure 59 are shown in table 5.

Regarding the prepared structure 59 as a test sample, the variation of transmittance of a visible light and variation of a haze value were measured using an ultraviolet irradiation device after irradiation of UV-rays for 2 hours. Results are shown in table 5.

Example 56

Ethylene for intermediate film-vinyl acetate copolymer sheet not containing particles having the heat-ray shielding function, was interposed between a heat-ray shielding film side of the inorganic glass prepared in example 55 and having the heat-ray shielding film formed thereon, and a polyethylene-terephthalate film (PET), and which were then integrally laminated by a publicly-known method, to thereby obtain a heat-ray shielding lamination structure 60 of example 56. Optical properties of the prepared structure 60 are shown in table 5.

Regarding the prepared structure 60 as a test sample, the variation of transmittance of a visible light and variation of a haze value were measured using an ultraviolet irradiation device after irradiation of UV-rays for 2 hours. Results are shown in table 5.

Example 57

An intermediate film containing heat-ray shielding particles prepared in example 53 was interposed between two polyvinyl butyral sheets for the intermediate film not containing the heat-ray shielding particles, and further interposed between two opposed inorganic glasses, and which were then integrally laminated by a publicly-known method (embodiment A-2), to thereby obtain a heat-ray shielding lamination structure 61 of example 57. Optical properties of the prepared structure 61 are shown in table 5.

Regarding the prepared structure 61 as a test sample, the variation of transmittance of a visible light and variation of a haze value were measured using an ultraviolet irradiation device after irradiation of UV-rays for 2 hours. Results are shown in table 5.

Example 58

Liquid A2 prepared in example 39 was added and mixed into polycarbonate resin so that the concentration of the $Cs_{0.33}WO_3$ particles was 0.07 wt %, and the mixture was kneaded and excluded from T-die using a twin-screw excluder, to thereby obtain a heat-ray shielding film substrate on which the heat-ray shielding film was formed as a sheet having a thickness of 2 mm.

The polyvinyl butyral sheet was interposed between one of the laminated plates which was a heat-ray shielding film substrate having the heat-ray shielding film formed thereon, and the other laminated plate which was an inorganic glass, and which were then integrally laminated by a publicly-known method (embodiment B-7), to thereby obtain a heat-ray shielding lamination structure 62 of example 58. Optical properties of the prepared structure 62 are son in table 5.

Regarding the prepared structure 62 as a test sample, the variation of transmittance of a visible light and variation of a haze value were measured using an ultraviolet irradiation device after irradiation of UV-rays for 2 hours. Results are shown in table 5.

Example 59

Liquid A2 prepared in example 39 was added and mixed into polyethylene-terephthalate resin so that the concentration of the $Cs_{0.33}WO_3$ particles was 0.07 wt %, and the mixture was kneaded and excluded from T-die using a twin-screw excluder, to thereby obtain a heat-ray shielding film substrate on which the heat-ray shielding film was formed as a sheet having a thickness of 2 mm.

An ethylene-vinyl acetate copolymer sheet was interposed between one of the laminated plates which was a heat-ray shielding film substrate having the heat-ray shielding film formed thereon, and the other laminated plate which was an inorganic glass, and which were then integrally laminated by a publicly-known method (embodiment B-7), to thereby obtain a heat-ray shielding lamination structure 63 of example 59. Optical properties of the prepared structure 63 are son in table 5.

Regarding the prepared structure 63 as a test sample, the variation of transmittance of a visible light and variation of a haze value were measured using an ultraviolet irradiation device after irradiation of UV-rays for 2 hours. Results are shown in table 5.

Example 60

The intermediate film containing heat-ray shielding particles prepared in example 53 was interposed between one of the laminated plates which was a heat-ray shielding film substrate having the heat-ray shielding film formed thereon prepared in example 58, and the other laminated plate which was an inorganic glass, and which were then integrally laminated by a publicly-known method (embodiment B-1), to thereby obtain a heat-ray shielding lamination structure 64 of example 60. Optical properties of the prepared structure 64 are son in table 5.

Regarding the prepared structure 64 as a test sample, the variation of transmittance of a visible light and variation of a haze value were measured using an ultraviolet irradiation device after irradiation of UV-rays for 2 hours. Results are shown in table 5.

Example 61

The Liquid A2 prepared in example 39, thermosetting resin (solid portion 100%), and 4-methyl-2-pentanon were sufficiently mixed, to thereby obtain a coating liquid. The coating liquid was applied on an ethylene for intermediate film-vinyl acetate copolymer sheet not containing the heat-ray shielding particles using a bar coater to thereby forma film, and the film thus obtained was cured by heating at 130° C. for 30 minutes, to thereby obtain an intermediate film not containing particles having the heat-ray shielding function, with a heat-ray shielding film formed thereon.

The ethylene for intermediate film-vinyl acetate copolymer sheet not containing heat-ray shielding particles was arranged at the coating film side of the intermediate film with the heat-ray shielding film formed thereon, which was then interposed between two opposing inorganic glasses, and laminated integrally by a publicly-known method (embodiment A-5), to thereby obtain a heat-ray shielding lamination structure 65 of example 61. Optical properties of the prepared structure 65 are shown in table 5.

Regarding the prepared structure 65 as a test sample, the variation of transmittance of a visible light and variation of a haze value were measured using an ultraviolet irradiation device after irradiation of UV-rays for 2 hours. Results are shown in table 5.

Example 62

The Liquid A2 prepared in example 39, thermosetting resin (solid portion 100%), and 4-methyl-2-pentanon were sufficiently mixed, to thereby obtain a coating liquid. A polybutyral sheet was formed on one of the surfaces of a polyester film sheet as a peeling layer, and the coating liquid was applied on the peeling sheet using a bar coater to thereby form a film, and the film thus obtained was cured by heating at 130° C. for 30 minutes, to thereby obtain a heat-ray shielding film.

A polyvinyl butyral sheet for intermediate film not containing the particles having the heat-ray shielding function was formed on the heat-ray shielding film as an adhesive layer, to thereby obtain a transfer film 24 as a lamination body.

The adhesive layer of the transfer film 24 was adhered to an inner surface of one of the laminated plates of the inorganic glass by a publicly-known method, and the polyester film sheet was peeled off from the transfer film. A polyvinyl butyral sheet for intermediate film not containing the heat-ray shielding particles was arranged on the surface of the peeling layer from which the sheet was peeled, which were then laminated integrally with the inner surface of one of the laminated plates of the inorganic glass by a publicly-known method (embodiment A-6), to thereby obtain a heat-ray shielding lamination structure 66 of example 62. Optical properties of the prepared structure 66 are shown in table 5.

Regarding the prepared structure 66 as a test sample, the variation of transmittance of a visible light and variation of a haze value were measured using an ultraviolet irradiation device after irradiation of UV-rays for 2 hours. Results are shown in table 5.

Example 63

A heat-ray shielding lamination structure 67 of example 63 was obtained similarly to example 39, excluding a point that sodium carbonate was replaced with cesium carbonate. Optical properties of the prepared structure 67 are shown in table 5.

Regarding the prepared structure 67 as a test sample, the variation of transmittance of a visible light and variation of a haze value were measured using an ultraviolet irradiation device after irradiation of UV-rays for 2 hours. Results are shown in table 5.

Example 64

A heat-ray shielding lamination structure 68 of example 64 was obtained similarly to example 39, excluding a point that sodium carbonate was replaced with potassium carbonate. Optical properties of the prepared structure 68 are shown in table 6.

Regarding the prepared structure 68 as a test sample, the variation of transmittance of a visible light and variation of

Example 65

A heat-ray shielding lamination structure 69 of example 65 was obtained similarly to example 39, excluding a point that sodium carbonate was replaced with calcium carbonate as metal salt of carboxylic acids. Optical properties of the prepared structure 69 are shown in table 6.

Regarding the prepared structure 69 as a test sample, the variation of transmittance of a visible light and variation of a haze value were measured using an ultraviolet irradiation device after irradiation of UV-rays for 2 hours. Results are shown in table 6.

Example 66

A heat-ray shielding lamination structure 70 of example 66 was obtained similarly to example 39, excluding a point that sodium carbonate was replaced with strontium carbonate as metal salt of carboxylic acids. Optical properties of the prepared structure 70 are shown in table 6.

Regarding the prepared structure 70 as a test sample, the variation of transmittance of a visible light and variation of a haze value were measured using an ultraviolet irradiation device after irradiation of UV-rays for 2 hours. Results are shown in table 6.

Example 67

A heat-ray shielding lamination structure 71 of example 67 was obtained similarly to example 39, excluding a point that sodium carbonate was replaced with nickel carbonate as metal salt of carboxylic acids. Optical properties of the prepared structure 71 are shown in table 6.

Regarding the prepared structure 71 as a test sample, the variation of transmittance of a visible light and variation of a haze value were measured using an ultraviolet irradiation device after irradiation of UV-rays for 2 hours. Results are shown in table 6.

Example 68

A heat-ray shielding lamination structure 72 of example 68 was obtained similarly to example 39, excluding a point that sodium carbonate was replaced with cobalt carbonate as metal salt of carboxylic acids. Optical properties of the prepared structure 72 are shown in table 6.

Regarding the prepared structure 72 as a test sample, the variation of transmittance of a visible light and variation of a haze value were measured using an ultraviolet irradiation device after irradiation of UV-rays for 2 hours. Results are shown in table 6.

Example 69

A heat-ray shielding lamination structure 73 of example 69 was obtained similarly to example 39, excluding a point that sodium carbonate was replaced with copper carbonate (II) of metal salt of carboxylic acids. Optical properties of the prepared structure 73 are shown in table 6.

Regarding the prepared structure 73 as a test sample, the variation of transmittance of a visible light and variation of a haze value were measured using an ultraviolet irradiation device after irradiation of UV-rays for 2 hours. Results are shown in table 6.

Example 70

A heat-ray shielding lamination structure 74 of example 70 was obtained similarly to example 39, excluding a point that sodium carbonate was replaced with zinc carbonate as metal salt of carboxylic acids. Optical properties of the prepared structure 74 are shown in table 6.

Regarding the prepared structure 74 as a test sample, the variation of transmittance of a visible light and variation of a haze value were measured using an ultraviolet irradiation device after irradiation of UV-rays for 2 hours. Results are shown in table 6.

Comparative Example 5

A heat-ray shielding dispersion liquid (abbreviated as liquid K2 hereafter) of comparative example 5 was prepared, similarly to example 39 excluding a point that sodium carbonate was not added.

A heat-ray shielding lamination structure 75 of comparative example 5 was obtained similarly to example 39 excluding a point that liquid A2 was replaced with liquid K2. Optical properties of the prepared structure 75 are shown in table 6.

Regarding the prepared structure 75 as a test sample, the variation of transmittance of a visible light and variation of a haze value were measured using an ultraviolet irradiation device after irradiation of UV-rays for 2 hours. Results are shown in table 6.

Comparative Example 6

A heat-ray shielding lamination structure 76 of comparative example 6 was obtained similarly to example 39, excluding a point that 0.1 pts.wt. of sodium carbonate was added to 20 pts.wt. of $Cs_{0.33}WO_3$ particles (specific surface area: 20 m$^2$/g). Optical properties of the prepared structure 76 are shown in table 6.

Regarding the prepared structure 76 as a test sample, the variation of transmittance of a visible light and variation of a haze value were measured using an ultraviolet irradiation device after irradiation of UV-rays for 2 hours. Results are shown in table 6.

Comparative Example 7

A heat-ray shielding dispersion liquid (abbreviated as liquid L2 hereafter) of comparative example 7 was prepared, similarly to example 53 excluding a point that 40 pts.wt. of sodium carbonate was added to 20 pts.wt. of $Cs_{0.33}WO_3$ particles (specific surface area: 20 m$^2$/g).

A heat-ray shielding lamination structure 77 of comparative example 7 was obtained, similarly to example 53 excluding a point that the dispersion liquid used in example 53 was replaced with liquid L2. Optical properties of the prepared structure 77 are shown in table 6.

However, excessively large addition amounts of metal carbonates, involves a problem that adhesion between the inorganic glass and the intermediate film containing the heat-ray shielding particles is insufficient, and the intermediate film containing the heat-ray shielding particles is easily peeled off from the inorganic glass.

Therefore, the acceleration test was not executed.

Comparative Example 8

A heat-ray shielding dispersion liquid (abbreviated as liquid M2 hereafter) of comparative example 8 was prepared, similarly to example 52 excluding a point that sodium carbonate was not added.

A heat-ray shielding lamination structure 78 of comparative example 8 was obtained, similarly to example 52 excluding a point that liquid E2 was replaced with liquid M2. Optical properties of the prepared structure 78 are shown in table 6.

Regarding the prepared structure 78 as a test sample, the variation of transmittance of a visible light and variation of a haze value were measured using an ultraviolet irradiation device after irradiation of UV-rays for 2 hours. Results are shown in table 6.

TABLE 4

| | Mixture of raw materials | | | | |
| --- | --- | --- | --- | --- | --- |
| | Particle having heat-ray shielding function | | Metal salt | | |
| | Kind | Addition amount (Pts. wt.) | Kind | Addition amount (Pts. wt.) | Interlayer resin |
| Example 39 | $Cs_{0.33}WO_3$ | 20 | Sodium carbonate | 2 | Ethylene-vinyl acetate copolymer | Lamination structure 43 |
| Example 40 | $Rb_{0.33}WO_3$ | 20 | Sodium carbonate | 2 | Ethylene-vinyl acetate copolymer | Lamination structure 44 |
| Example 41 | $K_{0.33}WO_3$ | 20 | Sodium carbonate | 4 | Ethylene-vinyl acetate copolymer | Lamination structure 45 |
| Example 42 | $Tl_{0.33}WO_3$ | 20 | Sodium carbonate | 0.6 | Ethylene-vinyl acetate copolymer | Lamination structure 46 |
| Example 43 | $Cs_{0.33}WO_3$ | 20 | Manganese carbonate | 2 | Ethylene-vinyl acetate copolymer | Lamination structure 47 |
| Example 44 | $Cs_{0.33}WO_3$ | 20 | Lithium carbonate | 2 | Ethylene-vinyl acetate copolymer | Lamination structure 48 |
| Example 45 | $Cs_{0.33}WO_3$ | 20 | Rubidium carbonate | 2 | Ethylene-vinyl acetate copolymer | Lamination structure 49 |
| Example 46 | $Cs_{0.33}WO_3$ | 20 | Magnesium carbonate hydroxide | 2 | Ethylene-vinyl acetate copolymer | Lamination structure 50 |
| Example 47 | $Cs_{0.33}WO_3$ | 20 | Sodium carbonate | 1 | Ethylene-vinyl acetate copolymer | Lamination structure 51 |
| Example 48 | $Cs_{0.33}WO_3$ | 20 | Sodium carbonate | 0.2 | Ethylene-vinyl acetate copolymer | Lamination structure 52 |
| Example 49 | $Cs_{0.33}WO_3$ | 20 | Sodium carbonate | 10 | Ethylene-vinyl acetate copolymer | Lamination structure 53 |
| Example 50 | $Cs_{0.33}WO_3$ | 20 | Sodium carbonate | 20 | Ethylene-vinyl acetate copolymer | Lamination structure 54 |
| Example 51 | $Cs_{0.33}WO_3$ | 20 | Sodium carbonate | 2 | polyvinyl butyral | Lamination structure 55 |

| | | | Lamination structure | | | | |
| --- | --- | --- | --- | --- | --- | --- | --- |
| | | | Initial property | | | Acceleration test | |
| | Form | Substrate | Visible light transmittance (%) | Solar transmittance (%) | Haze value (%) | ∆ Visible light transmittance (%) | ∆ Haze (%) |
| Example 39 | A-4 | Glass/glass | 69.9 | 33.7 | 0.8 | −3.7 | 0.1 |
| Example 40 | A-4 | Glass/glass | 69.5 | 33.7 | 0.9 | −3.3 | 0.1 |
| Example 41 | A-4 | Glass/glass | 70.0 | 33.8 | 1.0 | −3.5 | 0.2 |
| Example 42 | A-4 | Glass/glass | 69.5 | 33.4 | 0.9 | −6.2 | 0 |
| Example 43 | A-4 | Glass/glass | 71.4 | 35.1 | 0.8 | −5.1 | 0.1 |
| Example 44 | A-4 | Glass/glass | 68.8 | 32.3 | 0.9 | −6.2 | 0.1 |
| Example 45 | A-4 | Glass/glass | 69.2 | 33.0 | 0.8 | −2.6 | 0.1 |
| Example 46 | A-4 | Glass/glass | 68.6 | 32.4 | 0.8 | −5.3 | 0.2 |
| Example 47 | A-4 | Glass/glass | 70.8 | 34.7 | 0.8 | −5.7 | 0 |
| Example 48 | A-4 | Glass/glass | 67.6 | 31.4 | 0.7 | −6.5 | 0 |
| Example 49 | A-4 | Glass/glass | 69.7 | 33.4 | 1.0 | −2.4 | 0.3 |
| Example 50 | A-4 | Glass/glass | 70.3 | 34.2 | 1.0 | −1.9 | 0.5 |
| Example 51 | A-4 | Glass/glass | 69.8 | 33.6 | 0.8 | −3.5 | 0.1 |

TABLE 5

| | Mixture of raw materials | | | | | |
|---|---|---|---|---|---|---|
| | Particle having heat-ray shielding function | | Metal salt | | | |
| | Kind | Addition amount (Pts. wt.) | Kind | Addition amount (Pts. wt.) | Interlayer resin | |
| Example 52 | $Cs_{0.33}WO_3$ | 20 | Sodium carbonate | 2 | polyvinyl butyral | Lamination structure 56 |
| Example 53 | $Cs_{0.33}WO_3$ | 20 | Sodium carbonate | 2 | Ethylene-vinyl acetate copolymer | Lamination structure 57 |
| Example 54 | $Cs_{0.33}WO_3$ | 20 | Sodium carbonate | 2 | Ethylene-vinyl acetate copolymer | Lamination structure 58 |
| Example 55 | $Cs_{0.33}WO_3$ | 20 | Sodium carbonate | 2 | polyvinyl butyral | Lamination structure 59 |
| Example 56 | $Cs_{0.33}WO_3$ | 20 | Sodium carbonate | 2 | Ethylene-vinyl acetate copolymer | Lamination structure 60 |
| Example 57 | $Cs_{0.33}WO_3$ | 20 | Sodium carbonate | 2 | polyvinyl butyral | Lamination structure 61 |
| Example 58 | $Cs_{0.33}WO_3$ | 20 | Sodium carbonate | 2 | polyvinyl butyral | Lamination structure 62 |
| Example 59 | $Cs_{0.33}WO_3$ | 20 | Sodium carbonate | 2 | Ethylene-vinyl acetate copolymer | Lamination structure 63 |
| Example 60 | $Cs_{0.33}WO_3$ | 20 | Sodium carbonate | 2 | Ethylene-vinyl acetate copolymer | Lamination structure 64 |
| Example 61 | $Cs_{0.33}WO_3$ | 20 | Sodium carbonate | 2 | Ethylene-vinyl acetate copolymer | Lamination structure 65 |
| Example 62 | $Cs_{0.33}WO_3$ | 20 | Sodium carbonate | 2 | polyvinyl butyral | Lamination structure 66 |
| Example 63 | $Cs_{0.33}WO_3$ | 20 | Cesium carbonate | 2 | Ethylene-vinyl acetate copolymer | Lamination structure 67 |

| | Lamination structure | | Initial property | | | Acceleration test | |
|---|---|---|---|---|---|---|---|
| | Form | Substrate | Visible light transmittance (%) | Solar transmittance (%) | Haze value (%) | ⊿Visible light transmittance (%) | ⊿Haze (%) |
| Example 52 | A-1 | Glass/glass | 70.1 | 34.0 | 0.6 | −3.0 | 0.1 |
| Example 53 | A-1 | Glass/glass | 71.4 | 35.3 | 0.5 | −2.9 | 0 |
| Example 54 | A-1 | Polycarbonate/glass | 70.1 | 34.2 | 0.5 | −3.2 | 0.1 |
| Example 55 | A-3 | Glass/glass | 70.6 | 34.6 | 0.7 | −3.8 | 0.1 |
| Example 56 | A-3 | PET/glass | 70.7 | 34.7 | 0.5 | −4.1 | 0.2 |
| Example 57 | A-2 | Glass/glass | 69.0 | 32.8 | 0.6 | −3.3 | 0.1 |
| Example 58 | B-7 | Polycarbonate/glass | 67.2 | 31.1 | 0.7 | −3.9 | 0.1 |
| Example 59 | B-7 | PET/glass | 69.3 | 32.9 | 0.7 | −4.2 | 0 |
| Example 60 | B-1 | Polycarbonate/glass | 69.2 | 33.0 | 0.6 | −4.5 | 0.1 |
| Example 61 | A-5 | Glass/glass | 69.9 | 33.9 | 0.6 | −3.3 | 0 |
| Example 62 | A-6 | Glass/glass | 68.7 | 32.7 | 0.6 | −4.1 | 0.1 |
| Example 63 | A-4 | Glass/glass | 70.0 | 33.9 | 0.8 | −2.5 | 0.3 |

TABLE 6

| | Mixture of raw materials | | | | | |
|---|---|---|---|---|---|---|
| | Particle having heat-ray shielding function | | Metal salt | | | |
| | Kind | Addition amount (Pts. wt.) | Kind | Addition amount (Pts. wt.) | Interlayer resin | |
| Example 64 | $Cs_{0.33}WO_3$ | 20 | Potassium carbonate | 2 | Ethylene-vinyl acetate copolymer | Lamination structure 68 |
| Example 65 | $Cs_{0.33}WO_3$ | 20 | Calcium carbonate | 2 | Ethylene-vinyl acetate copolymer | Lamination structure 69 |

TABLE 6-continued

| | | | | | | |
|---|---|---|---|---|---|---|
| Example 66 | $Cs_{0.33}WO_3$ | 20 | Strontium carbonate | 2 | Ethylene-vinyl acetate copolymer | Lamination structure 70 |
| Example 67 | $Cs_{0.33}WO_3$ | 20 | Nickel carbonate | 2 | Ethylene-vinyl acetate copolymer | Lamination structure 71 |
| Example 68 | $Cs_{0.33}WO_3$ | 20 | Cobalt carbonate | 2 | Ethylene-vinyl acetate copolymer | Lamination structure 72 |
| Example 69 | $Cs_{0.33}WO_3$ | 20 | Copper carbonate (II) | 2 | Ethylene-vinyl acetate copolymer | Lamination structure 73 |
| Example 70 | $Cs_{0.33}WO_3$ | 20 | Zinc carbonate | 2 | Ethylene-vinyl acetate copolymer | Lamination structure 74 |
| Comparative example 5 | $Cs_{0.33}WO_3$ | 20 | Not added | 0 | Ethylene-vinyl acetate copolymer | Lamination structure 75 |
| Comparative example 6 | $Cs_{0.33}WO_3$ | 20 | Sodium carbonate | 0.1 | Ethylene-vinyl acetate copolymer | Lamination structure 76 |
| Comparative example 7 | $Cs_{0.33}WO_3$ | 20 | Sodium carbonate | 40 | Ethylene-vinyl acetate copolymer | Lamination structure 77 |
| Comparative example 8 | $Cs_{0.33}WO_3$ | 20 | Not added | 0 | polyvinyl butyral | Lamination structure 78 |

| | Lamination structure | | | | | |
|---|---|---|---|---|---|---|
| | | | Initial property | | Acceleration test | |
| | | | | | $\varDelta$ Visible light trans- | |
| | | | Solar trans- | Haze | mittance | $\varDelta$ Haze |
| | Form | Substrate | mittance (%) | value (%) | (%) | (%) |
| Example 64 | A-4 | Glass/glass | 70.1 | 34.1 | 0.9 | -6.5 | 0.5 |
| Example 65 | A-4 | Glass/glass | 67.0 | 30.4 | 1.0 | -8.2 | 0.2 |
| Example 66 | A-4 | Glass/glass | 67.9 | 31.4 | 1.0 | -8.9 | 2.2 |
| Example 67 | A-4 | Glass/glass | 70.3 | 34.6 | 0.8 | -9.2 | 2.5 |
| Example 68 | A-4 | Glass/glass | 69.0 | 32.7 | 1 | -10.3 | 2.3 |
| Example 69 | A-4 | Glass/glass | 69.9 | 33.7 | 0.8 | -9.8 | 2.6 |
| Example 70 | A-4 | Glass/glass | 67.7 | 31.6 | 1.1 | -7.9 | 2 |
| Comparative example 5 | A-4 | Glass/glass | 67.9 | 31.8 | 0.7 | -13.1 | 0 |
| Comparative example 6 | A-4 | Glass/glass | 70.9 | 35.4 | 0.8 | -13.0 | 0 |
| Comparative example 7 | A-1 | Glass/glass | 70.2 | 34.2 | 1.5 | Not tested | |
| Comparative example 8 | A-1 | Glass/glass | 71.4 | 35.1 | 0.4 | -11.9 | 0 |

[Evaluation]

From the results of tables 4 to 6, it is found that by adding a suitable amount of metal carbonate or carbonate hydroxide in the composite tungsten oxide particles, heat-ray shielding lamination structures 43 to 74 having high visible light transmittance, high heat-ray shielding property, low haze value and excellent transparency, can be obtained.

Above all, in the heat-ray shielding lamination structures 43 to 68 of examples 39 to 64 with suitable amounts of sodium, potassium, magnesium, manganese, cesium, lithium, and rubidium added thereto, as a result of carrying out the acceleration test of irradiation of UV-rays for 2 hours, a remarkable effect was found such that the variation rate of the initial visible light transmittance was suppressed to half or less.

Further, in the heat-ray shielding lamination structures 43 to 68 of examples 39 to 64, as a result of carrying out the acceleration test of irradiation of UV-rays for 2 hours, it was found that the increase of the haze value was within a range of 0.5% or less.

Meanwhile, in comparative examples 5, 6, and 8, metal carbonate or carbonate hydroxide was not added, or the addition amount were excessively small, and therefore the variation of the visible light transmittance was increased in the acceleration test. Also, in comparative example 7, the addition amount of the carbonate was excessively large, and therefore adhesion to the inorganic glass was damaged, which was an important physical property of the lamination structure.

Example 71

20 pts.wt. of $Cs_{0.33}WO_3$ particles (specific surface area: 20 $m^2$/g), 2 pts.wt. of rubidium hydroxide, 58 pts.wt. of 4-methyl-2-pentanon, and 20 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersion particle size of 80 nm, and rubidium hydroxide n-hydrate (Liquid A3).

Wherein, 70 mass % of rubidium hydroxide was contained in the rubidium hydroxide n-hydrate. The same thing can be said for the following examples and comparative examples.

The liquid A3, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was cured by heating at 130° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 79 of example 71. Optical properties of the prepared structure 79 are shown in table 7.

Regarding the prepared structure 79 as a test sample, the variation of transmittance of a visible light and variation of a haze value were measured using an ultraviolet irradiation device, after irradiation of UV-rays for 2 hours. Results are shown in table 7.

Example 72

20 pts.wt. pf $Rb_{0.33}WO_3$ particles (specific surface area: 20 $m^2/g$), 2 pts.wt. of rubidium hydroxide n-hydrate, 58 pts.wt. of 4-methyl-2-pentanon, and 20 pts.wt. pf a dispersant for dispersing particles, were mixed, and a mixture was subjected to dispersion treatment by a medium stirring mill, to thereby prepare a dispersion liquid of $Rb_{0.33}WO_3$ particles having an average dispersion particle size of 80 nm, and rubidium hydroxide n-hydrate (Liquid B3).

The Liquid B3, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was sintered at 120° C. for 30 minutes, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 80 of example 72. Optical properties of the prepared structure 80 are shown in table 7.

Regarding the prepared structure 80 as a test sample, the variation of transmittance of a visible light and variation of a haze value were measured using an ultraviolet irradiation device, after irradiation of UV-rays for 2 hours. Results are shown in table 7.

Example 74

20 pts.wt. of $Tl_{0.33}WO_3$ particles (specific surface area: 20 $m^2/g$), 0.6 pts.wt. of rubidium hydroxide n-hydrate, 59.4 pts.wt. of 4-methyl-2-pentanon, and 20 pts.wt. of a dispersant for dispersing particles, were mixed, and a mixture was subjected to dispersion treatment by a medium stirring mill, to thereby prepare a dispersion liquid of $Tl_{0.33}WO_3$ particles having an average dispersion particle size of 80 nm, and rubidium hydroxide n-hydrate (Liquid D3).

The liquid D3, thermosetting resin (solid portion 100%), and 4-methyl-2-pentanon were sufficiently mixed, to thereby obtain a coating liquid. The coating liquid was applied on a polyethylene-terephthalate film (PET) using a bar coater to thereby form a film, and the film thus obtained was dried at 70° C. for 2 minutes to evaporate a solvent and thereafter was cured by a high-pressure mercury lamp, to thereby obtain a heat-ray shielding film substrate with a heat-ray shielding film formed thereon.

The heat-ray shielding film substrate with the heat-ray shielding film formed thereon was arranged between two intermediate film ethylene-vinyl acetate copolymer sheet not containing particles having a heat-ray shielding function, which was then interposed between two opposing inorganic glasses, and laminated integrally by a publicly-known method (embodiment A-4), to thereby obtain a heat-ray shielding lamination structure 82 of example 74. Optical properties of the prepared structure 82 are shown in table 7.

Regarding the prepared structure 82 as a test sample, the variation of transmittance of a visible light and variation of a haze value were measured using an ultraviolet irradiation device, after irradiation of UV-rays for 2 hours. Results are shown in table 7.

Example 75

A heat-ray shielding lamination structure 83 of example 75 was obtained similarly to example 71, excluding a point that sodium carbonate was replaced with manganese carbonate as metal salt of carboxylic acids. Optical properties of the prepared structure 83 are shown in table 7.

Regarding the prepared structure 83 as a test sample, the variation of transmittance of a visible light and variation of a haze value were measured using an ultraviolet irradiation device after irradiation of UV-rays for 2 hours. Results are shown in table 7.

Example 76

A heat-ray shielding lamination structure 84 of example 76 was obtained similarly to example 71, excluding a point that rubidium hydroxide n-hydrate was replaced with cesium hydroxide monohydrate as metal hydroxide. Optical properties of the prepared structure 84 are shown in table 7.

Regarding the prepared structure 84 as a test sample, the variation of transmittance of a visible light and variation of a haze value were measured using an ultraviolet irradiation device after irradiation of UV-rays for 2 hours. Results are shown in table 7.

Example 77

A heat-ray shielding lamination structure 85 of example 77 was obtained similarly to example 71, excluding a point that rubidium hydroxide n-hydrate was replaced with sodium hydroxide-hydrate as metal hydroxide. Optical properties of the prepared structure 85 are shown in table 7.

Regarding the prepared structure 85 as a test sample, the variation of transmittance of a visible light and variation of a haze value were measured using an ultraviolet irradiation device after irradiation of UV-rays for 2 hours. Results are shown in table 7.

Example 78

A heat-ray shielding lamination structure 86 of example 78 was obtained similarly to example 71, excluding a point that rubidium hydroxide n-hydrate was replaced with lithium hydroxide dihydrate as metal hydroxide. Optical properties of the prepared structure 86 are shown in table 7.

Regarding the prepared structure 86 as a test sample, the variation of transmittance of a visible light and variation of a haze value were measured using an ultraviolet irradiation device after irradiation of UV-rays for 2 hours. Results are shown in table 7.

Example 79

A heat-ray shielding lamination structure 87 of example 79 was obtained similarly to example 71, excluding a point that rubidium hydroxide n-hydrate was replaced with manganese hydroxide (II) as metal hydroxide. Optical properties of the prepared structure 87 are shown in table 7.

Regarding the prepared structure 87 as a test sample, the variation of transmittance of a visible light and variation of a haze value were measured using an ultraviolet irradiation device after irradiation of UV-rays for 2 hours. Results are shown in table 7.

Example 80

A heat-ray shielding lamination structure 88 of example 80 was obtained similarly to example 71, excluding a point that 1 pts.wt. of rubidium hydroxide n-hydrate was added to 20 pts.wt. of $Cs_{0.33}WO_3$ particles (specific surface area: 20 m$^2$/g). Optical properties of the prepared structure 88 are shown in table 8.

Regarding the prepared structure 88 as a test sample, the variation of transmittance of a visible light and variation of a haze value were measured using an ultraviolet irradiation device after irradiation of UV-rays for 2 hours. Results are shown in table 8.

Example 81

A heat-ray shielding lamination structure 89 of example 81 was obtained similarly to example 71, excluding a point that 0.2 pts.wt. of rubidium hydroxide n-hydrate was added to 20 pts.wt. of $Cs_{0.33}WO_3$ particles (specific surface area: 20 m$^2$/g). Optical properties of the prepared structure 89 are shown in table 8.

Regarding the prepared structure 89 as a test sample, the variation of transmittance of a visible light and variation of a haze value were measured using an ultraviolet irradiation device after irradiation of UV-rays for 2 hours. Results are shown in table 8.

Example 82

A heat-ray shielding lamination structure 90 of example 82 was obtained similarly to example 71, excluding a point that 10 pts.wt. of rubidium hydroxide n-hydrate was added to 20 pts.wt. of $Cs_{0.33}WO_3$ particles (specific surface area: 20 m$^2$/g). Optical properties of the prepared structure 90 are shown in table 8.

Regarding the prepared structure 90 as a test sample, the variation of transmittance of a visible light and variation of a haze value were measured using an ultraviolet irradiation device after irradiation of UV-rays for 2 hours. Results are shown in table 8.

Example 83

A heat-ray shielding lamination structure 91 of example 83 was obtained similarly to example 71, excluding a point that 20 pts.wt. of rubidium hydroxide n-hydrate was added to 20 pts.wt. of $Cs_{0.33}WO_3$ particles (specific surface area: 20 m$^2$/g). Optical properties of the prepared structure 91 are shown in table 8.

Regarding the prepared structure 91 as a test sample, the variation of transmittance of a visible light and variation of a haze value were measured using an ultraviolet irradiation device after irradiation of UV-rays for 2 hours. Results are shown in table 8.

Example 84

A heat-ray shielding lamination structure 92 of example 84 was obtained similarly to example 71, excluding a point that ethylene for intermediate film-vinyl acetate copolymer sheet was replaced with a polyvinyl butyral sheet for intermediate film. Optical properties of the prepared structure 92 are shown in table 8.

Regarding the prepared structure 92 as a test sample, the variation of transmittance of a visible light and variation of a haze value were measured using an ultraviolet irradiation device after irradiation of UV-rays for 2 hours. Results are shown in table 8.

Example 85

20 pts.wt. of $Cs_{0.33}WO_3$ particles (specific surface area: 20 m$^2$/g), 2 pts.wt. of rubidium hydroxide n-hydrate, 58 pts.wt. of triethylene glycol di-2-ethylhexanoate (abbreviated as plasticizer a hereafter), and 20 pts.wt. of a dispersant for dispersing particles, were mixed, and a mixture was subjected to dispersion treatment by a medium stirring mill, to thereby prepare a dispersion liquid of $Cs_{0.33}WO_3$ particles having an average dispersion particle size of 80 nm, and rubidium hydroxide n-hydrate (Liquid E3).

A specific amount of Liquid E3 was added into a mixed composition in which 30 pts.wt. of plasticizer 1 and 70 pts.wt. of polyvinyl butyral resin were mixed, to thereby obtain 0.15 wt % of concentration of the $Cs_{0.33}WO_3$ particles in the composition. The composition was kneaded at 200° C. using a twin-screw excluder, to thereby obtain an intermediate film containing heat-ray shielding particles as a sheet having a thickness of 0.7 mm, from T-die using a calender roll method.

The obtained intermediate film containing the heat-ray shielding particles was interposed between two opposing inorganic glasses so as to be integrally laminated by a publicly-known method (embodiment A-1), to thereby obtain a heat-ray shielding lamination structure 93 of example 85. Optical properties of the prepared structure 93 are shown in table 8.

Regarding the prepared structure 93 as a test sample, the variation of transmittance of a visible light and variation of a haze value were measured using an ultraviolet irradiation device after irradiation of UV-rays for 2 hours. Results are shown in table 8.

Example 86

A heat-ray shielding lamination structure 94 of example 86 was obtained similarly to example 85, excluding a point that polyvinyl butyral resin was replaced with an ethylene-vinyl acetate copolymer as vinyl resin. Optical properties of the prepared structure 94 are shown in table 8.

Regarding the prepared structure 94 as a test sample, the variation of transmittance of a visible light and variation of a haze value were measured using an ultraviolet irradiation device after irradiation of UV-rays for 2 hours. Results are shown in table 8.

Example 87

A heat-ray shielding lamination structure 95 of example 87 was obtained similarly to example 86, excluding a point that one of the two inorganic glasses was replaced with a polycarbonate plate. Optical properties of the prepared structure 95 are shown in table 8.

Regarding the prepared structure 95 as a test sample, the variation of transmittance of a visible light and variation of a haze value were measured using an ultraviolet irradiation device after irradiation of UV-rays for 2 hours. Results are shown in table 8.

Example 88

Liquid A3 prepared in example 71 and thermosetting resin (solid portion: 100%), and 4-methyl-2-pentanon were sufficiently mixed to thereby obtain a coating liquid. The coating liquid was applied on an inorganic glass using a bar coater, and curing this film by heating at 130° C. for 30 minutes, to thereby obtain a heat-ray shielding film.

Next, an inorganic glass having no heat-ray shielding film formed thereon, and the inorganic glass having the heat-ray shielding film formed thereon, are opposed to each other so that the heat-ray shielding film is arranged inside, and a polyvinyl butyral sheet for intermediate film not containing particles having the heat-ray shielding function was arranged between these inorganic glasses, which were then integrally laminated by a publicly-known method (embodiment A-3), to thereby obtain a heat-ray shielding lamination structure 96 of example 88. Optical properties of the prepared structure 96 are shown in table 8.

Regarding the prepared structure 96 as a test sample, the variation of transmittance of a visible light and variation of a haze value were measured using an ultraviolet irradiation device after irradiation of UV-rays for 2 hours. Results are shown in table 8.

Example 89

Ethylene for intermediate film-vinyl acetate copolymer sheet not containing particles having the heat-ray shielding function, was interposed between a heat-ray shielding film side of the inorganic glass prepared in example 88 and having the heat-ray shielding film formed thereon, and a polyethylene-terephthalate film (PET), and which were then integrally laminated by a publicly-known method (embodiment A-3), to thereby obtain a heat-ray shielding lamination structure 97 of example 89. Optical properties of the prepared structure 97 are shown in table 2.

Regarding the prepared structure 97 as a test sample, the variation of transmittance of a visible light and variation of a haze value were measured using an ultraviolet irradiation device after irradiation of UV-rays for 2 hours. Results are shown in table 8.

Example 90

An intermediate film containing heat-ray shielding particles prepared in example 85 was interposed between two polyvinyl butyral sheets for the intermediate film not containing the heat-ray shielding particles, and further interposed between two opposed inorganic glasses, and which were then integrally laminated by a publicly-known method (embodiment A-2), to thereby obtain a heat-ray shielding lamination structure 98 of example 90. Optical properties of the prepared structure 98 are shown in table 8.

Regarding the prepared structure 98 as a test sample, the variation of transmittance of a visible light and variation of a haze value were measured using an ultraviolet irradiation device after irradiation of UV-rays for 2 hours. Results are shown in table 8.

Example 91

Liquid A3 prepared in example 71 was added and mixed into polycarbonate resin so that the concentration of the $Cs_{0.33}WO_3$ particles was 0.07 wt %, and the mixture was kneaded and excluded from T-die using a twin-screw excluder, to thereby obtain a heat-ray shielding film substrate on which the heat-ray shielding film was formed as a sheet having a thickness of 2 mm.

The polyvinyl butyral sheet was interposed between one of the laminated plates which was a heat-ray shielding film substrate having the heat-ray shielding film formed thereon, and the other laminated plate which was an inorganic glass, and which were then integrally laminated by a publicly-known method (embodiment B-7), to thereby obtain a heat-ray shielding lamination structure 99 of example 91. Optical properties of the prepared structure 99 are son in table 0.

Regarding the prepared structure 99 as a test sample, the variation of transmittance of a visible light and variation of a haze value were measured using an ultraviolet irradiation device after irradiation of UV-rays for 2 hours. Results are shown in table 9.

Example 92

Liquid A3 prepared in example 71 was added and mixed into polyethylene-terephthalate resin so that the concentration of the $Cs_{0.33}WO_3$ particles was 0.07 wt %, and the mixture was kneaded and excluded from T-die using a twin-screw excluder, to thereby obtain a heat-ray shielding film substrate on which the heat-ray shielding film was formed as a sheet having a thickness of 2 mm.

An ethylene-vinyl acetate copolymer sheet was interposed between one of the laminated plates which was a heat-ray shielding film substrate having the heat-ray shielding film formed thereon, and the other laminated plate which was an inorganic glass, and which were then integrally laminated by a publicly-known method (embodiment B-7), to thereby obtain a heat-ray shielding lamination structure 100 of example 92. Optical properties of the prepared structure 100 are son in table 9.

Regarding the prepared structure 100 as a test sample, the variation of transmittance of a visible light and variation of a haze value were measured using an ultraviolet irradiation device after irradiation of UV-rays for 2 hours. Results are shown in table 9.

Example 93

The intermediate film containing heat-ray shielding particles prepared in example 86 was interposed between one of the laminated plates which was a heat-ray shielding film substrate having the heat-ray shielding film formed thereon prepared in example 91, and the other laminated plate which was an inorganic glass, and which were then integrally laminated by a publicly-known method (embodiment B-1), to thereby obtain a heat-ray shielding lamination structure 101 of example 93. Optical properties of the prepared structure 101 are son in table 9.

Regarding the prepared structure 101 as a test sample, the variation of transmittance of a visible light and variation of a haze value were measured using an ultraviolet irradiation device after irradiation of UV-rays for 2 hours. Results are shown in table 9.

Example 94

The Liquid A3 prepared in example 71, thermosetting resin (solid portion 100%), and 4-methyl-2-pentanon were sufficiently mixed, to thereby obtain a coating liquid. The coating liquid was applied on an ethylene for intermediate film-vinyl acetate copolymer sheet not containing the heat-ray shielding particles using a bar coater to thereby forma film, and the film thus obtained was cured by heating at 130° C. for 30 minutes, to thereby obtain an intermediate film not containing particles having the heat-ray shielding function, with a heat-ray shielding film formed thereon.

The ethylene for intermediate film-vinyl acetate copolymer sheet not containing heat-ray shielding particles was arranged at the coating film side of the intermediate film with the heat-ray shielding film formed thereon, which were then interposed between two opposing inorganic glasses, and laminated integrally by a publicly-known method (embodiment A-5), to thereby obtain a heat-ray shielding lamination structure 102 of example 94. Optical properties of the prepared structure 102 are shown in table 9.

Regarding the prepared structure 102 as a test sample, the variation of transmittance of a visible light and variation of a haze value were measured using an ultraviolet irradiation device after irradiation of UV-rays for 2 hours. Results are shown in table 9.

Example 95

The Liquid A3 prepared in example 71, thermosetting resin (solid portion 100%), and 4-methyl-2-pentanon were sufficiently mixed, to thereby obtain a coating liquid. A polyvinyl butyral sheet was formed as a peeling layer on one of the surfaces of the polyester film sheet, and the coating liquid was applied on the peeling layer using a bar coater, to thereby form a film and the film thus obtained was cured by heating at 130° C. for 30 minutes, to thereby obtain a heat-ray shielding film.

A polybutyral sheet for intermediate film not containing the particles having the heat-ray shielding function, was formed on the heat-ray shielding film as an adhesive layer, to thereby obtain a transfer film 25 as a lamination body.

One of the adhesive layers of the transfer film 25 is adhered to an inner surface of one of the laminated plates of the inorganic glass by a publicly-known method, and the polyester film sheet was peeled off from the transfer film. A polyvinyl butyral sheet for intermediate film not containing the heat-ray shielding particles was arranged on the surface of the peeling layer from which the sheet was peeled, and was integrally laminated with the inner surface of the other laminated plate of the inorganic glass by a publicly-known method (embodiment A-6), to thereby obtain a heat-ray shielding lamination structure 103 of example 95. Optical properties of the prepared structure 103 are shown in table 9.

Regarding the prepared structure 103 as a test sample, the variation of transmittance of a visible light and variation of a haze value were measured using an ultraviolet irradiation device after irradiation of UV-rays for 2 hours. Results are shown in table 9.

Example 96

A heat-ray shielding lamination structure 104 of example 96 was obtained similarly to example 71, excluding a point that rubidium hydroxide n-hydrate was replaced with potassium hydroxide. Optical properties of the prepared structure 104 are shown in table 9.

Regarding the prepared structure 104 as a test sample, the variation of transmittance of a visible light and variation of a haze value were measured using an ultraviolet irradiation device after irradiation of UV-rays for 2 hours. Results are shown in table 9.

Example 97

A heat-ray shielding lamination structure 105 of example 97 was obtained similarly to example 71, excluding a point that rubidium hydroxide n-hydrate was replaced with potassium hydroxide as metal hydroxide. Optical properties of the prepared structure 105 are shown in table 9.

Regarding the prepared structure 105 as a test sample, the variation of transmittance of a visible light and variation of a haze value were measured using an ultraviolet irradiation device after irradiation of UV-rays for 2 hours. Results are shown in table 9.

Example 98

A heat-ray shielding lamination structure 106 of example 98 was obtained similarly to example 71, excluding a point that rubidium hydroxide n-hydrate was replaced with strontium octahydrate as metal hydroxide. Optical properties of the prepared structure 106 are shown in table 9.

Regarding the prepared structure 106 as a test sample, the variation of transmittance of a visible light and variation of a haze value were measured using an ultraviolet irradiation device after irradiation of UV-rays for 2 hours. Results are shown in table 9.

Example 99

A heat-ray shielding lamination structure 107 of example 99 was obtained similarly to example 71, excluding a point that rubidium hydroxide n-hydrate was replaced with copper hydroxide (II) as metal hydroxide. Optical properties of the prepared structure 107 are shown in table 9.

Regarding the prepared structure 107 as a test sample, the variation of transmittance of a visible light and variation of a haze value were measured using an ultraviolet irradiation device after irradiation of UV-rays for 2 hours. Results are shown in table 9.

Example 100

A heat-ray shielding lamination structure 108 of example 100 was obtained similarly to example 71, excluding a point that rubidium hydroxide n-hydrate was replaced with nickel hydroxide (II) as metal hydroxide. Optical properties of the prepared structure 108 are shown in table 9.

Regarding the prepared structure 108 as a test sample, the variation of transmittance of a visible light and variation of a haze value were measured using an ultraviolet irradiation device after irradiation of UV-rays for 2 hours. Results are shown in table 9.

Example 101

A heat-ray shielding lamination structure 109 of example 101 was obtained similarly to example 71, excluding a point that rubidium hydroxide n-hydrate was replaced with barium hydroxide octahydrate as metal hydroxide. Optical properties of the prepared structure 109 are shown in table 9.

Regarding the prepared structure 109 as a test sample, the variation of transmittance of a visible light and variation of a haze value were measured using an ultraviolet irradiation device after irradiation of UV-rays for 2 hours. Results are shown in table 9.

Example 102

A heat-ray shielding lamination structure 110 of example 102 was obtained similarly to example 71, excluding a point that rubidium hydroxide was replaced with zinc hydroxide as metal hydroxide. Optical properties of the prepared structure 110 are shown in table 9.

Regarding the prepared structure 110 as a test sample, the variation of transmittance of a visible light and variation of a haze value were measured using an ultraviolet irradiation device after irradiation of UV-rays for 2 hours. Results are shown in table 9.

Example 103

A heat-ray shielding lamination structure 111 of example 103 was obtained similarly to example 71, excluding a point that rubidium hydroxide n-hydrate was replaced with cobalt hydroxide as metal hydroxide. Optical properties of the prepared structure 111 are shown in table 9.

Regarding the prepared structure 111 as a test sample, the variation of transmittance of a visible light and variation of a haze value were measured using an ultraviolet irradiation device after irradiation of UV-rays for 2 hours. Results are shown in table 9.

Example 104

A heat-ray shielding lamination structure 112 of example 104 was obtained similarly to example 71, excluding a point that rubidium hydroxide n-hydrate was replaced with cerium hydroxide (IV) as metal hydroxide. Optical properties of the prepared structure 112 are shown in table 9.

Regarding the prepared structure 112 as a test sample, the variation of transmittance of a visible light and variation of a haze value were measured using an ultraviolet irradiation device after irradiation of UV-rays for 2 hours. Results are shown in table 9.

Example 105

A heat-ray shielding lamination structure 113 of example 105 was obtained similarly to example 71, excluding a point that rubidium hydroxide n-hydrate was replaced with iron oxide hydroxide (III) as metal hydroxide. Optical properties of the prepared structure 113 are shown in table 9.

Regarding the prepared structure 113 as a test sample, the variation of transmittance of a visible light and variation of a haze value were measured using an ultraviolet irradiation device after irradiation of UV-rays for 2 hours. Results are shown in table 9.

Comparative Example 9

A heat-ray shielding dispersion liquid (abbreviated as liquid K3 hereafter) of comparative example 9 was prepared, similarly to example 71 excluding a point that rubidium hydroxide n-hydrate was not added.

A heat-ray shielding lamination structure 114 of comparative example 9 was obtained, similarly to example 71 excluding a point that liquid A3 was replaced with liquid K3. Optical properties of the prepared structure 114 are shown in table 9.

Regarding the prepared structure 114 as a test sample, the variation of transmittance of a visible light and variation of a haze value were measured using an ultraviolet irradiation device after irradiation of UV-rays for 2 hours. Results are shown in table 9.

Comparative Example 10

A heat-ray shielding lamination structure 115 of comparative example 10 was obtained similarly to example 71, excluding a point that 0.1 pts.wt. of rubidium hydroxide n-hydrate was added to 20 pts.wt. of $Cs_{0.33}WO_3$ particles (specific surface area: 20 $m^2/g$). Optical properties of the prepared structure 115 are shown in table 9.

Regarding the prepared structure 115 as a test sample, the variation of transmittance of a visible light and variation of a haze value were measured using an ultraviolet irradiation device after irradiation of UV-rays for 2 hours. Results are shown in table 9.

Comparative Example 11

A heat-ray shielding dispersion liquid of comparative example 11 (abbreviated as liquid L3 hereafter) was prepared similarly to example 86, excluding a point that 40 pts.wt. pf rubidium hydroxide n-hydrate was added into 20 pts.wt. of $Cs_{0.33}WO_3$ particles.

A heat-ray shielding lamination structure 116 of comparative example 11 was obtained similarly to example 86, excluding a point that the dispersion liquid used in example 86 was replaced with liquid L3. Optical properties of the prepared structure 116 are shown in table 9.

However, there are excessive addition amounts of metal hydroxide, and therefore the structure 116 involves a problem that adhesion between the inorganic glass and the intermediate film containing heat-ray shielding particles is insufficient, thus easily peeling-off the intermediate film containing the heat-ray shielding particles, from the inorganic glass.

Therefore, the acceleration test was not executed.

Comparative Example 12

A heat-ray shielding dispersion liquid of comparative example 12 (abbreviated as liquid M3 hereafter) was prepared similarly to example 85, excluding a point that rubidium hydroxide n-hydrate was not added.

A heat-ray shielding lamination structure 117 of comparative example 12 was obtained similarly to example 85, excluding a point that liquid E3 was replaced with liquid M3. Optical properties of the prepared structure 117 are shown in table 9.

Regarding the prepared structure 117 as a test sample, the variation of transmittance of a visible light and variation of a haze value were measured using an ultraviolet irradiation device after irradiation of UV-rays for 2 hours. Results are shown in table 9.

TABLE 7

| | Mixture of raw materials | | | | | |
|---|---|---|---|---|---|---|
| | Particle having heat-ray shielding function | | Metal salt | | | |
| | Kind | Addition amount (Pts. wt.) | Kind | Addition amount (Pts. wt.) | Interlayer resin | |
| Example 71 | $Cs_{0.33}WO_3$ | 20 | Rubidium hydroxide n-hydrate | 2 | Ethylene-vinyl acetate copolymer | Lamination structure 79 |
| Example 72 | $Rb_{0.33}WO_3$ | 20 | Rubidium hydroxide n-hydrate | 2 | Ethylene-vinyl acetate copolymer | Lamination structure 80 |
| Example 73 | $K_{0.33}WO_3$ | 20 | Rubidium hydroxide n-hydrate | 4 | Ethylene-vinyl acetate copolymer | Lamination structure 81 |
| Example 74 | $Tl_{0.33}WO_3$ | 20 | Rubidium hydroxide n-hydrate | 0.6 | Ethylene-vinyl acetate copolymer | Lamination structure 82 |
| Example 75 | $Cs_{0.33}WO_3$ | 20 | Magnesium hydroxide | 2 | Ethylene-vinyl acetate copolymer | Lamination structure 83 |
| Example 76 | $Cs_{0.33}WO_3$ | 20 | Cesium hydroxide monohydrate | 2 | Ethylene-vinyl acetate copolymer | Lamination structure 84 |
| Example 77 | $Cs_{0.33}WO_3$ | 20 | Sodium hydroxide monohydrate | 2 | Ethylene-vinyl acetate copolymer | Lamination structure 85 |
| Example 78 | $Cs_{0.33}WO_3$ | 20 | Rithium hydroxide dehydrate | 2 | Ethylene-vinyl acetate copolymer | Lamination structure 86 |
| Example 79 | $Cs_{0.33}WO_3$ | 20 | Manganese hydroxide (II) | 2 | Ethylene-vinyl acetate copolymer | Lamination structure 87 |

| | Lamination structure | | Initial property | | | Acceleration test | |
|---|---|---|---|---|---|---|---|
| | Form | Substrate | Visible light transmittance (%) | Solar transmittance (%) | Haze value (%) | ⊿ Visible light transmittance (%) | ⊿ Haze (%) |
| Example 71 | A-4 | Glass/glass | 70.0 | 33.5 | 1.0 | −2.5 | 0.0 |
| Example 72 | A-4 | Glass/glass | 72.3 | 36.1 | 1.0 | −2.8 | 0.0 |
| Example 73 | A-4 | Glass/glass | 68.9 | 32.6 | 1.2 | −2.0 | 0.1 |
| Example 74 | A-4 | Glass/glass | 70.4 | 34.5 | 0.9 | −5.4 | 0.0 |
| Example 75 | A-4 | Glass/glass | 71.1 | 34.7 | 1.0 | −5.5 | 0.2 |
| Example 76 | A-4 | Glass/glass | 69.3 | 33.5 | 1.0 | −2.1 | 0.0 |
| Example 77 | A-4 | Glass/glass | 68.2 | 32.8 | 1.1 | −4.5 | 0.2 |
| Example 78 | A-4 | Glass/glass | 70.4 | 33.9 | 1.2 | −1.7 | 0.1 |
| Example 79 | A-4 | Glass/glass | 71.0 | 34.0 | 1.2 | −4.7 | 0.0 |

TABLE 8

| | Mixture of raw materials | | | | | |
|---|---|---|---|---|---|---|
| | Particle having heat-ray shielding function | | Metal salt | | | |
| | Kind | Addition amount (Pts. wt.) | Kind | Addition amount (Pts. wt.) | Interlayer resin | |
| Example 80 | $Cs_{0.33}WO_3$ | 20 | Rubidium hydroxide n-hydrate | 1 | Ethylene-vinyl acetate copolymer | Lamination structure 88 |
| Example 81 | $Cs_{0.33}WO_3$ | 20 | Rubidium hydroxide n-hydrate | 0.2 | Ethylene-vinyl acetate copolymer | Lamination structure 89 |
| Example 82 | $Cs_{0.33}WO_3$ | 20 | Rubidium hydroxide n-hydrate | 10 | Ethylene-vinyl acetate copolymer | Lamination structure 90 |
| Example 83 | $Cs_{0.33}WO_3$ | 20 | Rubidium hydroxide n-hydrate | 20 | Ethylene-vinyl acetate copolymer | Lamination structure 91 |
| Example 84 | $Cs_{0.33}WO_3$ | 20 | Rubidium hydroxide n-hydrate | 2 | polyvinyl butyral | Lamination structure 92 |
| Example 85 | $Cs_{0.33}WO_3$ | 20 | Rubidium hydroxide n-hydrate | 2 | polyvinyl butyral | Lamination structure 93 |
| Example 86 | $Cs_{0.33}WO_3$ | 20 | Rubidium hydroxide n-hydrate | 2 | Ethylene-vinyl acetate copolymer | Lamination structure 94 |
| Example 87 | $Cs_{0.33}WO_3$ | 20 | Rubidium hydroxide n-hydrate | 2 | Ethylene-vinyl acetate copolymer | Lamination structure 95 |

TABLE 8-continued

| | | | | | | | |
|---|---|---|---|---|---|---|---|
| Example 88 | $Cs_{0.33}WO_3$ | 20 | Rubidium hydroxide n-hydrate | 2 | polyvinyl butyral | Lamination structure 96 |
| Example 89 | $Cs_{0.33}WO_3$ | 20 | Rubidium hydroxide n-hydrate | 2 | Ethylene-vinyl acetate copolymer | Lamination structure 97 |
| Example 90 | $Cs_{0.33}WO_3$ | 20 | Rubidium hydroxide n-hydrate | 2 | polyvinyl butyral | Lamination structure 98 |

| | | | Lamination structure | | | | |
|---|---|---|---|---|---|---|---|
| | | | Initial property | | | Acceleration test | |
| | Form | Substrate | Visible light transmittance (%) | Solar transmittance (%) | Haze value (%) | ⊿Visible light transmittance (%) | ⊿Haze (%) |
| Example 80 | A-4 | Glass/glass | 70.6 | 34.9 | 1.0 | −5.4 | 0.0 |
| Example 81 | A-4 | Glass/glass | 71.0 | 35.1 | 1.0 | −5.6 | 0.0 |
| Example 82 | A-4 | Glass/glass | 70.3 | 34.3 | 1.1 | −1.6 | 0.2 |
| Example 83 | A-4 | Glass/glass | 70.4 | 34.0 | 1.4 | −1.4 | 0.3 |
| Example 84 | A-4 | Glass/glass | 72.9 | 36.6 | 0.9 | −2.6 | 0.0 |
| Example 85 | A-1 | Glass/glass | 71.2 | 34.6 | 0.6 | −2.1 | 0.0 |
| Example 86 | A-1 | Glass/glass | 69.4 | 32.9 | 0.7 | −2.0 | 0.0 |
| Example 87 | A-1 | Polycarbonate/glass | 69.9 | 33.5 | 0.9 | −2.5 | 0.0 |
| Example 88 | A-3 | Glass/glass | 70.7 | 34.4 | 0.6 | −2.9 | 0.0 |
| Example 89 | A-3 | PET/glass | 71.1 | 34.5 | 1.1 | −3.4 | 0.0 |
| Example 90 | A-2 | Glass/glass | 68.8 | 33.3 | 0.7 | −2.8 | 0.0 |

TABLE 9

| | Mixture of raw materials | | | | | |
|---|---|---|---|---|---|---|
| | Particle having heat-ray shielding function | | Metal salt | | | |
| | Kind | Addition amount (Pts. wt.) | Kind | Addition amount (Pts. wt.) | Interlayer resin | |
| Example 91 | $Cs_{0.33}WO_3$ | 20 | Rubidium hydroxide n-hydrate | 2 | Polyvinyl butyral | Lamination structure 99 |
| Example 92 | $Cs_{0.33}WO_3$ | 20 | Rubidium hydroxide n-hydrate | 2 | Ethylene-vinyl acetate copolymer | Lamination structure 100 |
| Example 93 | $Cs_{0.33}WO_3$ | 20 | Rubidium hydroxide n-hydrate | 2 | Ethylene-vinyl acetate copolymer | Lamination structure 101 |
| Example 94 | $Cs_{0.33}WO_3$ | 20 | Rubidium hydroxide n-hydrate | 2 | Ethylene-vinyl acetate copolymer | Lamination structure 102 |
| Example 95 | $Cs_{0.33}WO_3$ | 20 | Rubidium hydroxide n-hydrate | 2 | Polyvinyl butyral | Lamination structure 103 |
| Example 96 | $Cs_{0.33}WO_3$ | 20 | Potassium hydroxide | 2 | Ethylene-vinyl acetate copolymer | Lamination structure 104 |
| Example 97 | $Cs_{0.33}WO_3$ | 20 | Calcium hydroxide | 2 | Ethylene-vinyl acetate copolymer | Lamination structure 105 |
| Example 98 | $Cs_{0.33}WO_3$ | 20 | Strontium hydroxide octahydrate | 2 | Ethylene-vinyl acetate copolymer | Lamination structure 106 |
| Example 99 | $Cs_{0.33}WO_3$ | 20 | Copper hydroxide (II) | 2 | Ethylene-vinyl acetate copolymer | Lamination structure 107 |
| Example 100 | $Cs_{0.33}WO_3$ | 20 | Nickel hydroxide (II) | 2 | Ethylene-vinyl acetate copolymer | Lamination structure 108 |
| Example 101 | $Cs_{0.33}WO_3$ | 20 | Barium hydroxide octahydrate | 2 | Ethylene-vinyl acetate copolymer | Lamination structure 109 |
| Example 102 | $Cs_{0.33}WO_3$ | 20 | Zinc hydroxide | 2 | Ethylene-vinyl acetate copolymer | Lamination structure 110 |
| Example 103 | $Cs_{0.33}WO_3$ | 20 | Cobalt hydroxide | 2 | Ethylene-vinyl acetate copolymer | Lamination structure 111 |
| Example 104 | $Cs_{0.33}WO_3$ | 20 | Cerium hydroxide (IV) | 2 | Ethylene-vinyl acetate copolymer | Lamination structure 112 |
| Example 105 | $Cs_{0.33}WO_3$ | 20 | Iron oxide hydroxide (III) | 2 | Ethylene-vinyl acetate copolymer | Lamination structure 113 |
| Comparative example 9 | $Cs_{0.33}WO_3$ | 20 | Not added | 0 | Ethylene-vinyl acetate copolymer | Lamination structure 114 |
| Comparative example 10 | $Cs_{0.33}WO_3$ | 20 | Rubidium hydroxide n-hydrate | 0.1 | Ethylene-vinyl acetate copolymer | Lamination structure 115 |
| Comparative example 11 | $Cs_{0.33}WO_3$ | 20 | Rubidium hydroxide n-hydrate | 40 | Ethylene-vinyl acetate copolymer | Lamination structure 116 |

TABLE 9-continued

| | | | | | | | |
|---|---|---|---|---|---|---|---|
| Comparative example 12 | $Cs_{0.33}WO_3$ | 20 | Not added | | 0 | Polyvinyl butyral | Lamination structure 117 |

| | | | Lamination structure | | | | |
|---|---|---|---|---|---|---|---|
| | | | Initial property | | | Acceleration test | |
| | Form | Substrate | Visible light transmittance (%) | Solar transmittance (%) | Haze value (%) | ⊿ Visible light transmittance (%) | ⊿ Haze (%) |
| Example 91 | B-7 | Polycarbonate/glass | 69.3 | 33.1 | 0.9 | −3.5 | 0.0 |
| Example 92 | B-7 | PET/glass | 68.2 | 32.8 | 1.2 | −3.1 | 0.0 |
| Example 93 | B-1 | Polycarbonate/glass | 69.5 | 33.5 | 1.0 | −2.6 | 0.0 |
| Example 94 | A-5 | Glass/glass | 70.1 | 33.9 | 1.0 | −2.8 | 0.0 |
| Example 95 | A-6 | Glass/glass | 72.5 | 35.2 | 0.9 | −2.5 | 0.0 |
| Example 96 | A-4 | Glass/glass | 68.8 | 32.9 | 1.3 | −6.5 | 0.6 |
| Example 97 | A-4 | Glass/glass | 70.9 | 34.5 | 1.3 | −6.6 | 0.6 |
| Example 98 | A-4 | Glass/glass | 72.5 | 36.0 | 1.1 | −6.0 | 2.0 |
| Example 99 | A-4 | Glass/glass | 69.1 | 33.1 | 1.3 | −7.3 | 2.1 |
| Example 100 | A-4 | Glass/glass | 68.9 | 33.5 | 1.1 | −8.1 | 2.3 |
| Example 101 | A-4 | Glass/glass | 68.3 | 33.1 | 1.3 | −7.6 | 1.9 |
| Example 102 | A-4 | Glass/glass | 68.8 | 33.0 | 1.4 | −6.6 | 1.8 |
| Example 103 | A-4 | Glass/glass | 70.2 | 34.2 | 1.0 | −5.9 | 2.2 |
| Example 104 | A-4 | Glass/glass | 69.6 | 33.9 | 1.2 | −7.7 | 2.1 |
| Example 105 | A-4 | Glass/glass | 68.4 | 32.5 | 1.2 | −8.4 | 2.2 |
| Comparative example 9 | A-4 | Glass/glass | 68.2 | 32.3 | 0.7 | −11.2 | 0.0 |
| Comparative example 10 | A-4 | Glass/glass | 72.1 | 35.7 | 0.8 | −11.0 | 0.0 |
| Comparative example 11 | A-1 | Glass/glass | 69.2 | 34.0 | 1.1 | Not tested | |
| Comparative example 12 | A-1 | Glass/glass | 70.0 | 34.1 | 0.4 | −12.7 | 0.0 |

[Evaluation]

From the results of tables 7 to 9, it is found that in examples 71 to 105, heat-ray shielding lamination structures 79 to 113 having high visible light transmittance, low heat-ray shielding property, low haze value, and excellent transparency can be obtained by adding a suitable amount of metal salts of carboxylic acids.

As a result of carrying out the acceleration test of irradiation of UV-rays for 2 hours, it is found that the heat-ray shielding lamination structure added with suitable amounts of hydroxides of sodium, potassium, magnesium, calcium, manganese, zinc, cesium, lithium, and rubidium, has a remarkable effect of suppressing its variation rate to half or less with respect to an initial visible light transmittance. As a result of carrying out the acceleration test of irradiation of UV-rays for 2 hours, it is also found that increase of the haze value is 0.3% or less.

Meanwhile, in comparative examples 9, 10, and 12, as a result of carrying out acceleration test, it was found that the metal hydroxides were not added, or due to excessively small addition amounts, variation of the visible light transmittance was increased. Also, in comparative example 11, excessively large addition amounts of the metal hydroxides damages the adhesion to the inorganic glass, although this is an important physical property of the lamination structure.

DESCRIPTION OF SIGNS AND NUMERALS

1 Laminated plate
2 Interlayer
11 Particle having a heat-ray shielding function
12 Intermediate film
13 Heat-ray shielding film
14 Resin film
15 Resin film containing particles having a heat-ray shielding function
16 Peeling layer
17 Film sheet
18 Adhesive layer
20 Laminated plate containing particles having a heat-ray shielding function

The invention claimed is:

1. A heat-ray shielding lamination structure composed of two laminated plates selected from the group consisting of a plate glass, a plastic, and a plastic containing (1) particles having a heat-ray shielding function and (2) one or more metal compounds selected from the group consisting of metal salts of carboxylic acids, metal carbonates, metal carbonate hydroxides, and metal hydroxides, interposing an interlayer containing the (1) particles having a heat-ray shielding function and the (2) one or more metal compounds selected from the group consisting of metal salts of carboxylic acids, metal carbonates, metal carbonate hydroxides, and metal hydroxides, wherein the (1) particles having the heat-ray shielding function are composite tungsten oxide particles expressed by a general formula $M_YWO_Z$ ($0.001 \leq Y \leq 1.0$, $2.2 \leq Z \leq 3.0$), element M is one or more elements selected from the group consisting of Cs, Rb, K, and Tl, having a hexagonal crystal structure, with a particle size of 1 nm or more and 800 nm or less, the metal salt of carboxylic acid of the (2) one or more metal compounds is zinc acetate dihydrate, copper acetate (II)-hydrate, strontium acetate 0.5 hydrate, or cobalt acetate (II) tetrahydrate, the metal carbonate of the (2) one or more metal compounds is lithium carbonate, rubidium carbonate, cesium carbonate, strontium carbonate, nickel carbonate, cobalt carbonate, or copper carbonate (II), the metal carbonate hydroxide of the (2) one or more metal compounds is magnesium hydroxide carbonate, the metal hydroxide of the (2) one or more metal compounds is rubidium hydroxide n-hydrate, magnesium hydroxide, cesium hydroxide monohydrate, lithium hydroxide dihydrate, manganese hydroxide (II), calcium hydroxide, strontium hydroxide octahydrate, copper hydroxide (II), nickel hydroxide (II), barium hydroxide octahydrate, zinc hydroxide, cobalt hydroxide, cerium hydroxide (IV), or iron oxide hydroxide (III), the plastic of the two laminated plates is a sheet or a film made of polycarbonate resin or polyethylene-terephthalate resin, and the (2) one or more metal compounds are contained in an amount of 3 pts.wt. or more and 50 pts.wt. or less based on 100 pts.wt. of the composite tungsten oxide particles.

2. The heat-ray shielding lamination structure according to claim 1, wherein the (2) one or more metal compounds are metal carbonate hydroxides.

3. The heat-ray shielding lamination structure according to claim 1, wherein the (2) one or more metal compounds are metal hydroxides.

4. The heat-ray shielding lamination structure according to claim 1, wherein the interlayer includes an intermediate film, and the (1) particles having the heat-ray shielding function and the (2) one or more metal compounds are contained in the intermediate film.

5. The heat-ray shielding lamination structure according to claim 4, wherein resin constituting the intermediate film is vinyl resin.

6. The heat-ray shielding lamination structure according to claim 5, wherein the vinyl resin constituting the intermediate film is polyvinyl butyral or ethylene-vinyl acetate copolymer.

7. The heat-ray shielding lamination structure according to claim 1, wherein the interlayer includes a two or more layered intermediate films, and the (1) particles having the heat-ray shielding function and the (2) one or more metal compounds are contained in at least one layer of the intermediate film.

8. The heat-ray shielding lamination structure according to claim 7, wherein the interlayer includes a heat-ray shielding film formed on at least one of the surfaces of the intermediate films, the heat-ray shielding film containing the particles (1) having a heat-ray shielding function and the (2) one or more metal compounds.

9. The heat-ray shielding lamination structure according to claim 1, wherein the interlayer includes:
a heat-ray shielding film formed on at least one of the inner surfaces of the two laminated plates selected from the group consisting of the plate glass and the plastic, containing the (2) one or more metal compounds; or
an intermediate film overlapped on the heat-ray shielding film.

10. The heat-ray shielding lamination structure according to claim 1, wherein the interlayer is configured so that:
a heat-ray substrate having a heat-ray shielding film formed on one surface or both surfaces of a resin film substrate, the heat-ray shielding film containing the (1) particles having the heat-ray shielding function and the (2) one or more metal compounds; or
a heat-ray shielding film substrate containing the (1) particles having the heat-ray shielding function and the (2) one or more metal compounds,
are laminated between two or more layered intermediate films.

11. The heat-ray shielding lamination structure according to claim 1, wherein the interlayer includes a lamination body obtained by laminating in a following order:
an intermediate film or two or more layered intermediate films;
an adhesive layer;
a heat-ray shielding film containing the (1) particles having the heat-ray shielding function, and the (2) one or more metal compounds; and
a peeling layer,
wherein the adhesive layer of the lamination body is adhered to an inner surface of one of the laminated plates selected from the plate glass or plastic, and the peeling layer of the lamination body is adhered to the intermediate film or the two or more layered intermediate films.

12. The heat-ray shielding lamination structure according to claim 1, wherein the (2) one or more metal compounds are metal carbonates.

13. A heat-ray shielding lamination structure composed of two laminated plates selected from the group consisting of a plate glass, a plastic, and a plastic containing (1) particles having a heat-ray shielding function and (2) one or more metal compounds selected from the group consisting of metal salts of carboxylic acids, metal carbonates, metal carbonate hydroxides, and metal hydroxides, interposing an interlayer containing the (1) particles having a heat-ray shielding function and the (2) one or more metal compounds selected from the group consisting of metal salts of carboxylic acids, metal carbonates, metal carbonate hydroxides, and metal hydroxides, wherein the (1) particles having the heat-ray shielding function are composite tungsten oxide particles expressed by a general formula $M_YWO_Z$ ($0.001 \leq Y \leq 1.0$, $2.2 \leq Z \leq 3.0$), element M is one or more elements selected from the group consisting of Cs, Rb, K, and Tl, having a hexagonal crystal structure, with a particle size of 1 nm or more and 800 nm or less, the metal salt of carboxylic acid of the (2) one or more metal compounds is zinc acetate dihydrate, copper acetate (II)-hydrate, strontium acetate 0.5 hydrate, or cobalt acetate (II) tetrahydrate, the metal carbonate of the (2) one or more metal compounds is lithium carbonate, rubidium carbonate, cesium carbonate, strontium carbonate, nickel carbonate, cobalt carbonate, or copper carbonate (II), the metal carbonate hydroxide of the (2) one or more metal compounds is magnesium hydroxide carbonate, the metal hydroxide of the (2) one or more metal compounds is rubidium hydroxide n-hydrate, magnesium hydroxide, cesium hydroxide monohydrate, lithium hydroxide dihydrate, manganese hydroxide (II), calcium hydroxide, strontium hydroxide octahydrate, copper hydroxide (II), nickel hydroxide (II), barium hydroxide octahydrate, zinc hydroxide, cobalt hydroxide, cerium hydroxide (IV), or iron oxide hydroxide (III), the plastic of the two laminated plates is a sheet or a film made of polycarbonate resin or polyethylene-terephthalate resin, and the (2) one or more metal compounds are contained in an amount of 1 pts.wt. or more and 100 pts.wt. or less based on 100 pts.wt. of the composite tungsten oxide particles, wherein the (2) one or more metal compounds are metal salts of carboxylic acids.

* * * * *